US009386016B2

(12) United States Patent
Takamizawa et al.

(10) Patent No.: US 9,386,016 B2
(45) Date of Patent: Jul. 5, 2016

(54) SYSTEM AND DEVICE FOR AUTHENTICATION

(75) Inventors: Hidehisa Takamizawa, Fuchu (JP); Asahiko Yamada, Tokorozawa (JP); Tomoaki Morijiri, Chofu (JP); Koji Okada, Tokyo (JP); Tatsuro Ikeda, Fuchu (JP); Minoru Nishizawa, Fuchu (JP); Yoshihiro Fujii, Fuchu (JP)

(73) Assignees: KABUSHIKI KAISHA TOSHIBA, Tokyo (JP); TOSHIBA SOLUTIONS CORPORATION, Tokyo (JP)

( * ) Notice: Subject to any disclaimer, the term of this patent is extended or adjusted under 35 U.S.C. 154(b) by 1803 days.

(21) Appl. No.: 11/840,724

(22) Filed: Aug. 17, 2007

(65) Prior Publication Data

US 2008/0172729 A1    Jul. 17, 2008

(30) Foreign Application Priority Data

Aug. 30, 2006   (JP) .................................. 2006-234246

(51) Int. Cl.
*H04L 29/06* (2006.01)
(52) U.S. Cl.
CPC .................................. *H04L 63/0861* (2013.01)
(58) Field of Classification Search
CPC ........ G06F 21/31; H04L 63/0861; H04L 9/32
USPC .............................................. 726/7; 713/186
See application file for complete search history.

(56) References Cited

U.S. PATENT DOCUMENTS

| 2005/0113066 | A1* | 5/2005 | Hamberg ....................... 455/411 |
| 2006/0005025 | A1* | 1/2006 | Okada et al. .................. 713/168 |
| 2006/0083171 | A1* | 4/2006 | Tanaike et al. ................ 370/238 |
| 2006/0129838 | A1* | 6/2006 | Chen ....................... G06F 21/32 |
| | | | 713/186 |

FOREIGN PATENT DOCUMENTS

JP          2006-11768        1/2006

* cited by examiner

*Primary Examiner* — Farid Homayounmehr
*Assistant Examiner* — Suman Debnath
(74) *Attorney, Agent, or Firm* — Oblon, McClelland, Maier & Neustadt, L.L.P

(57) ABSTRACT

An authentication device receives each authentication context including an output information block, an input information block, and an authenticator block. The output information block includes a process result and process result identification information. The input information block includes a process result and process result identification information. The authentication device verifies each authenticator block. The authentication device searches for the output information block having the same value of process result identification information as the value of process result identification information in the input information block from other authentication contexts based on process result identification information in the input information block included in each authentication context. The authentication device verifies whether or not the process result in the input information block is equal to the process result in the searched output information block, and authenticates that all the authentication contexts have validity when all the verification results are valid.

6 Claims, 34 Drawing Sheets

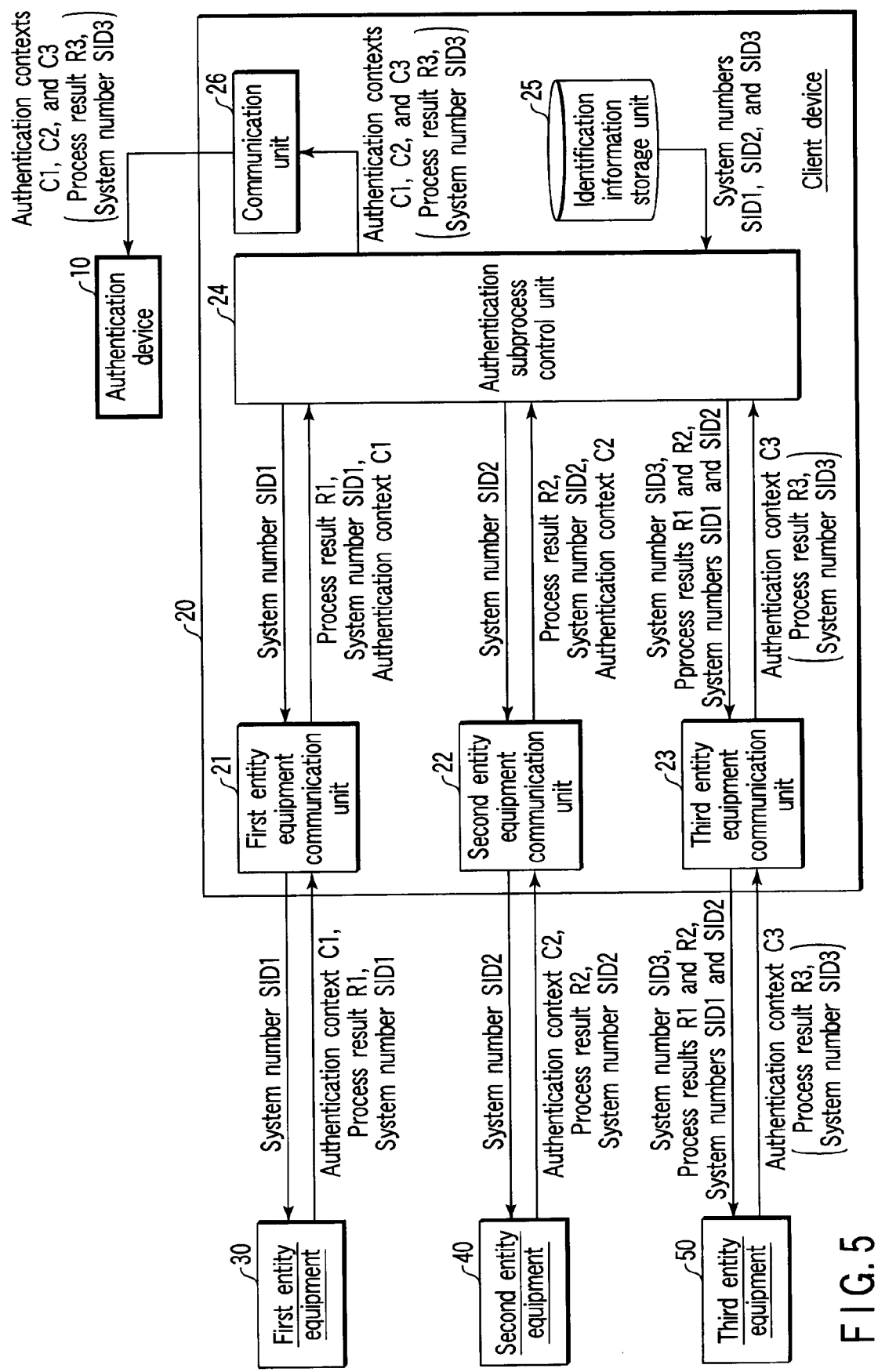
F I G. 5

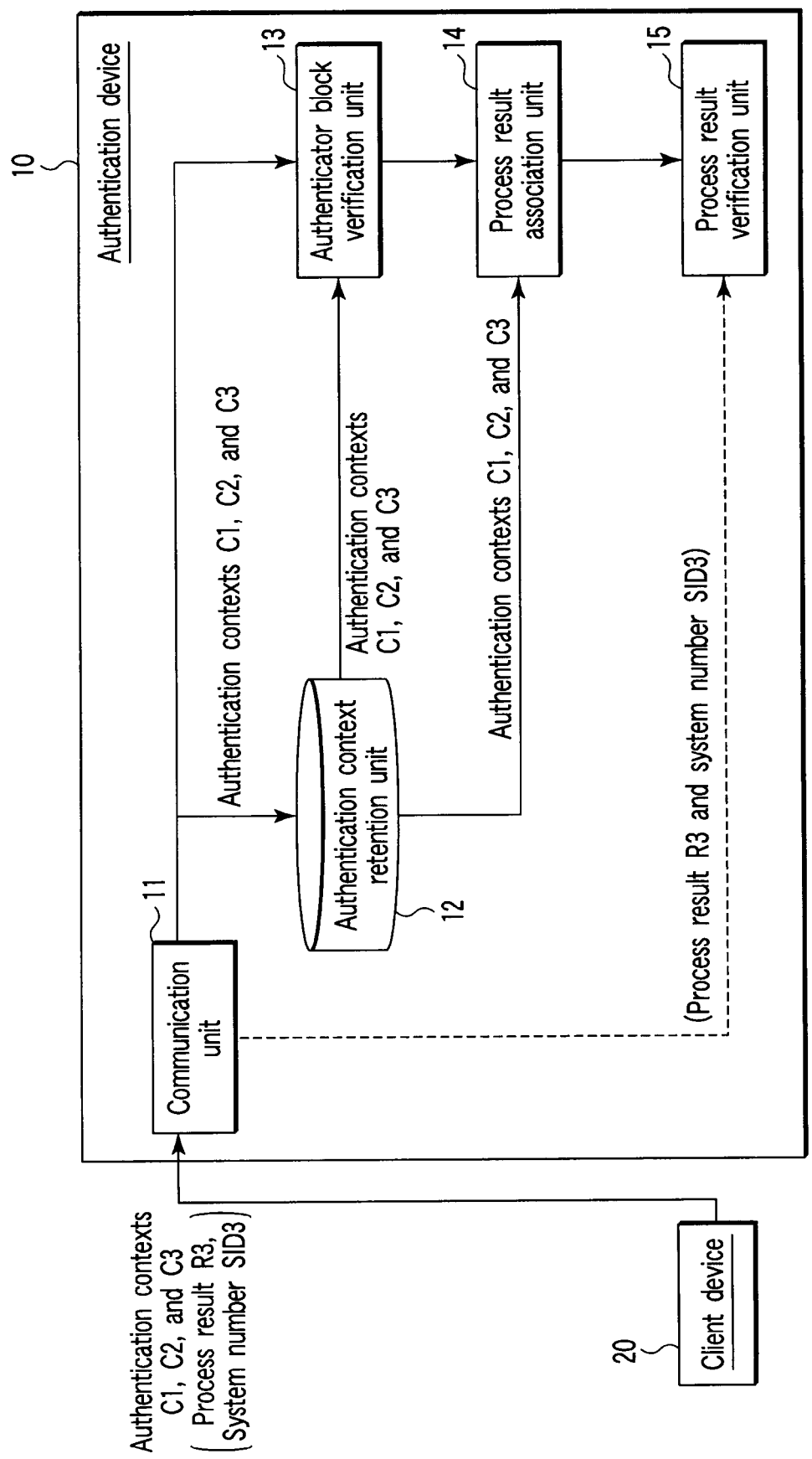
F I G. 6

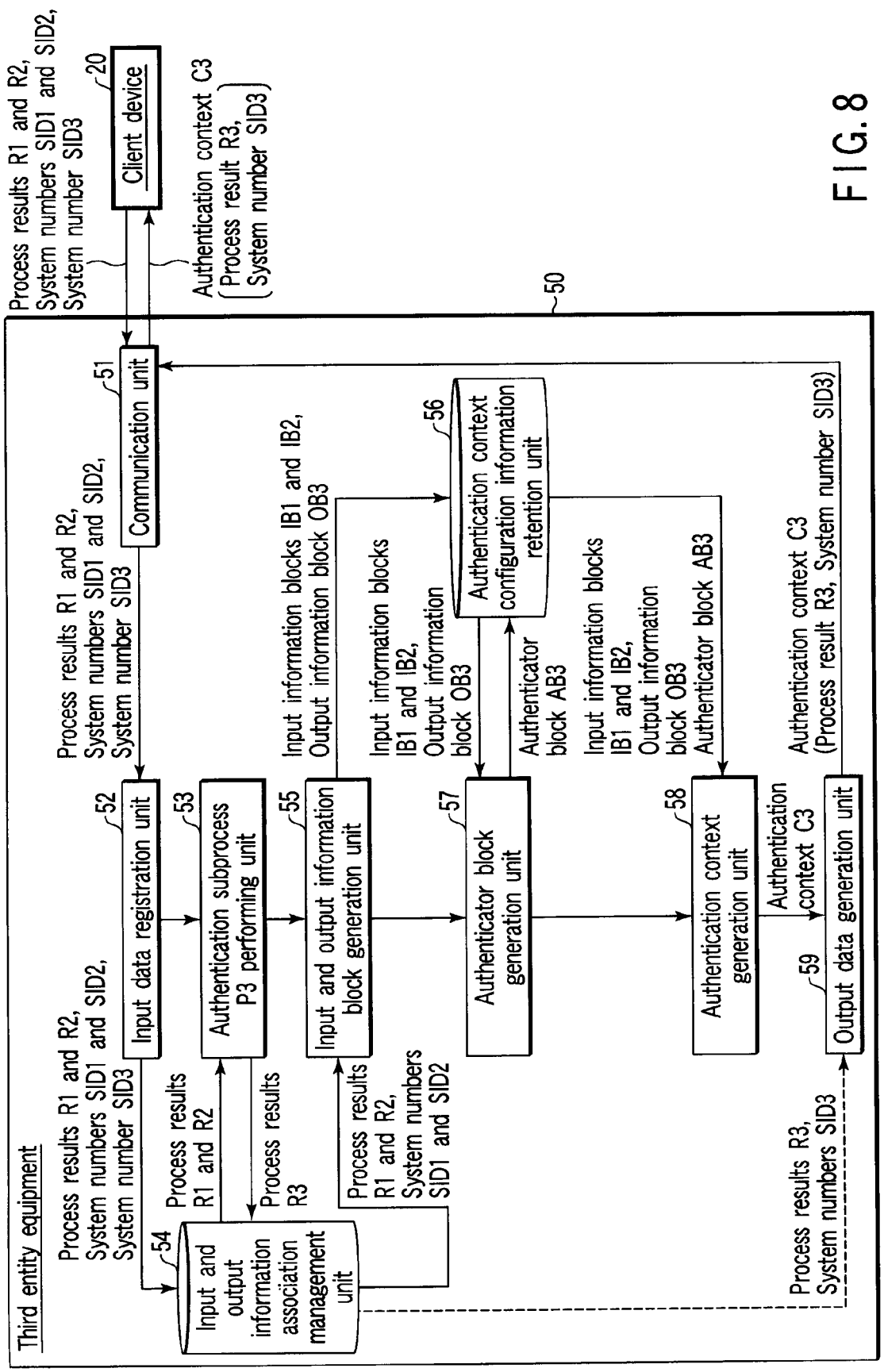
F I G. 8

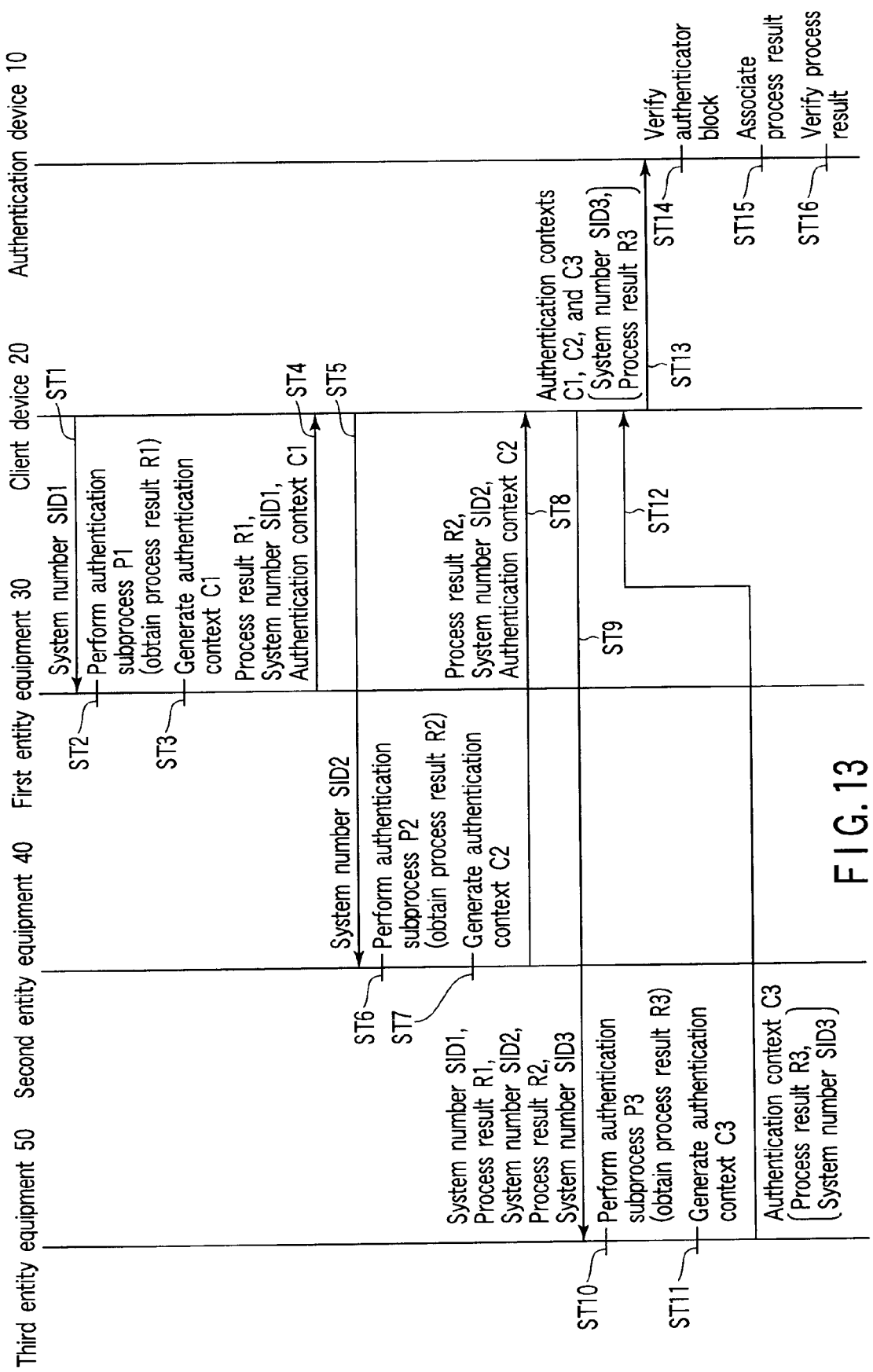
F I G. 13

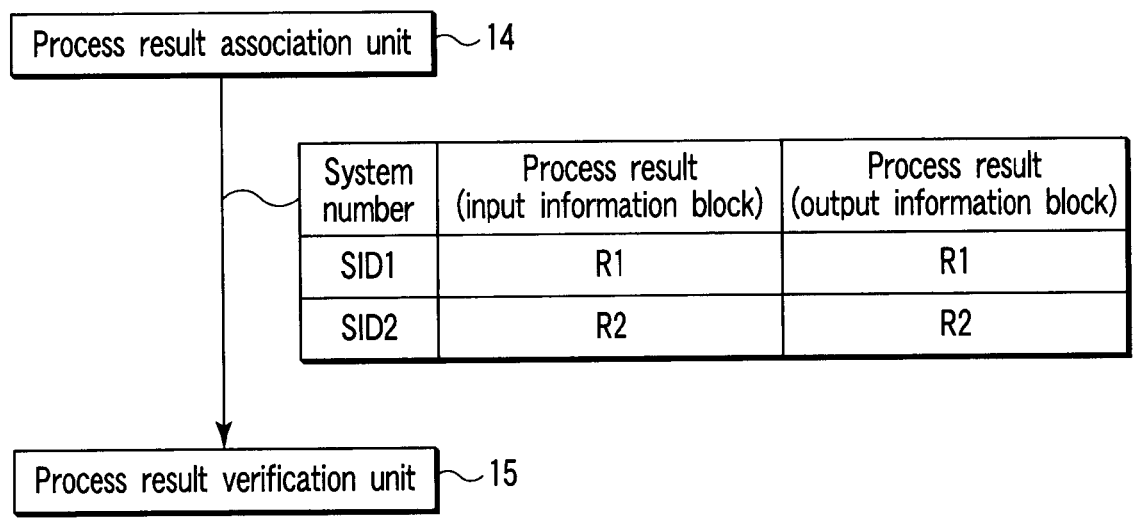
F I G. 14

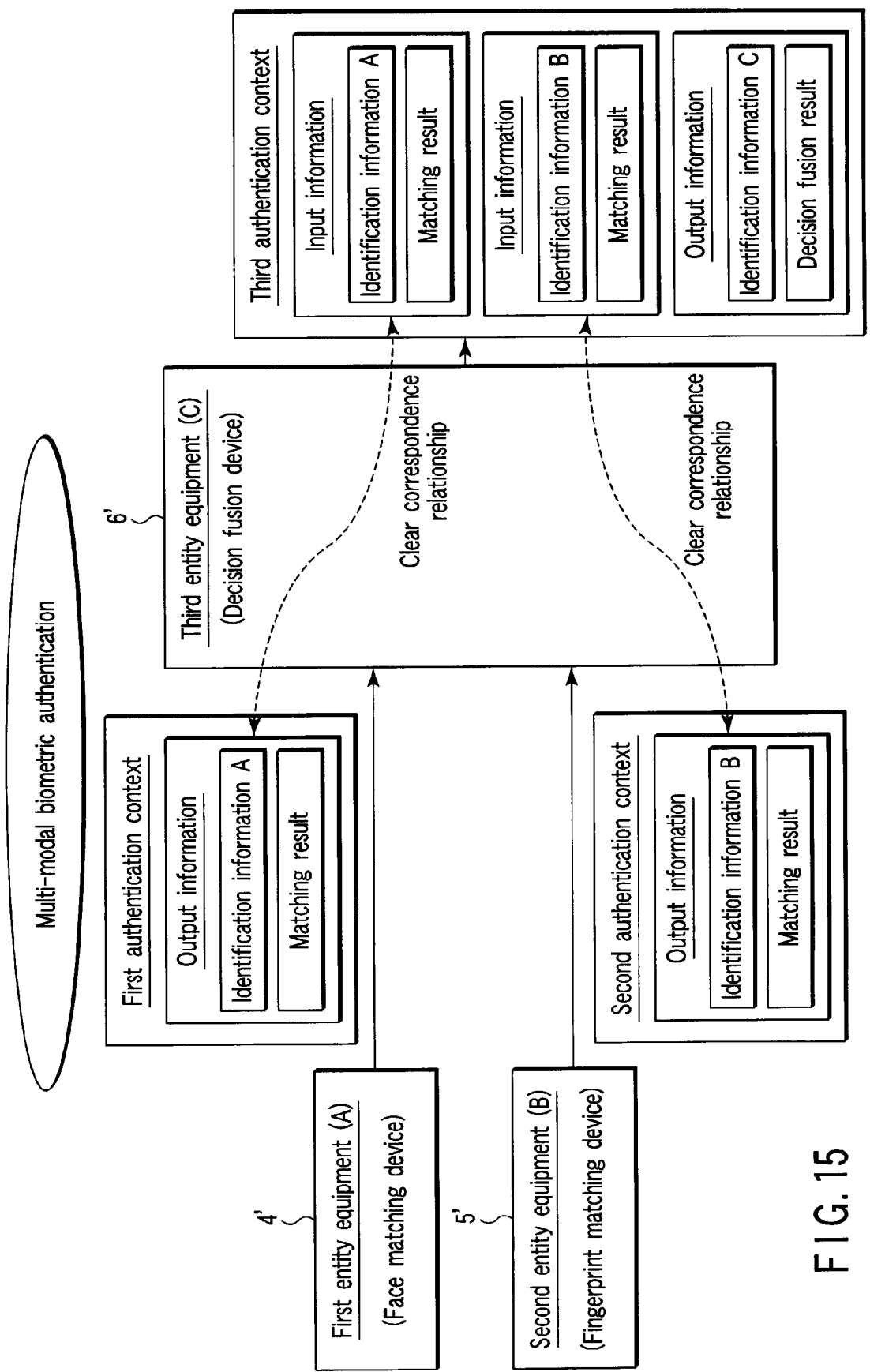
F I G. 15

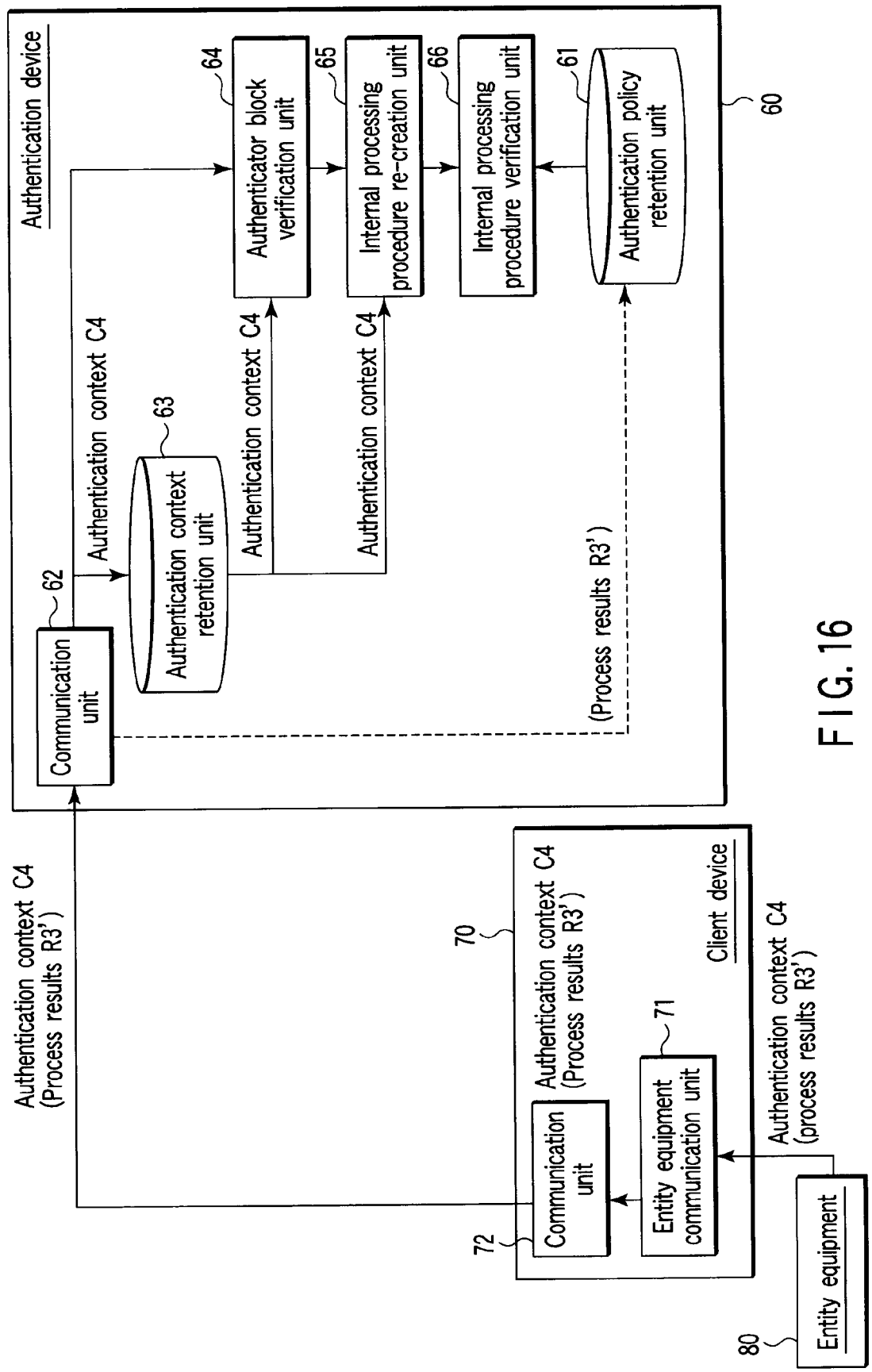
F I G. 16

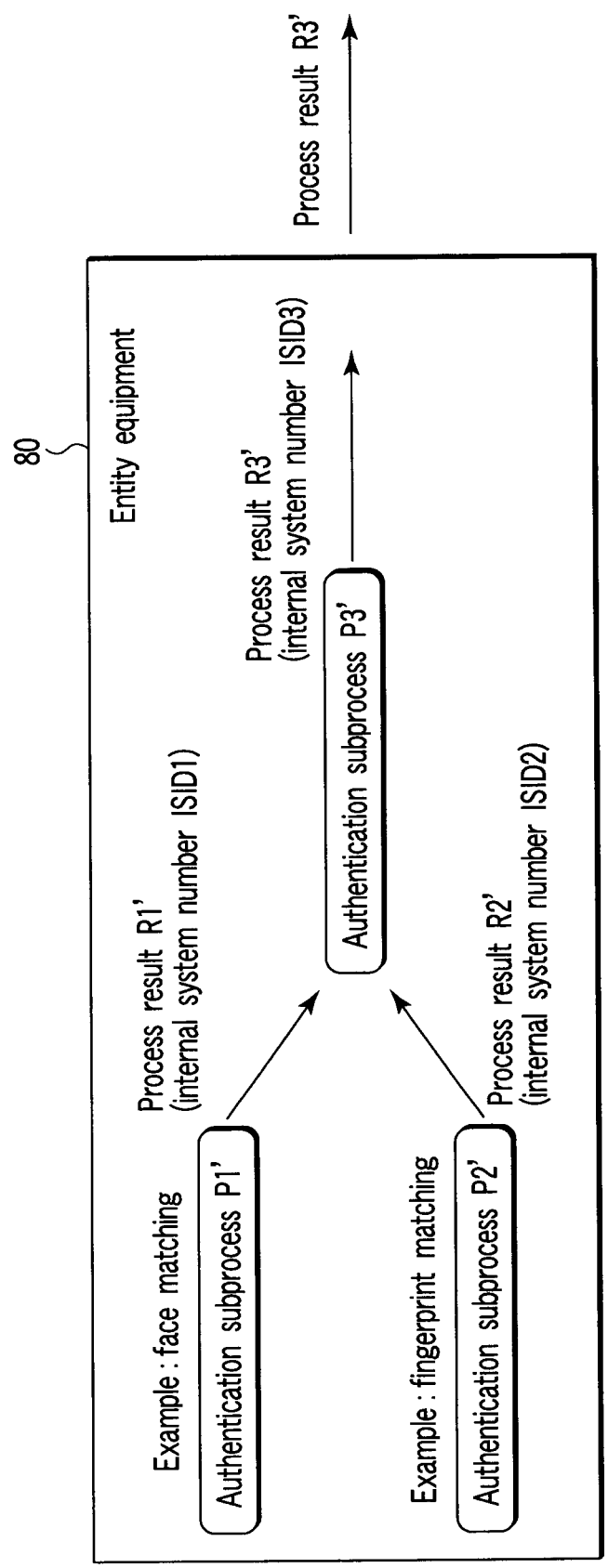
F I G. 18

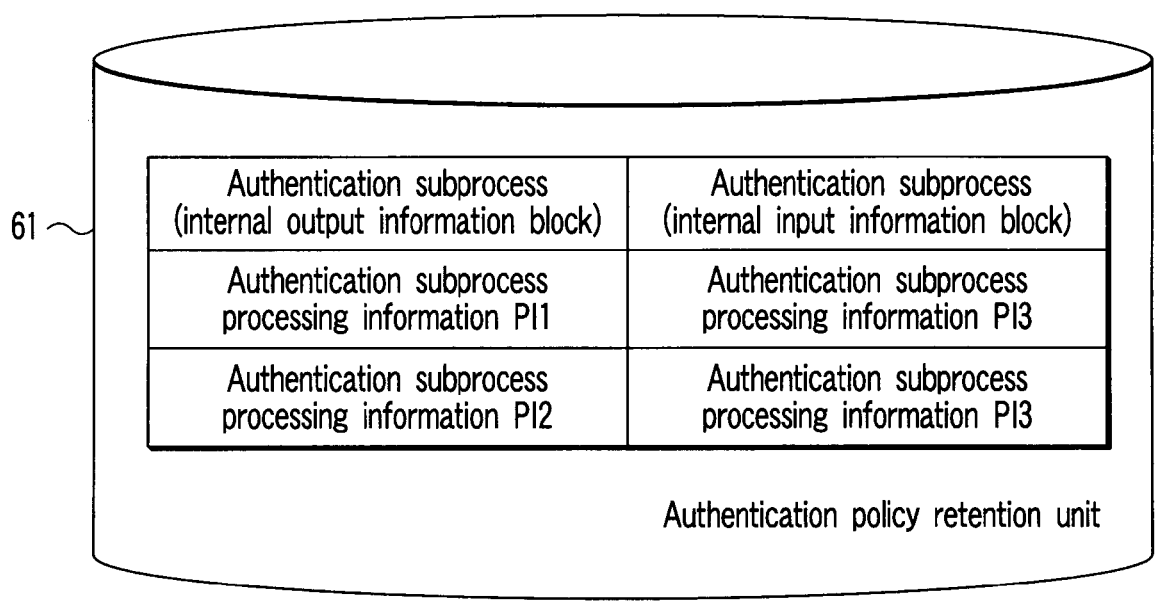
F I G. 20

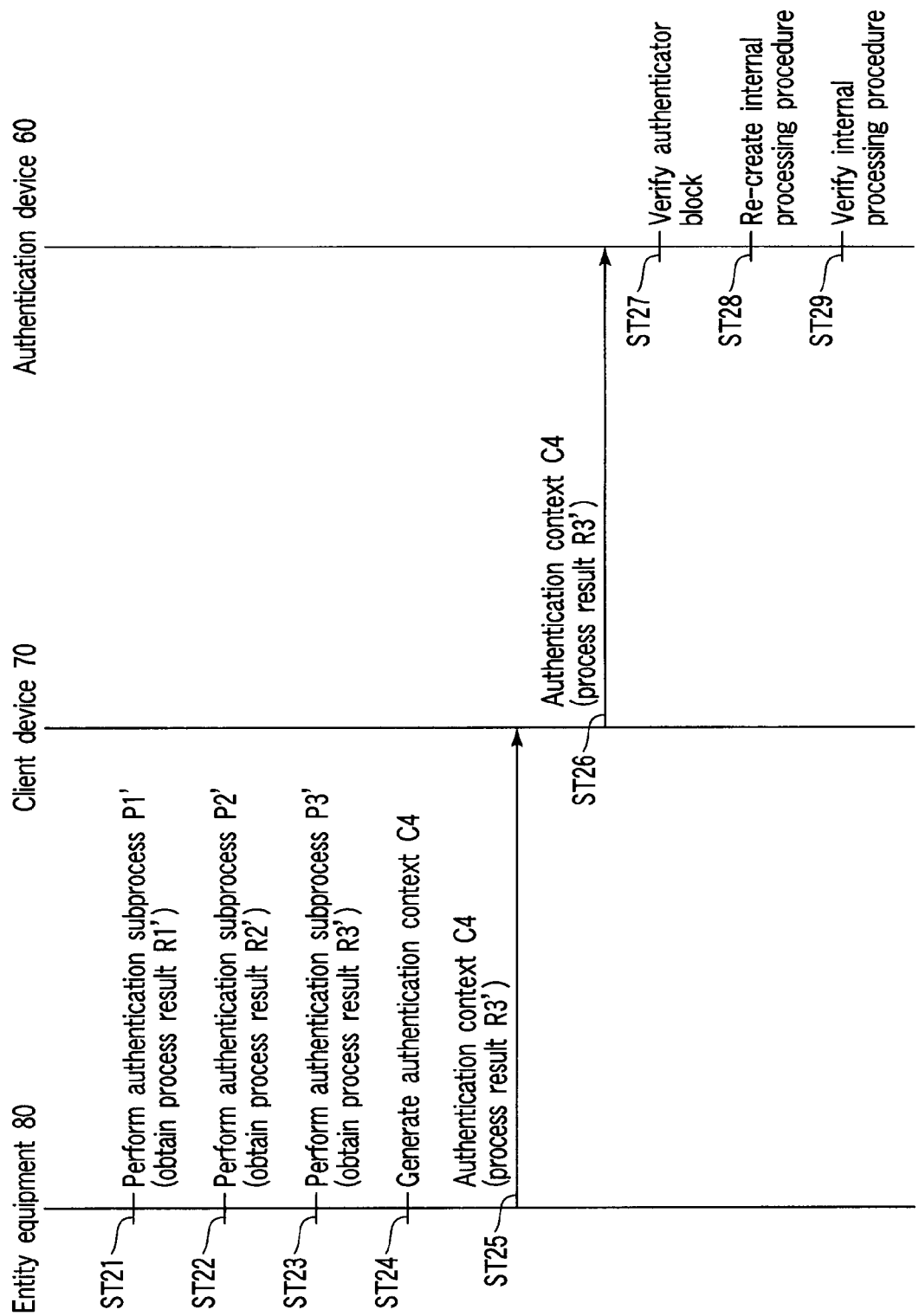
F I G. 21

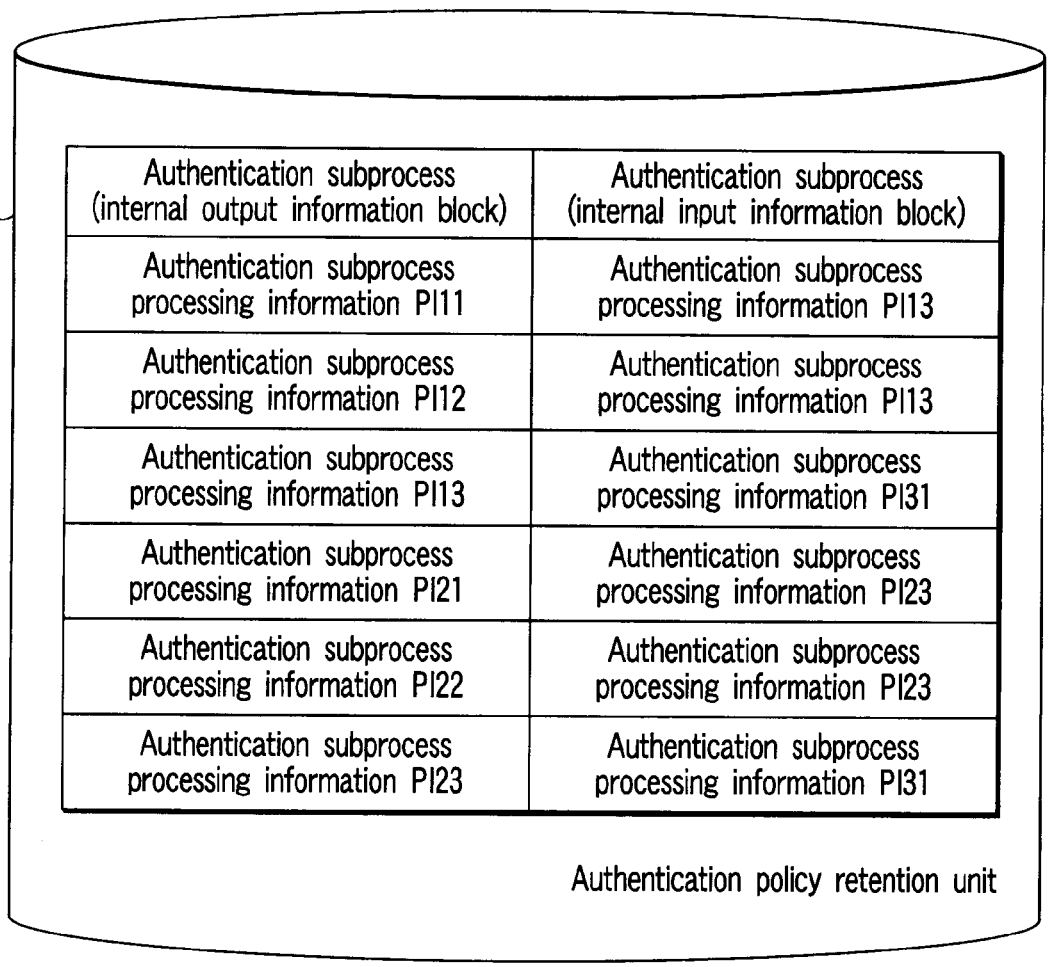
F I G. 33

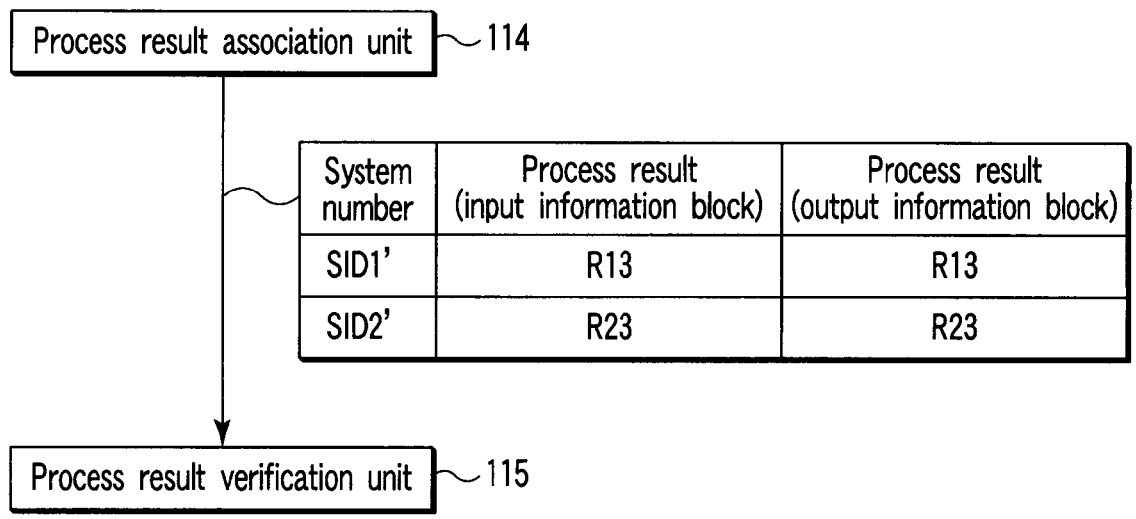
F I G. 36

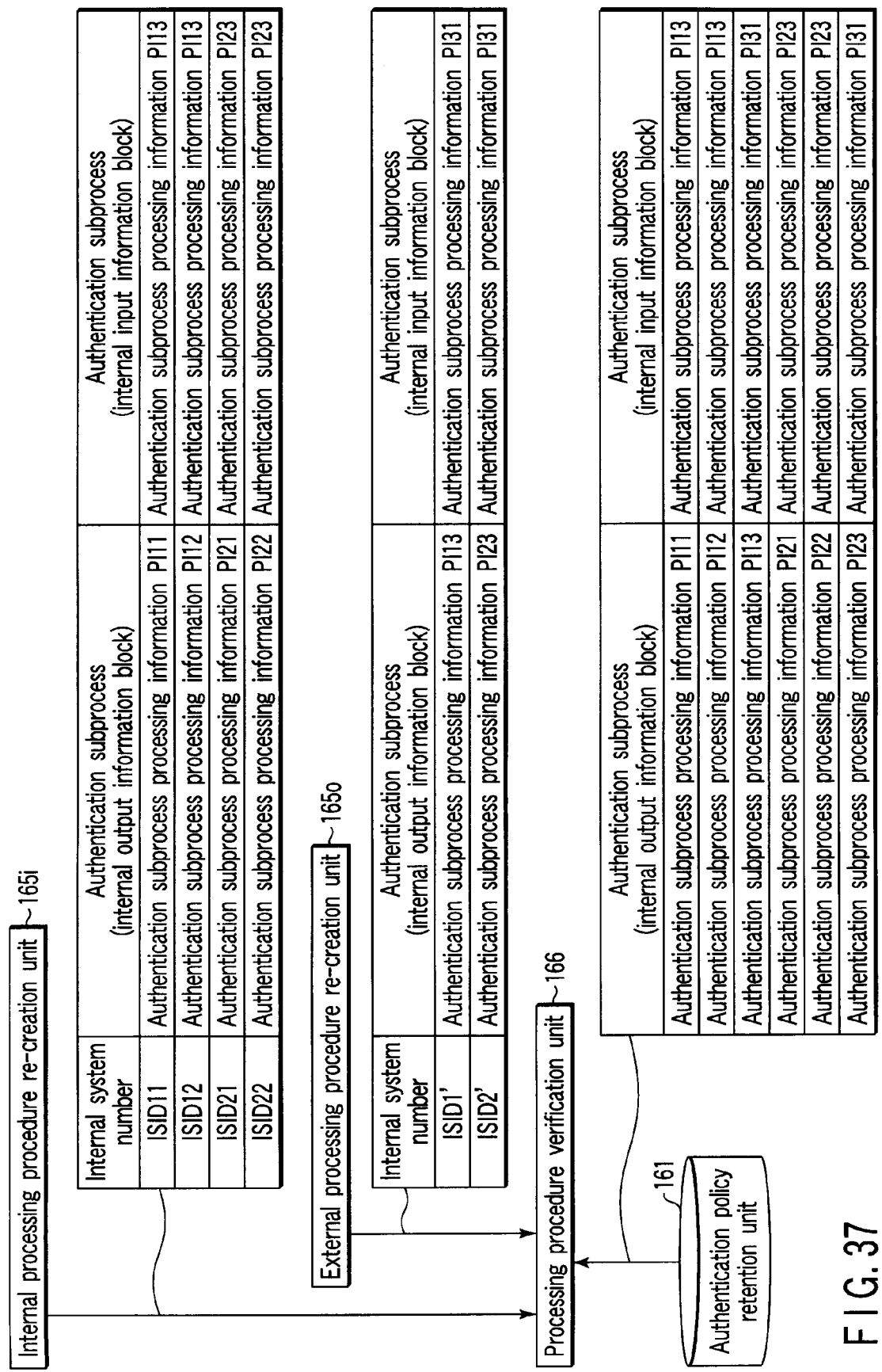
F I G. 37

SYSTEM AND DEVICE FOR AUTHENTICATION

CROSS-REFERENCE TO RELATED APPLICATIONS

This application is based upon and claims the benefit of priority from prior Japanese Patent Application No. 2006-234246, filed Aug. 30, 2006, the entire contents of which are incorporated herein by reference.

BACKGROUND OF THE INVENTION

1. Field of the Invention

The present invention relates to a system and a device for authentication.

2. Description of the Related Art

Currently, biometric authentication is a promising principal confirmation technique. The biometric authentication is a technique of making identity verification by matching reference biometric information (biometric template), which is obtained by previously sampling and registering information indicating a unique physical feature or behavioral feature of a person, with sample biometric information newly input during the identity verification. Examples of the biometric information include a fingerprint, an iris, a retina, a face, voice, a keystroke, and a signature (handwriting). In the biometric authentication, unlike the already-existing authentication method such as password authentication, a load on a user is reduced because of the use of the biometric information which is free from physical or mental loss.

The biometric authentication is just beginning to be applied to a fixed system for a bank or the like, and introduction of the biometric authentication is also considered for principal confirmation through the Internet in electronic commerce. However, the biometric authentication includes plural processes such as "sampling of biometric information (extraction of feature quantity)", "matching (computation of similarity)", and "decision (comparison with threshold)" compared with the already-existing authentication method such as the password authentication having one process of "decision (comparison with registered password)".

In the case of the fixed system for a bank or the like, a verifier side (such as the bank) can advantageously assure that impropriety cannot occur in each process of the biometric authentication.

On the other hand, in the case of an open system such as the Internet, a disadvantage is generated on the verifier side (such as an electronic commerce site) because the verifier side cannot assure that impropriety cannot occur in each process of a biometric authentication environment on a user side. For example, the necessity of verifying whether or not the process of the biometric authentication environment on the user side is valid is generated in addition to the verification of the matching result.

An authentication system in which an authentication context for biometrics is used is well known as a technique of satisfying the above necessity (for example, see Jpn. Pat. Appln. KOKAI Publication No. 2006-11768). The authentication context means information in which a management entity for performing each component process of the biometric authentication assures performing result and the verifier side can verify the validity of the performing result.

There is no particular problem when the above authentication context is used in the usual biometric authentication.

However, according to study of the inventor, the following problems 1 and 2 exist when the authentication context is used in the multimodal biometric authentication or multi-algorithm biometric authentication. The multimodal biometric authentication is one in which plural kinds of authentication processes such as the face authentication and the fingerprint authentication are performed in parallel to make decision fusion. The multi-algorithm biometric authentication is one in which the same kind of authentication processes such as the face authentication are performed in parallel with plural kinds of algorithms to make the decision fusion. Both the multimodal biometric authentication and the multi-algorithm biometric authentication have been attracting attention from the standpoint of enhancement of authentication accuracy.

(Problem 1)

As described above, there is no particular problem when the authentication context is used in the usual biometric authentication. That is, as shown in FIG. 1, in the usual biometric authentication, a first entity equipment 1 performs the biometric information capturing process to output a first authentication context. The first authentication context includes the output information on "capturing information". A second entity equipment 2 outputs a second authentication context. The second authentication context includes the output information on "template (biometric template)" to which the storage process is previously performed. A third entity equipment 3 performs the matching process to "capturing information" and "template" to output a third authentication context to the verifier. The third authentication context includes the input information on "capturing information" and "template" and the output information on "matching result".

At this point, it is clear that "capturing information" in the third authentication context corresponds to the output information on the first entity equipment 1. This is because the first entity equipment 1 is the only equipment having the function of outputting "capturing information". Similarly, it is clear that "template" in the third authentication context corresponds to the output information on the second entity equipment 2.

Thus, in the usual biometric authentication, because the correspondence relationship between the processes and the pieces of entity equipment 1 to 3 is clear, the verifier can verify the validity of the series of process results from the authentication context.

On the other hand, in the multimodal biometric authentication or multi-algorithm biometric authentication, sometimes the plural pieces of entity equipment have the same function in each piece of biometric information or algorithm. As described in claims 5, 6, 14, and 15 and a sixth embodiment of Jpn. Pat. Appln. KOKAI Publication No. 2006-11768, there is no problem when association of an identity verification process is performed by expressing the hierarchical structure between the authentication contexts. However, in order to express the hierarchical structure between the authentication contexts, it is necessary that the plural authentication contexts be processed in the single entity equipment. However, some pieces of entity equipment do not have the ability to process the plural authentication contexts, and sometimes the entity equipment cannot express the hierarchical structure between the authentication contexts. In this case, the correspondence relationship between the process result included in the authentication context and the entity equipment which has generated the process result becomes ambiguous. Accordingly, in the multimodal biometric authentication or multi-algorithm biometric authentication, the verifier cannot verify the validity of the series of process results from the authentication context.

As shown in FIG. 2, in the multimodal biometric authentication, a first entity equipment 4 performs the face matching process to output a first authentication context. The first authentication context includes the output information on "matching result". A second entity equipment 5 performs the fingerprint matching process to output a second authentication context. The second authentication context includes the output information on "matching result". A third entity equipment 6 makes the decision fusion of the two "matching results" to output a third authentication context to the verifier. The third authentication context includes the input information on the two "matching results" and the output information on "decision fusion result".

However, it is ambiguous which of the two "matching results" in the third authentication context corresponds to which piece of output information on the first and second pieces of entity equipment 4 and 5. This is because the first and second pieces of entity equipment 4 and 5 individually have the functions of outputting "matching result".

Accordingly, as described above, in the multimodal biometric authentication, the verifier cannot verify the validity of the series of process results from the authentication context. The same holds true for the multi-algorithm biometric authentication.

(Problem 2)

As described above, there is no particular problem when the authentication context is used in the usual biometric authentication. That is, as shown in FIG. 3, in the usual biometric authentication, the first entity equipment 4 performs the face matching process and the decision process, and outputs the first authentication context to the verifier. The first authentication context includes pieces of the information on "matching process" and "decision process" and the output information on "decision result".

At this point, the processing procedure in which "decision process" is performed after "matching process" is clear in the first authentication context. This is because only one each of the matching process function and the decision process function exists in the first entity equipment 1.

Thus, in the usual biometric authentication, because the processing procedure of each "process" in the authentication context is clear, the verifier can verify the validity of the series of process results from the authentication context.

On the other hand, in the multimodal biometric authentication or multi-algorithm biometric authentication, sometimes the matching process in which the plural different pieces of biometric information are combined or the matching process in which the plural different algorithms are combined is performed in one entity equipment. In this case, the processing procedure of each "process" (procedure of generating process result) included in the authentication context becomes ambiguous.

Accordingly, in the case of the multimodal biometric authentication or multi-algorithm biometric authentication, the verifier cannot verify the validity of the series of process results from the authentication context.

That is, as shown in FIG. 4, in a first entity equipment 7 which performs the multimodal biometric authentication, the face matching process and the fingerprint matching process are performed in parallel, the decision fusion of the two matching results is made, and a first authentication context is output to the verifier. The first authentication context includes pieces of information on two "matching processes" and the one "decision fusion" and output information on "decision fusion result".

However, in the first authentication context, because the processing procedure between the two "matching processes" and "decision fusion" is ambiguous, the procedure of generating "decision fusion result" becomes ambiguous. Accordingly, as described above, in the case of the multimodal biometric authentication, the verifier cannot verify the validity of the series of process results from the authentication context. The same holds true for the multi-algorithm biometric authentication.

BRIEF SUMMARY OF THE INVENTION

In view of the foregoing, an object of the invention is to provide a system and a device for authentication, in which the validity of the series of processes can be verified from the authentication context even if the plural authentication processes are performed in parallel to make the decision fusion.

In a first aspect of the present invention, there is provided an entity equipment which is used in an authentication system including: an authentication device which verifies a plurality of authentication contexts including a process result of a biometric authentication subprocess based on secret information; a client device which transmits said each authentication context to the authentication device; and a plurality of pieces of entity equipment which individually generate said each authentication context to transmit the authentication context to the client device, the entity equipment comprising: a secret information retention device configured to retain the secret information; a reception device configured to receive process result identification information associated with a new process result in the own entity equipment, or a process result and process result identification information in another entity equipment from the client device; a first authentication subprocess performing device configured to be provided when the reception device receives process result identification information, and to perform a biometric authentication subprocess to generate a process result; a second authentication subprocess performing device configured to be provided when the reception device receives a process result and process result identification information, and to perform a biometric authentication subprocess to generate a new process result based on the process result received by the reception device; an output information block generation device configured to generate an output information block including the process result generated by the first or second authentication subprocess performing device and process result identification information associated with the process result; an input information block generation device configured to be provided when the reception device receives a process result and process result identification information, and to generate an input information block from the process result and the process result identification information; an authenticator block generation device configured to generate an authenticator block from all the information blocks generated by said each information block generation device based on the secret information in the secret information retention device; an authentication context generation device configured to generate an authentication context including all the information blocks and the authenticator block; and an authentication context transmission device configured to transmit the authentication context, the process result and the process result identification information to the client device, the process result and the process result identification information being included in the output information block.

In a second aspect of the present invention, there is provided an entity equipment which generates an authentication context to transmit the authentication context to an authentication device which verifies the authentication context based on secret information, the authentication context including a process result of a final-stage biometric authentication subprocess for making a decision fusion to process results of a plurality of biometric authentication subprocesses performed in parallel, the entity equipment comprising: a secret information retention device configured to retain the secret information; a plurality of first authentication subprocess performing devices configured to perform said plurality of biometric authentication subprocesses to generate a process result without using process results of other biometric authentication subprocesses; a second authentication subprocess performing device configured to perform the final-stage biometric authentication subprocess to generate a new process result using the process results of said plurality of biometric authentication subprocesses; a first authentication subprocess information storage device in which a first internal processing information block is stored, the first internal processing information block including an internal output information block and authentication subprocess processing information of each of said plurality of biometric authentication subprocesses, the internal output information block including process result identification information associated with the process result generated by each process; a second authentication subprocess information storage device in which a second internal processing information block is stored, the second internal processing information block including an internal input information block, an internal output information block, and authentication subprocess processing information of the final-stage biometric authentication subprocess, the internal input information block including process result identification information associated with the process result used in performing the process, the internal output information block including process result identification information associated with the process result generated by the process; an output information block generation device configured to generate the output information block including the process result generated by the final-stage biometric authentication subprocess and the process result identification information associated with the process result; an authenticator block generation device configured to generate an authenticator block from all the internal processing information blocks in said each process information storage device and the output information block generated in the output information block generation device based on the secret information in the secret information retention device; an authentication context generation device configured to generate an authentication context including all the internal processing information blocks, the output information block, and the authenticator block; and an authentication context transmission device configured to transmit the authentication context to the authentication device.

In a first aspect of the invention, the process result and the process result identification information are included in the output information block or input information block of the authentication context, so that the consistency of the process result, which is the output information, and the process result, which is the input information, can be confirmed through the same process result identification information among the authentication contexts. Therefore, the validity of the series of processes can be verified from the authentication context even if the plural authentication processes are performed in parallel to make the decision fusion.

In a second aspect of the invention, the output information block or input information block and the authentication subprocess processing information are included in the internal processing information blocks of the authentication context, and the process result identification information is included in the output information block or input information block. As a result, the processing sequence from the output information block toward the input information block can be confirmed through the same process result identification information among the internal processing information blocks of the authentication context, and processing contents can be confirmed by each piece of authentication subprocess processing information.

Accordingly, because the procedure of generating the process result (processing sequence and processing contents) can be confirmed, the validity of the series of processes can be verified from the authentication context, even if the plural authentication processes are performed in parallel to make the decision fusion.

BRIEF DESCRIPTION OF THE SEVERAL VIEWS OF THE DRAWING

FIG. 5 is a schematic view showing a configuration of an authentication system according to a first embodiment;

FIG. 6 is a schematic view showing a configuration of an authentication device according to the first embodiment;

FIG. 8 is a schematic view showing a configuration of third piece of entity equipment according to the first embodiment;

FIG. 13 is a sequence view for explaining an operation according to the first embodiment;

FIG. 14 is a schematic view showing an example of an associated process result according to the first embodiment;

FIG. 15 is a schematic view showing an effect of the first embodiment;

FIG. 16 is a schematic view showing a configuration of an authentication system according to a second embodiment;

FIG. 18 is a schematic view showing an example of an authentication process according to the second embodiment;

FIG. 20 is a schematic view showing an example of an authentication policy according to the second embodiment;

FIG. 21 is a sequence view for explaining an operation according to the second embodiment;

FIG. 33 is a schematic view showing an example of an authentication policy according to the third embodiment;

FIG. 36 is a schematic view showing an example of an associated process result according to the third embodiment; and FIG. 37 is a schematic view showing an example of an authentication subprocess associated by an internal system number or a system number in the third embodiment.

DETAILED DESCRIPTION OF THE INVENTION

Embodiments of the invention will be described below with reference to the drawings. Each of the following devices can be realized by either a hardware configuration or a combination of a hardware source and software. A program which is previously installed in a computer of the corresponding device from a network or a storage medium to realize a function of the corresponding device is used as the software in the combination.

(First Embodiment)

Figure 7:
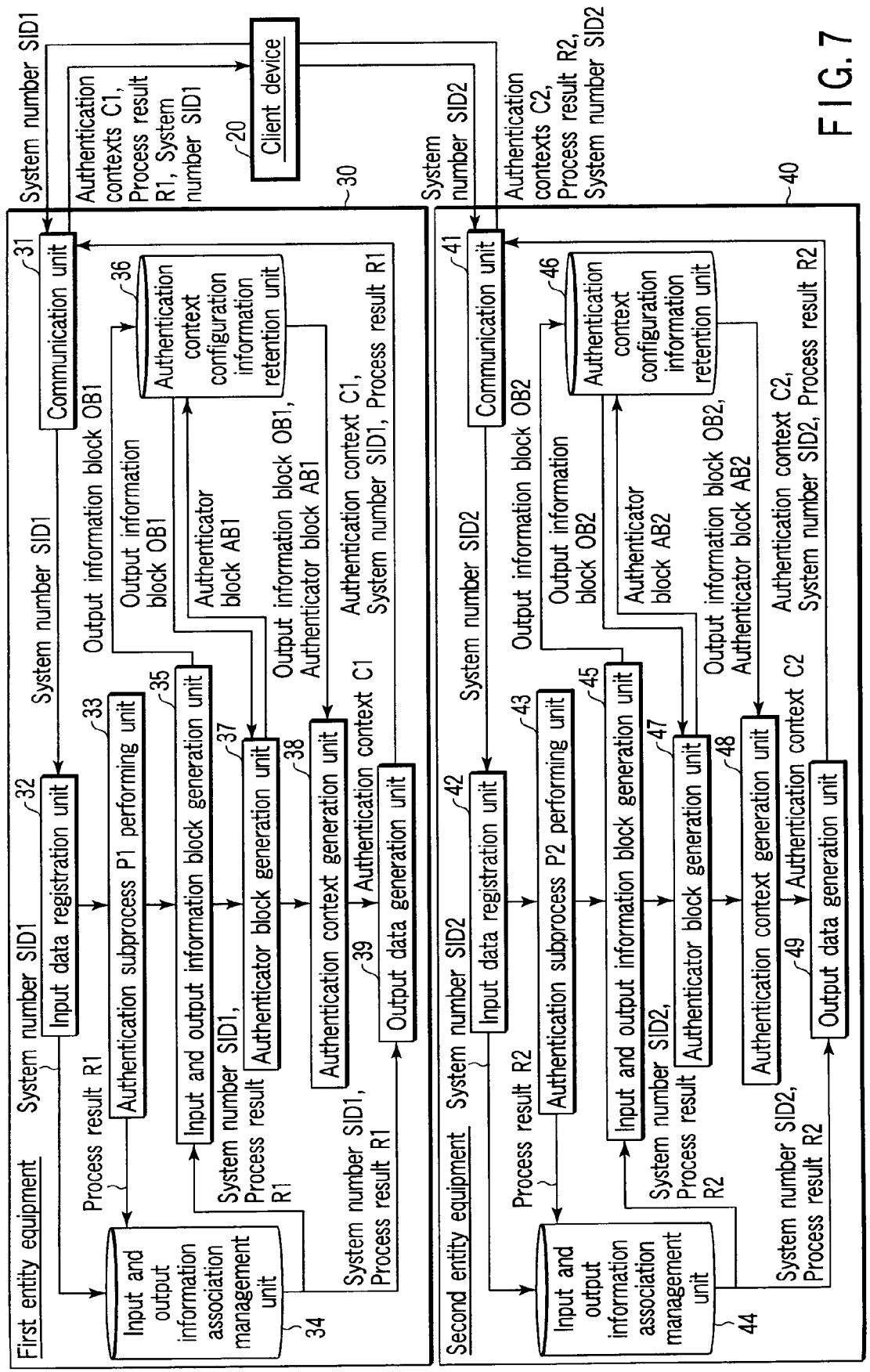
FIG. 7 is a schematic view showing configurations of first and second pieces of entity equipment according to the first embodiment.
Figure 9:
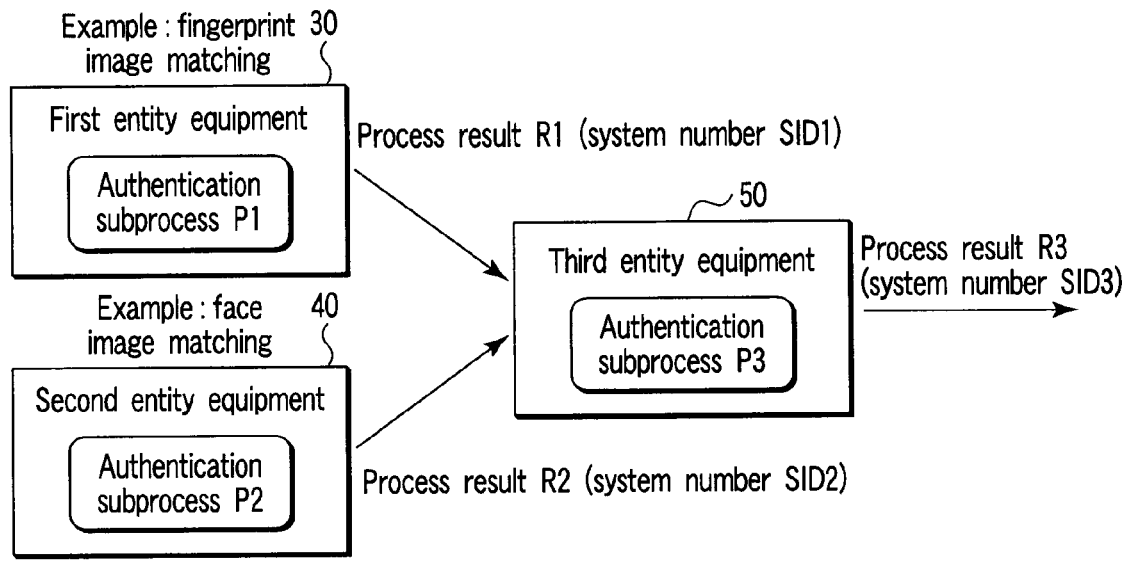
FIG. 9 is a schematic view showing an example of an authentication process according to the first embodiment.

FIG. 5 is a schematic view showing a configuration of an authentication system according to a first embodiment of the invention, FIG. 6 is a schematic view showing a configuration of an authentication device of the authentication system, FIG. 7 is a schematic view showing configurations of first and second pieces of entity equipment of the authentication system, and FIG. 8 is a schematic view showing a configuration of a third entity equipment of the authentication system. As shown in FIG. 9, a biometric authentication process in which plural pieces of biometric information are used (hereinafter referred to as authentication process) is configured by three authentication subprocesses P1, P2, and P3. FIG. 9 shows an example of the authentication process in which the authentication subprocess P3 is performed by referring to process results of the authentication subprocesses P1 and P2, thereby obtaining an authentication result as the process result of the authentication subprocess P3. For example, the authentication subprocess P1 is performed by a first entity equipment 30. For example, the authentication subprocess P2 is performed by a second entity equipment 40. For example, the authentication subprocess P3 is performed by a third entity equipment 50.

As used herein, each of the authentication subprocesses P1, P2, and P3 is a process which is a component of the authentication process. Specifically, the authentication subprocesses P1, P2, and P3 are each process when the overall authentication process is divided into sub-processes. In the case of the biometric authentication in which the plural pieces of biometric information are used, an easy-to-follow example of the authentication subprocesses P1 to P3 is one in which the authentication subprocess P1 performs the matching process with the fingerprint image as the biometric information, the authentication subprocess P2 performs the matching process with the face image as the biometric information, and the authentication subprocess P3 decides the authentication based on the matching results of the authentication subprocesses P1 and P2.

As identification information, a system number (process result identification information) is allocated to each of the process results input to the pieces of entity equipment 30 to 50 and each of the process results output from the pieces of entity equipment 30 to 50. For example, a system number SID1 is allocated to a process result R1 of the first entity equipment 30 which performs the matching process with a fingerprint image, a system number SID2 is allocated to a process result R2 of the second entity equipment 40 which performs the matching process with a face image, and a system number SID3 is allocated to a process result R3 of the third entity equipment 50 which performs decision fusion of the matching result with the fingerprint image and the matching result with the face image.

The authentication process is not limited to the three authentication subprocesses. Alternatively, the authentication process may be divided into four or more authentication subprocesses, and the authentication subprocesses may be performed by the different pieces of entity equipment 30 to 50. The system number is not necessarily allocated to each process result, but may separately be allocated to the type of biometric information or the type of algorithm. That is, a value with which the process result can uniquely be identified is allocated to the system number.

The authentication system of FIG. 5 includes an authentication device 10, a client device 20, a first entity equipment 30, a second entity equipment 40, and a third entity equipment 50.

(Authentication Device)

The authentication device 10 includes a communication unit 11, an authentication context retention unit 12, an authenticator block verification unit 13, a process result association unit 14, and a process result verification unit 15.

The communication unit 11 conducts communication between the client device 20 and the authentication device 10. The communication unit 11 has a function of receiving authentication contexts C1, C2, and C3 generated respectively by the first to third pieces of entity equipment 30 to 50 from the client device 20.

Figure 10:
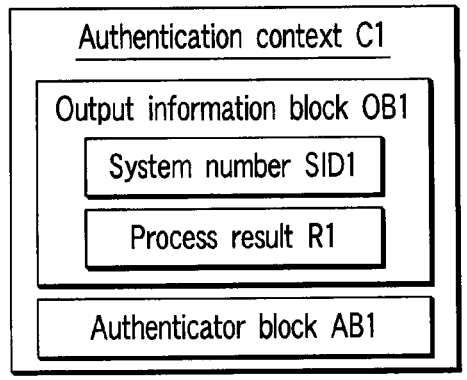
FIGS. 10 to 12 are schematic views showing a format of an authentication context according to the first embodiment.
Figure 11:
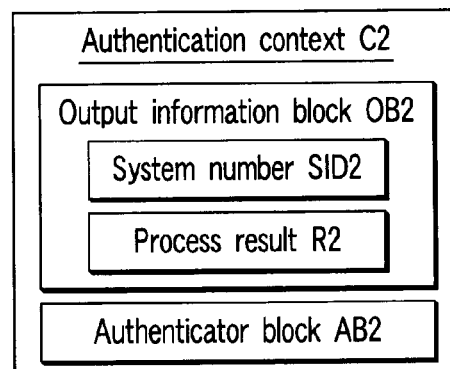
Figure 12:
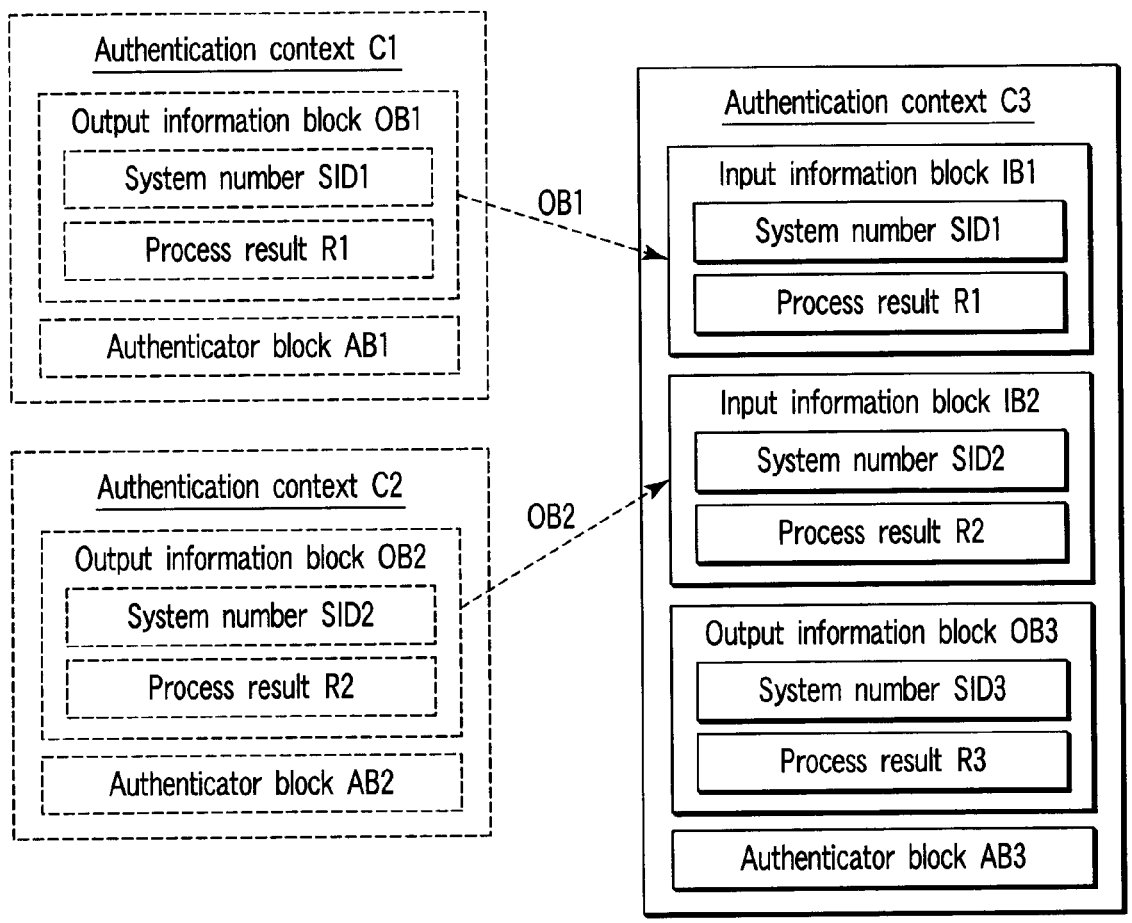

The authentication contexts C1, C2, and C3 are generated by the pieces of entity equipment 30 to 50 which perform the authentication subprocesses P1, P2, and P3. As shown in FIGS. 10 to 12, formats of the authentication contexts C1, C2, and C3 are formed by an input information block, an output information block, and an authenticator block. The process results input to the pieces of entity equipment 30 to 50 and the system numbers associated with the process results are described in the input information block. The process results output from the pieces of entity equipment and the system numbers associated with the process results are described in the output information block. Authenticators for the input information block and output information block are described in the authenticator block. The authenticators are generated with pieces of secret information possessed by the pieces of entity equipment 30 to 50.

At this point, an attribute of each block can be identified by each name. For example, in an output information block OB1, the attribute of "output information block" can be identified by "OB" of a name OB1. Similarly, for example, in an input information block IB1, the attribute of "input information block" can be identified by "IB" of a name IB1. In an authenticator block AB1, the attribute of "authenticator block" can be identified by "AB" of a name AB1. The same holds true for the following embodiments.

As used herein, the authenticator means a digital signature or a message authentication code (MAC). The pieces of entity equipment 30 to 50 retain private keys in a public key cryptosystem when the authenticator is the digital signature, and retain common keys previously shared with the authentication device when the authenticator is the message authentication code.

In the case where the pieces of entity equipment 30 to 50 have no input, the input information block is not included in the authentication contexts generated by the pieces of entity equipment 30 to 50. The authentication context does not always include one input information block and one output information block, but includes the same number of input information blocks and the same number of output information blocks as the process results when the pieces of entity equipment 30 to 50 input or output the plural process results.

Sometimes the biometric information is described in the process results included in the input information block and output information block, so that a process may be performed with a one-way function such as a hash function from the standpoint of privacy protection. However, in the case where the one-way function process is performed, it is necessary that the one-way function process be performed on all the process results having the same value. In the case where the process result to which the one-way function process has already been performed is required for the process of the authentication device 10, it is necessary for the communication unit 11 to have the function of receiving the process result R3 of the authentication subprocess P3 and the system number SID3 associated with the process result R3 from the client device 20 aside from the authentication contexts C1, C2, and C3. The presence or absence of the function is not particularly defined here.

The authentication context retention unit 12 has the function of retaining the authentication contexts C1, C2, and C3 received from the client device 20 by the communication unit 11, and also the function of retaining secret information for verifying the authenticator. The public keys of the pieces of entity equipment 30 to 50 in the public key cryptosystem are used as the secret information when the authenticator is a digital signature, and the common key previously shared with the pieces of entity equipment 30 to 50 is used when the authenticator is the message authentication code.

The authenticator block verification unit 13 verifies the authenticator blocks AB1 to AB3 of the authentication contexts C1 to C3 in the authentication context retention unit 12 based on the secret information in the authentication context retention unit 12.

Specifically, the authenticator block verification unit 13 has the function of extracting the authenticator blocks AB1, AB2, and AB3 from the authentication contexts C1 to C3 in the authentication context retention unit 12, and the function of verifying the authenticators described in the extracted authenticator blocks AB1, AB2, and AB3 based on the secret information in the authentication context retention unit 12.

On the basis of the system numbers SID1 and SID2 of the input information blocks IB1 and IB2 included in the authentication context C3 in the authentication context retention unit 12, the process result association unit 14 searches for the output information blocks OB1 and OB2 whose system numbers SID1 and SID2 are identical to those of the input information blocks IB1 and IB2 from the other authentication contexts C1 and C2 in the authentication context retention unit 12, and associates the process results R1 and R2 included in the input information blocks IB1 and IB2 with the process results R1 and R2 included in the searched output information blocks OB1 and OB2.

Specifically, the process result association unit 14 has the function of extracting the input information blocks IB1 and IB2 and the output information blocks OB1, OB2, and OB3 from all the authentication contexts C1, C2, and C3 in the authentication context retention unit 12, and the function of searching for the output information blocks OB1, OB2, and OB3 having the same system numbers as those described in the extracted input information blocks IB1 and IB2 and outputting the process results described in the input information blocks and the process results described in the corresponding output information blocks to the process result verification unit 15 while these process results are associated with one another.

The process result verification unit 15 verifies whether or not the two process results associated by the process result association unit 14 are equal to each other.

Specifically, the process result verification unit 15 has the function of referring to the output of the process result association unit 14 to verify whether or not all the associated process results are equal to each other.

The data change performed by an illegitimate user can be detected among the pieces of entity equipment 30 to 50 by verifying that the process results which are input and output among the pieces of entity equipment 30 to 50 while associated by the system number are equal to each other.

The authentication device 10 has the function of verifying that all the authentication contexts C1 to C3 are valid when the authenticator block verification unit 13 indicates that all the verification results are valid and, at the same time, when the process result verification unit 15 indicates that all the verification results are equal to one another.

(Client Device)

The client device 20 includes a first entity equipment communication unit 21, a second entity equipment communication unit 22, a third entity equipment communication unit 23, an authentication subprocess control unit 24, an identification information storage unit 25, and a communication unit 26.

The first entity equipment communication unit 21 conducts communication between the first entity equipment 30 and the client device 20. The first entity equipment communication unit 21 has the function of transmitting the system number SID1 associated with the process result of the authentication subprocess P1 to the first entity equipment 30, and the function of receiving the process result R1 of the authentication subprocess P1 and the system number SID1 associated with the process result R1 from the first entity equipment 30. The first entity equipment communication unit 21 also has the function of receiving the authentication context C1 generated by the first entity equipment 30.

The second entity equipment communication unit 22 conducts the communication between the second entity equipment 40 and the client device 20. The second entity equipment communication unit 22 has the function of transmitting the system number SID2 associated with the process result of the authentication subprocess P2 to the second entity equipment 40, and the function of receiving the process result R2 of the authentication subprocess P2 and the system number SID2 associated with the process result R2 from the second entity equipment 40. The second entity equipment communication unit 22 also has the function of receiving the authentication context C2 generated by the second entity equipment 40.

The third entity equipment communication unit 23 conducts the communication between the third entity equipment 50 and the client device 20. The third entity equipment communication unit 23 has the function of transmitting the process result R1 of the authentication subprocess P1 and the system number SID1 associated with the process result R1 to the third entity equipment 50, the function of transmitting the process result R2 of the authentication subprocess P2 and the system number SID2 associated with the process result R2 to the third entity equipment 50, and the function of transmitting the process result R3 of the authentication subprocess P3 and the system number SID3 associated with the process result R3 to the third entity equipment 50. The third entity equipment communication unit 23 also has the function of receiving the authentication context C3 generated by the third entity equipment 50.

The authentication subprocess control unit 24 has the function of transmitting the associated system numbers SID1 and SID2 from the entity equipment communication units 21 and 22 to the pieces of entity equipment 30 and 40 which generate the initial authentication contexts C1 and C2. The authentication subprocess control unit 24 also has the function of transmitting the associated system number SID3, "process result R1 and system number SID1", and "process result R2 and system number SID2" through the third entity equipment communication unit 23 to the entity equipment 50 which generates the next authentication context C3 by performing the authentication subprocess based on the process results R1 and R2, when the authentication subprocess control unit 24 receives "process result R1 and system number SID1" and "process result R2 and system number SID2" from the pieces of entity equipment 30 and 40. The authentication subprocess control unit 24 further has the function of transmitting all the authentication contexts C1 to C3 received from the pieces of entity equipment 30 to 50 to the authentication device 10 through the entity equipment communication units 21 to 23.

Specifically, the authentication subprocess control unit 24 controls procedures of the authentication subprocess performed by the pieces of entity equipment 30 to 50, and also controls the association of the system number with the process result input to and output from each authentication subprocess. The authentication subprocess control unit 24 has the function of transmitting the system number SID1 associated with the process result R1 of the authentication subprocess P1 to the first entity equipment communication unit 21 while referring to the identification information storage unit 25. The authentication subprocess control unit 24 also has the function of transmitting the system number SID2 associated with the process result R2 of the authentication subprocess P2 to the second entity equipment communication unit 22. The authentication subprocess control unit 24 further has the function of transmitting the process result R1 and system number SID1 associated with the process result R1, received by the first entity equipment communication unit 21, to the third entity equipment communication unit 23. The authentication subprocess control unit 24 further has the function of transmitting the process result R2 and system number SID2 associated with the process result R2, received by the second entity equipment communication unit 22, to the third entity equipment communication unit 23. The authentication subprocess control unit 24 further has the function of transmitting the system number SID3 associated with the process result R3 of the authentication subprocess P3 to the third entity equipment communication unit 23. The authentication subprocess control unit 24 further has the function of obtaining the authentication contexts C1, C2, and C3 from the entity equipment communication units 21 to 23 to transmit the contexts to the authentication device 10 through the communication unit 26.

The identification information storage unit 25 is a storage device whose data can be read by the authentication subprocess control unit 24. The system numbers (pieces of process result identification information) SID1 to SID3 associated with the process results unique to the pieces of entity equipment 30 to 50 are stored in the identification information storage unit 25.

The communication unit 26 conducts the communication between the authentication device 10 and the client device 20. The communication unit 26 has the function of transmitting the authentication contexts C1, C2, and C3 generated by the first to third pieces of entity equipment 30 to 50 to the authentication device 10.

(First Entity Equipment)

The first entity equipment 30 includes a communication unit 31, an input data registration unit 32, an authentication subprocess P1 performing unit 33, an input and output information association management unit 34, an input and output information block generation unit 35, an authentication context configuration information retention unit 36, an authenticator block generation unit 37, an authentication context generation unit 38, and an output data generation unit 39. The units 32, 33, 35, 37, 38, and 39 can also be realized as a sub-routine (partial program) executed by a control program (not shown) when the units 32, 33, 35, 37, 38, and 39 are realized by the computer program. The same holds true for the pieces of entity equipment 40 and 50.

The communication unit 31 conducts the communication between the client device 20 and the first entity equipment 30. The communication unit 31 has the function of receiving the system number SID1 associated with the process result R1 of the authentication subprocess P1 from the client device 20. The system number SID1 is output by the first entity equipment 30. The communication unit 31 also has the function of transmitting a set of the process result R1 of the authentication subprocess P1 performed in the first entity equipment 30 and the system number SID1 associated with the process result R1, and the authentication context C1 generated in the first entity equipment 30 to the client device 20.

The input data registration unit 32 has the function of registering the system number SID1 associated with the process result R1 in the input and output information association management unit 34. The process result R1 is output by the first entity equipment 30, and the system number SID1 is received by the communication unit 31.

The authentication subprocess P1 performing unit 33 has the function of performing the authentication subprocess P1 to generate the process result R1 of the authentication subprocess P1, and the function of transmitting the process result R1 to the input and output information association management unit 34. Because the process results R of other authentication subprocesses are not used in the authentication subprocess P1, the authentication subprocess P1 performing unit 33 is provided when the communication unit 31 receives the system number SID (in the process results R and system numbers SID).

The input and output information association management unit 34 has the function of managing the system number SID1 associated with the process result R1 while associating the system number SID1 with the process result R1 output by the entity equipment 30. The system number SID1 is input to the entity equipment 30.

The input and output information block generation unit 35 has the function of generating the output information block OB1 from the process result R1 retained in the input and output information association management unit 34 and the system number SID1 associated with the process result R1, and the function of transmitting the generated output information block OB1 to the authentication context configuration information retention unit 36.

The authentication context configuration information retention unit 36 has the function of retaining the blocks constituting the authentication context C1, and the function of keeping the secret information for generating the authenticator. The private key of the first entity equipment 30 in the public key cryptosystem is used as the secret information when the authenticator is the digital signature, and the common key previously shared with the authentication device 10 is used when the authenticator is the message authentication code.

The authenticator block generation unit 37 generates the authenticator block AB1 from the output information block OB1 generated by the input and output information block generation unit 35 based on the secret information in the authentication context configuration information retention unit 36.

Specifically, the authenticator block generation unit 37 has the function of generating the authenticator block AB1 by generating the authenticator for the output information block OB1 retained in the authentication context configuration information retention unit 36, and the function of transmitting the generated authenticator block AB1 to the authentication context configuration information retention unit 36.

The authentication context generation unit 38 has the function of generating the authentication context C1 from the output information block OB1 and authenticator block AB1 which are retained in the authentication context configuration information retention unit 36.

The output data generation unit 39 has the function of transmitting a set of the process result R1 retained in the input and output information association management unit 34 and the system number SID1 associated with the process result R1, and the authentication context C1 generated by the authentication context generation unit 38 in the form of the output of the entity equipment 30 to the communication unit 31. The communication unit 31 transmits the set of process result R1 and system number SID1, and the authentication context C1 to the client device 20.

(Second Entity Equipment)

The second entity equipment 40 includes a communication unit 41, an input data registration unit 42, an authentication subprocess P2 performing unit 43, an input and output information association management unit 44, an input and output information block generation unit 45, an authentication context configuration information retention unit 46, an authenticator block generation unit 47, an authentication context generation unit 48, and an output data generation unit 49.

The communication unit 41 conducts the communication between the client device 20 and the second entity equipment 40. The communication unit 41 has the function of receiving the system number SID2 associated with the process result R2 of the authentication subprocess P2 from the client device 20. The system number SID2 is output by the second entity equipment 40. The communication unit 41 also has the function of transmitting a set of the process result R2 of the authentication subprocess P2 performed in the second entity equipment 40 and the system number SID2 associated with the process result R2, and the authentication context C2 generated in the second entity equipment 40 to the client device 20.

The input data registration unit 42 has the function of registering the system number SID2 associated with the process result R2 in the input and output information association management unit 44. The process result R2 is output by the second entity equipment 40, and the system number SID2 is received by the communication unit 41.

The authentication subprocess P2 performing unit 43 has the function of performing the authentication subprocess P2 to generate the process result R2 of the authentication subprocess P2, and the function of transmitting the process result R2 to the input and output information association management unit 44. Because the process results R of other authentication subprocesses are not used in the authentication subprocess P2, the authentication subprocess P2 performing unit 43 is provided when the communication unit 41 receives the system number SID (in the process results R and system numbers SID).

The input and output information association management unit 44 has the function of managing the system number SID2 associated with the process result R2 while associating the system number SID2 with the process result R2 output by the entity equipment 40. The system number SID2 is input to the entity equipment 40.

The input and output information block generation unit 45 has the function of generating the output information block OB2 from the process result R2 retained in the input and output information association management unit 44 and the system number SID2 associated with the process result R2, and the function of transmitting the generated output information block OB2 to the authentication context configuration information retention unit 46.

The authentication context configuration information retention unit 46 has the function of retaining the blocks constituting the authentication context C2, and the function of keeping the secret information for generating the authenticator. The private key of the second entity equipment 40 in the public key cryptosystem is used as the secret information when the authenticator is the digital signature, and the common key previously shared with the authentication device 10 is used when the authenticator is the message authentication code.

The authenticator block generation unit 47 generates the authenticator block AB2 from the output information block OB2 generated by the input and output information block generation unit 45 based on the secret information in the authentication context configuration information retention unit 46.

Specifically, the authenticator block generation unit 47 has the function of generating the authenticator block AB2 by generating the authenticator for the output information block OB2 retained in the authentication context configuration information retention unit 46, and the function of transmitting the generated authenticator block AB2 to the authentication context configuration information retention unit 46.

The authentication context generation unit 48 has the function of generating the authentication context C2 from the output information block OB2 and authenticator block AB2 in the authentication context configuration information retention unit 46.

The output data generation unit 49 has the function of transmitting a set of the process result R2 retained in the input and output information association management unit 44 and the system number SID2 associated with the process result R2, and the authentication context C2 generated by the authentication context generation unit 48 in the form of the output of the entity equipment 40 to the communication unit 41. The communication unit 41 transmits the set of process result R2 and system number SID2, and the authentication context C2 to the client device 20.

(Third Entity Equipment)

The third entity equipment 50 includes a communication unit 51, an input data registration unit 52, an authentication subprocess P3 performing unit 53, an input and output information association management unit 54, an input and output information block generation unit 55, an authentication context configuration information retention unit 56, an authenticator block generation unit 57, an authentication context generation unit 58, and an output data generation unit 59.

The communication unit 51 conducts the communication between the client device 20 and the third entity equipment 50. The communication unit 51 has the function of receiving the set of process result R1 of the authentication subprocess P1 and system number SID1 associated with the process result R1, the set of process result R2 of the authentication subprocess P2 and system number SID2 associated with the process result R2, and the system number SID3 associated with the process result R3 of the authentication subprocess P3 from the client device 20. The process result R1 is output from the first entity equipment 30, the process result R2 output from the second entity equipment 40, and the process result R3 is output from the third entity equipment 50. The communication unit 41 also has the function of transmitting a set of the process result R3 of the authentication subprocess P3 performed in the third entity equipment 50 and the system number SID3 associated with the process result R3 and the authentication context C3 generated in the third entity equipment 50 to the client device 20.

The input data registration unit 52 has the function of registering the set of process result R1 and system number SID1, the set of process result R2 and system number SID2, and the system number SID3 in the input and output information association management unit 54. The set of process result R1 and SID1 and the set of process result R2 and SID2 are received by the communication unit 51.

The authentication subprocess P3 performing unit 53 has the function of performing the authentication subprocess P3 to output the process result R3 of the authentication subprocess P3 while referring to the process results R1 and R2 in the input and output information association management unit 54, and the function of transmitting the process result R3 to the input and output information association management unit 54. For example, in the case where the process result R1 is the matching process result with the fingerprint image while the process result R2 is the matching process result with the face image, the authentication subprocess P3 outputs the process result of "successful authentication" only when both the matching process results are "successful", and the authentication subprocess P3 outputs the process result R3 of "failed authentication" in other cases.

Because the process results R1 and R2 of other authentication subprocesses P1 and P2 are used in the authentication subprocess P3, the authentication subprocess P3 performing unit 53 is provided when the communication unit 51 receives the process result R1 and system number SID1, and the process result R2 and system number SID2.

The input and output information association management unit 54 has the function of managing the set of process result R1 and system number SID1, the set of process result R2 and system number SID2, and the system number SID3 while associating the set of process result R1 and system number SID1, the set of process result R2 and system number SID2, and the system number SID3 with the process result R3 written from the authentication subprocess P3 performing unit 53. The set of process result R1 and system number SID1 and the set of process result R2 and system number SID2 are written from the input data registration unit 52.

The input and output information block generation unit 55 has the function of generating the input information blocks IB1 and IB2 from the set of process result R1 and system number SID1 and the set of process result R2 and system number SID2, respectively, in the input and output information association management unit 54. The input and output information block generation unit 55 also has the function of generating the output information block OB3 from the set of process result R3 and system number SID3 associated with the process result R3 in the input and output information association management unit 54. The input and output information block generation unit 55 further has the function of transmitting the generated input information blocks IB1 and IB2 and output information block OB3 to the authentication context configuration information retention unit 56.

In the input and output information block generation unit 55, the function of generating the input information blocks IB1 and IB2 is provided when the communication unit 51 receives the process result R1, the system number SID1, the process result R2, and the system number SID2, because the process results R1 and R2 of the authentication subprocesses P1 and P2 are used in the authentication subprocess P3.

The authentication context configuration information retention unit 56 has the function of retaining the blocks constituting the authentication context C3, and the function of keeping the secret information for generating the authenticator. The private key of the third entity equipment 50 in the public key cryptosystem is used as the secret information when the authenticator is the digital signature, and the common key previously shared with the authentication device 10 is used when the authenticator is the message authentication code.

The authenticator block generation unit 57 generates the authenticator block AB3 from all the information blocks IB1, IB2, and OB3 generated by the input and output information block generation unit 55 based on the secret information in the authentication context configuration information retention unit 56.

Specifically, the authenticator block generation unit 57 has the function of generating the authenticator block AB3 by generating the authenticators for the input information blocks IB1 and IB2 generated in the input and output information block generation unit 55 and the output information block OB3, and the function of transmitting the generated authenticator block AB3 to the authentication context configuration information retention unit 56.

The authentication context generation unit 58 has the function of generating the authentication context C3 from the input information blocks IB1 and IB2, output information block OB3, and authenticator block AB3 in the authentication context configuration information retention unit 56.

The output data generation unit 59 has the function of transmitting the set of process result R3 retained in the input and output information association management unit 54 and the system number SID3 associated with the process result R3, and the authentication context C3 generated by the authentication context generation unit 58 in the form of the output of the entity equipment 50 to the communication unit 51. The communication unit 51 transmits the set of process result R3 and system number SID3, and the authentication context C3 to the client device 20.

Although each of the pieces of entity equipment 30 to 50 outputs the one process result in the first embodiment, each of the pieces of entity equipment 30 to 50 may output plural process results. In such cases, because it is necessary that the system numbers are separately allocated to the process results output from the pieces of entity equipment 30 to 50, the client device 20 transmits the system numbers associated with the process results, and the pieces of entity equipment 30 to 50 output the process results while associated with the system numbers transmitted from the client device 20 respectively.

In addition to the information shown in the first embodiment, additional information on the authentication subprocess or the entity equipment, challenge data for keeping the security, and the like may be described in the authentication contexts C1, C2, and C3. In such cases, desirably the authenticator block generation units 37, 47, and 57 generate the authenticators including such pieces of information.

(System Operation)

Next, an operation of the authentication system having the above configuration will be described with reference to a sequence view of FIG. 13.

In the client device 20, the authentication subprocess control unit 24 transmits the system number SID1 associated with the process result of the authentication subprocess P1 to the first entity equipment 30 through the first entity equipment communication unit 21 (ST1). At this point, the system numbers transmitted to the entity equipment 30 to 50 by the authentication subprocess control unit 24 and a processing procedure thereof are previously determined and stored in the identification information storage unit 25.

In the first entity equipment 30, the input data registration unit 32 registers the system number SID1 received from the communication unit 31 in the input and output information association management unit 34.

The authentication subprocess P1 performing unit 33 performs the authentication subprocess P1 to generate the process result R1 (ST2), and transmits the process result R1 to the input and output information association management unit 34.

The input and output information association management unit 34 retains the process result R1 while associating the process result R1 with the system number SID1.

The input and output information block generation unit 35 generates the output information block OB1 from both the process result R1 in the input and output information association management unit 34 and the system number SID1 associated with the process result R1, and retains the output information block OB1 in the authentication context configuration information retention unit 36.

The authenticator block generation unit 37 generates the authenticator block AB1 compatible with a form of the authentication context for the output information block OB1 in the authentication context configuration information retention unit 36, and retains the authenticator block AB1 in the authentication context configuration information retention unit 36.

The authentication context generation unit 38 generates the authentication context C1 from the output information block OB1 and authenticator block AB1 in the authentication context configuration information retention unit 36, and transmits the authentication context C1 to the output data generation unit 39 (ST3).

The output data generation unit 39 combines the set of process result R1 and system number SID1 in the input and output information association management unit 34 and the obtained authentication context C1, and transmits the combined data to the client device 20 through the communication unit 31 (ST4). Alternatively, the process result R1 and the system number SID1 may be transmitted to the client device 20 separately from the authentication context C1.

In the client device 20, the authentication subprocess control unit 24 receives the set of process result R1 and system number SID1, and the authentication context C1 through the first entity equipment communication unit 21.

In the first embodiment, although the set of process result and system number associated with the process result is used in the data transmitted and received among the pieces of entity equipment 30 to 50, the data may be transmitted and received using the authentication context.

The authentication subprocess control unit 24 stores the received authentication context C1 and the received set of the process result R1 and associated system number SID1 in the identification information storage unit 25.

Alternatively, the authentication context C1 may not be stored in the identification information storage unit 25, but may be transmitted to the communication unit 26. That is, it is only necessary to transmit all the authentication contexts generated by the pieces of entity equipment 30 to 50 in the authentication process to the authentication device 10.

Then, the authentication subprocess control unit 24 transmits the system number SID2 associated with the process result of the authentication subprocess P2 to the second entity equipment 40 through the second entity equipment communication unit 22 (ST5).

In the second entity equipment 40, the input data registration unit 42 registers the system number SID2 received from the communication unit 41 in the input and output information association management unit 44.

The authentication subprocess P2 performing unit 43 performs the authentication subprocess P2 to output the process result R2 (ST6), and transmits the process result R2 to the input and output information association management unit 44.

The input and output information association management unit 44 retains the process result R2 while associating the process result R2 with the system number SID2.

The input and output information block generation unit 45 generates the output information block OB2 from both the process result R2 in the input and output information association management unit 44 and the system number SID2 associated with the process result R2, and retains the output information block OB2 in the authentication context configuration information retention unit 46.

The authenticator block generation unit 47 generates the authenticator block AB2 compatible with the form of the authentication context for the output information block OB2 in the authentication context configuration information retention unit 46, and retains the authenticator block AB2 in the authentication context configuration information retention unit 46.

The authentication context generation unit 48 generates the authentication context C2 from the output information block OB2 and authenticator block AB2 in the authentication context configuration information retention unit 46, and transmits the authentication context C2 to the output data generation unit 49 (ST7).

The output data generation unit 49 combines the set of process result R2 and system number SID2 in the input and output information association management unit 44 and the obtained authentication context C2, and transmits the combined data to the client device 20 through the communication unit 41 (ST8). Alternatively, the process result R2 and the system number SID2 may be transmitted to the client device 20 separately from the authentication context C2.

In the client device 20, the authentication subprocess control unit 24 receives the set of process result R2 and system number SID2, and the authentication context C2 through the second entity equipment communication unit 22.

The authentication subprocess control unit 24 stores the received authentication context C2 in the identification information storage unit 25.

Then, the authentication subprocess control unit 24 transmits the received set of the process result R2 and system number SID2, the stored set of the process result R1 and system number SID1, and the system number SID3 associated with the process result of the authentication subprocess P3 to the third entity equipment 50 through the third entity equipment communication unit 23 (ST9).

In the third entity equipment 50, the input data registration unit 52 obtains the set of process result R1 and system number SID1, the set of process result R2 and system number SID2, and the system number SID3 through the communication unit 51, and registers the set of process result R1 and system number SID1, the set of process result R2 and system number SID2, and the system number SID3 in the input and output information association management unit 54.

The authentication subprocess P3 performing unit 53 performs the authentication subprocess P3 to output the process result R3 while referring to the process result R1 and process result R2 in the input and output information association management unit 54 (ST10), and transmits the process result R3 to the input and output information association management unit 54.

The input and output information association management unit 54 retains the process result R3 while associating the process result R3 with the system number SID3.

The input and output information block generation unit 55 generates the input information blocks IB1 and IB2 from both the set of process result R1 and system number SID1 and the set of process result R2 and system number SID2 in the input and output information association management unit 54. The input and output information block generation unit 55 generates the output information block OB3 from the set of process result R3 and system number SID3. The input and output information block generation unit 55 retains the input information blocks IB1 and IB2 and the output information block OB3 in the authentication context configuration information retention unit 56.

The authenticator block generation unit 57 generates the authenticator block AB3 compatible with the form of the authentication context for the input information blocks IB1 and IB2 and output information block OB3 in the authentication context configuration information retention unit 56, and retains the authenticator block AB3 in the authentication context configuration information retention unit 56.

The authentication context generation unit 58 generates the authentication context C3 from the input information blocks IB1 and IB2, output information block OB3, and authenticator block AB3 in the authentication context configuration information retention unit 56, and transmits the authentication context C3 to the output data generation unit 59 (ST11).

The output data generation unit 59 transmits the obtained authentication context C3 to the client device 20 through the communication unit 51 (ST12). In the case where the client device 20 or the authentication device 10 requires the process result R3 aside from the authentication context, the process result R3 and the system number SID3 associated with the process result R3 which are managed by the input and output information association management unit 54 may be transmitted to the client device 20.

In the client device 20, the authentication subprocess control unit 24 receives the authentication context C3 through the third entity equipment communication unit 23. In the case where the set of process result R3 and system number SID3 of the authentication subprocess P3 is transmitted from the third entity equipment 50, the authentication subprocess control unit 24 also receives the set of process result R3 and system number SID3.

In the case where the set of process result R3 and system number SID3, the authentication context C3, and the authentication contexts C1 and C2 are stored, the authentication subprocess control unit 24 transmits the set of process result R3 and system number SID3 and the authentication context C3 to the communication unit 26 along with the authentication contexts C1 and C2.

The communication unit 26 transmits the obtained authentication contexts C1, C2, and C3 to the authentication device 10 (ST13). At this point, in the case where the communication unit 26 receives the set of process result R3 and system number SID3 associated with the process result R3 from the entity equipment 50 while the authentication device 10 needs the process result R3, the communication unit 26 also transmits the set of process result R3 and system number SID3 to the authentication device 10.

In the authentication device 10, the communication unit 11 receives the authentication contexts C1, C2, and C3 from the client device 20, and stores the authentication contexts C1, C2, and C3 in the authentication context retention unit 12. In the case where the set of process result R3 and system number SID3 associated with the process result R3 is transmitted from the client device 20, the communication unit 11 also receives the set of process result R3 and system number SID3.

The authenticator block verification unit 13 extracts the authenticator blocks AB1, AB2, and AB3 from all the authentication contexts C1, C2, and C3 in the authentication context retention unit 12, and verifies the authenticators described in the authenticator blocks AB1, AB2, and AB3 (ST14).

The process result association unit 14 extracts the input information blocks IB1 and IB2 and output information blocks OB1, OB2, and OB3 from the authentication contexts C1, C2, and C3 in the authentication context retention unit 12. The process result association unit 14 searches for the output information block having the same system number as the system number described in each extracted input information block. The process result association unit 14 outputs the process result included in the input information block and the process result included in the output information block while associating the process results with each other as shown in FIG. 14 (ST15).

The process result verification unit 15 refers to the set of process results associated by the process result association unit, and verifies that the process results that have the same value (ST16).

In the case where the communication unit 11 receives the process result R3 and the system number SID3 associated with the process result R3 from the client device 20 aside from the authentication context, the process result verification unit 15 searches for the output information block having the same system number as the system number SID3 associated with the received process result R3, and may verify that the received process result R3 has the same value as the process result R3 included in the output information block.

At this point, regarding the order of performing the functional units in the authentication device 10, the order of performing the authenticator block verification unit 13 is not defined as long as the process result verification unit 15 is performed after performing the process result association unit 14. That is, in the first embodiment, although the authenticator block verification unit 13 is initially performed, the authenticator block verification unit 13 may be performed at the end. Another verification process may be performed in the authentication device 10.

As described above, the first embodiment has the configuration in which the process result and the system number (process result identification information) are included in the output information block or input information block of the authentication context, so that the consistency of the process result which is the output information and the process result which is the input information can be confirmed through the same system number among the authentication contexts. Therefore, even if plural authentication processes are performed in parallel to make the decision fusion, the validity of the series of processes can be verified from the authentication context.

In addition, the system numbers SID1, SID2, and SID3 are allocated to the process results R1, R2, and R3 transmitted and received among the pieces of entity equipment 30 to 50 respectively, and the system numbers SID1, SID2, and SID3 and the process results R1, R2, and R3 are described in the authentication contexts C1, C2, and C3. As a result, the consistency of the process results R1 and R2 transmitted and received among the pieces of entity equipment 30 to 50 can be confirmed in the authentication device 10.

Figure 1:
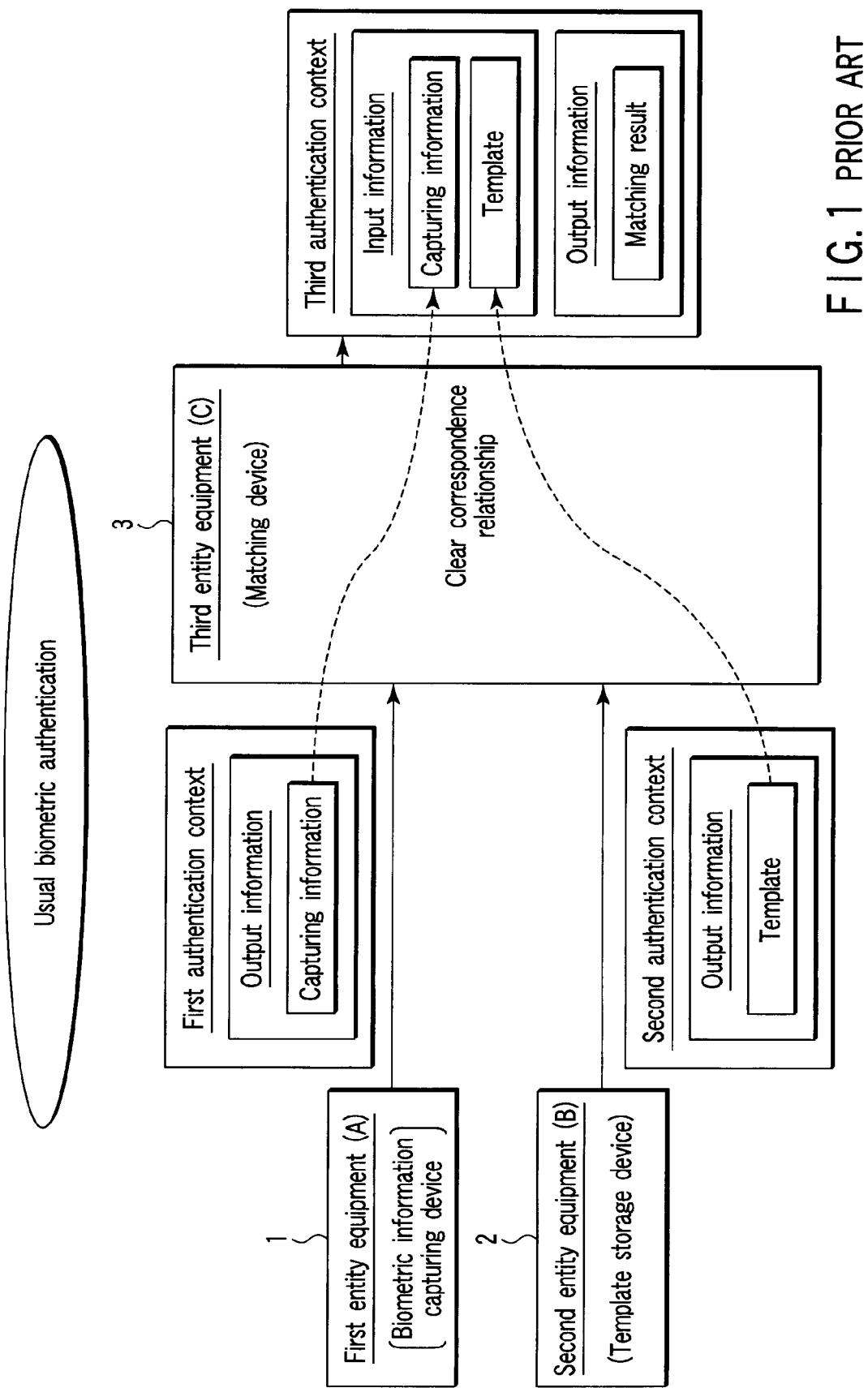
FIGS. 1 and 2 are schematic views for explaining a conventional problem 1.
Figure 2:
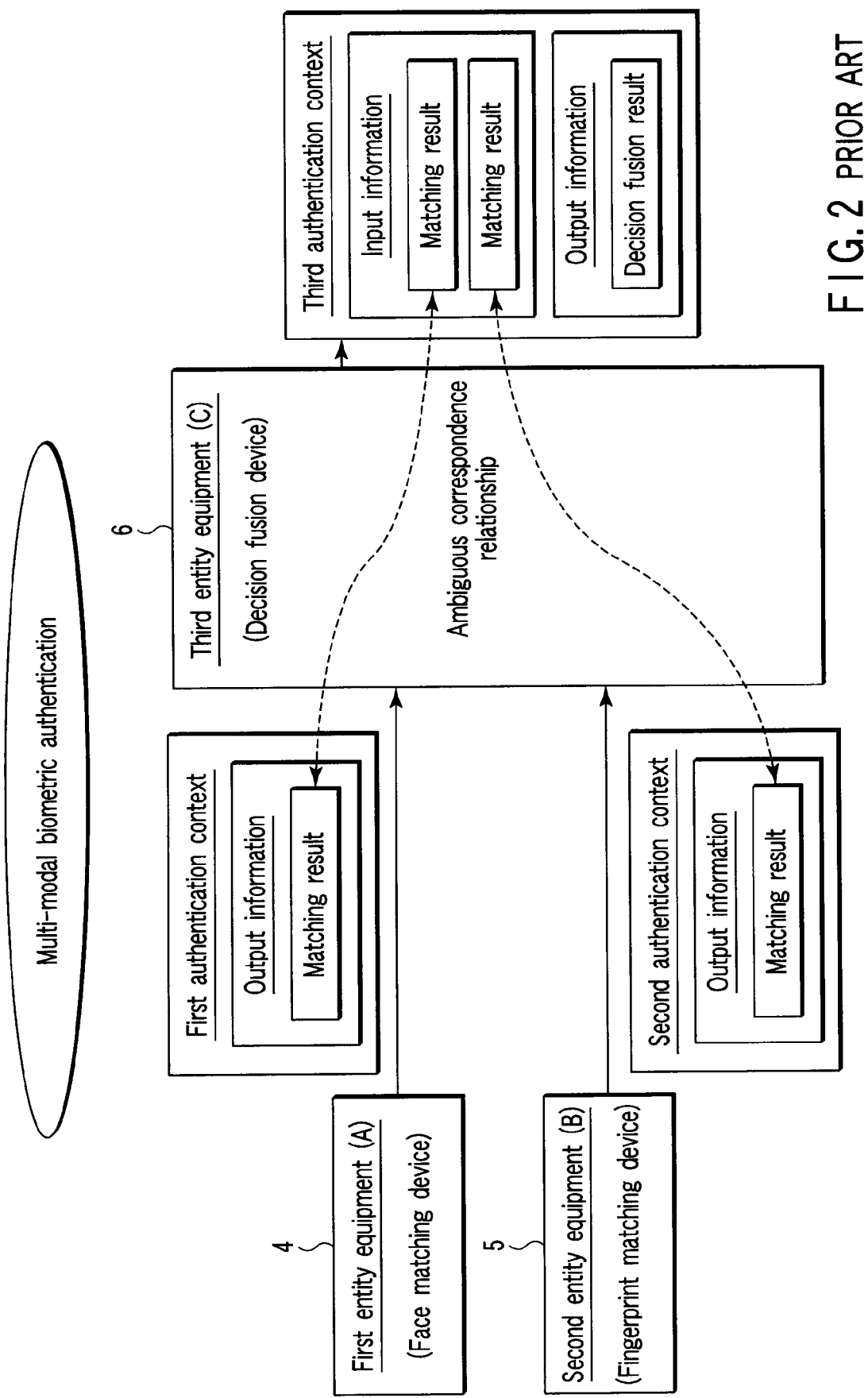
Figure 3:
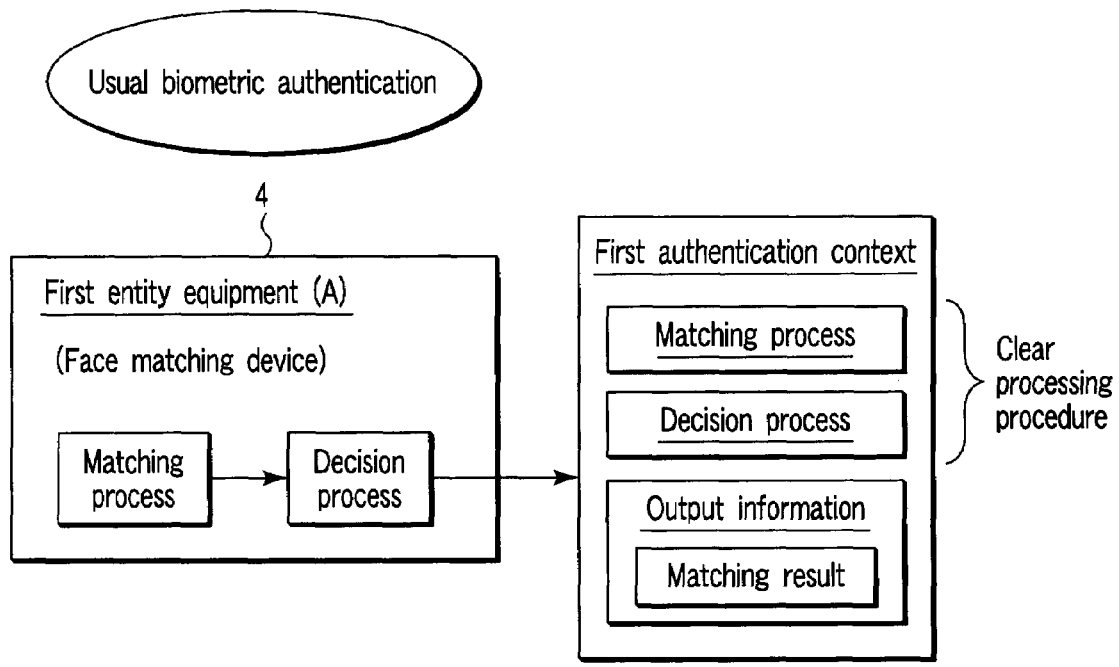
FIGS. 3 and 4 are schematic views for explaining a conventional problem 2.

For example, unlike the pieces of entity equipment 4 to 6 shown in FIG. 2, in the pieces of entity equipment 4' to 6' of FIG. 15 to which the first embodiment is applied, the association between the matching result (process result) of each of the first and second authentication contexts and the matching result (process result) of the third authentication context becomes apparent by each of the pieces of identification information (system numbers SID1 and SID2), so that a verifier can confirm the consistency of the matching results.

Accordingly, in an open network environment, even if the plural authentication processes are performed in parallel to make the decision fusion, as in the multimodal biometric authentication system and multi-algorithm biometric authentication system formed by the plural pieces of entity equipment 30 to 50, the verifier can verify the validity of the series of processes from the authentication context, which enhances the accuracy of identity verification in an open network environment.

(Second Embodiment)

Figure 17:
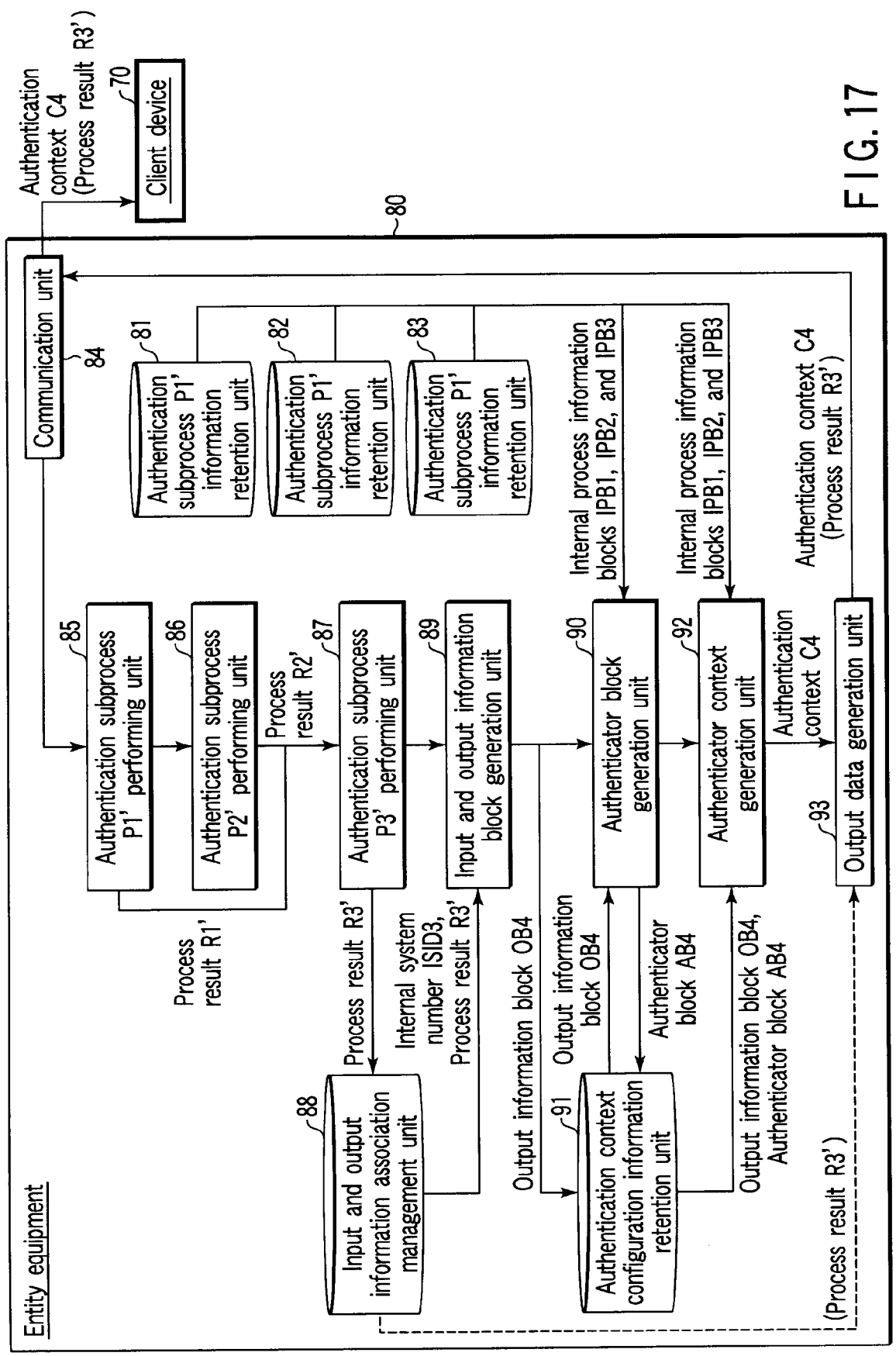
FIG. 17 is a schematic view showing a configuration of entity equipment according to the second embodiment.

FIG. 16 is a schematic view showing a configuration of an authentication system according to a second embodiment of the invention, and FIG. 17 is a schematic view showing a configuration of an entity equipment of the system. As with the first embodiment, an authentication process of the second embodiment is formed by three processes: an authentication subprocess P1', an authentication subprocess P2', and an authentication subprocess P3', as shown in FIG. 18. However, in the second embodiment, all the authentication subprocesses, P1', P2', and P3', are performed by the one piece of entity equipment.

As identification information, an internal system number is allocated to each of the process results input to the authentication subprocesses and each of the process results output from the authentication subprocesses. For example, an internal system number ISID1 is allocated to a process result R1' of the authentication subprocess P1' for performing the matching process with the fingerprint image. An internal system number ISID2 is allocated to a process result R2' of the authentication subprocess P2' for performing the matching process with the face image. An internal system number ISID3 is allocated to a process result R3' of the authentication subprocess P3' for performing the decision fusion of the matching result with the fingerprint image and the matching result with the face image.

The authentication system of FIG. 16 includes an authentication device 60, a client device 70, and a entity equipment 80. The authentication system may have a configuration in which the client device 70 is omitted and the authentication device 60 and the entity equipment 80 conduct communication with each other.

(Authentication Device)

The authentication device 60 includes an authentication policy retention unit 61, a communication unit 62, an authentication context retention unit 63, an authenticator block verification unit 64, an internal processing procedure re-creation unit 65, and an internal processing procedure verification unit 66.

The authentication policy retention unit 61 retains two pieces of authentication subprocess processing information, (PI1, PI3) or (PI2, PI3), on the two consecutively performed authentication subprocesses (P1', P3') or (P2', P3') in the authentication subprocesses P1' to P3' performed by the entity equipment 80 while associating the two pieces of authentication subprocess processing information (PI1, PI3) or (PI2, PI3) with each other.

Specifically, the authentication policy retention unit 61 has the function of retaining a procedure of the authentication subprocess to be performed in the authentication process as an authentication policy. For example, as shown in FIG. 20, the authentication policy expresses the processing procedure of the authentication subprocess performed in the authentication process using a set of subprocess processing information associated with the authentication subprocess for outputting a certain process result and subprocess processing information associated with the authentication subprocess for inputting the process result.

The communication unit 62 conducts communication between the client device 70 and the authentication device 60. The communication unit 62 has the function of receiving an authentication context C4 generated by the entity equipment 80 from the client device 70.

Figure 19:
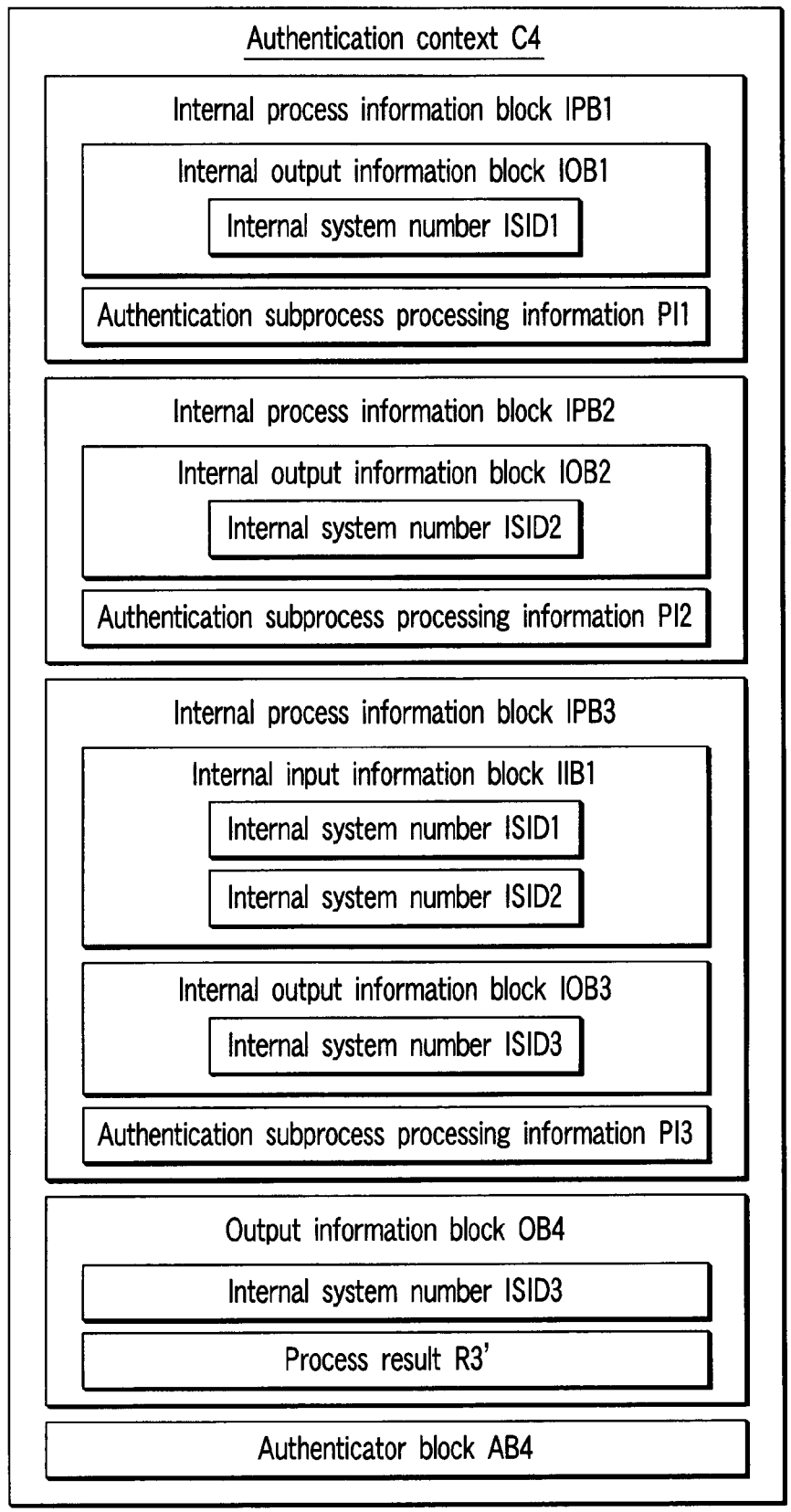
FIG. 19 is a schematic view showing a format of an authentication context according to the second embodiment.

The authentication context C4 is generated by the entity equipment 80 which performs the authentication subprocesses P1, P2, and P3. As shown in FIG. 19, the format of the authentication context C4 is formed by an internal input information block, an internal output information block, authentication subprocess processing information, an internal processing information block, an input information block, an output information block, an internal processing information block, and an authenticator block. The internal system number associated with the process result input to the authentication subprocess is described in the internal input information block with respect to the authentication subprocesses P1', P2', and P3' performed in the entity equipment 80. The internal system number associated with the process result output from the authentication subprocess is described in the internal output information block. The authentication subprocess processing information is information on the authentication subprocess. The internal input block, the internal output information block, and the authentication subprocess processing information are described in the internal processing information block. The process result input to the entity equipment 80 and the internal system number associated with the process result are described in the input information block. The process result output from the entity equipment 80 and the internal system number associated with the process result are described in the output information block. Authenticators for the input information block, the output information block, the internal processing information block, the input information block, and the output information block are described in the authenticator block. The authenticators are generated with secret information possessed by the entity equipment 80.

At this point, an attribute of each block can be identified by each name. For example, in an internal processing information block IPB1, the attribute of "internal processing information block" can be identified by "IPB" of a name IPB1. The same holds true for an internal output information block IOB1 and an internal input information block IIB1. The same also holds true for the following embodiments.

As used herein, the authenticator means a digital signature or a message authentication code (MAC). The entity equipment 80 retains the private key in the public key cryptosystem when the digital signature is used as the authenticator, and retains the common key previously shared with the authentication device when the message authentication code is used as the authenticator.

The authentication subprocess processing information described in the internal processing information block means information on the authentication subprocess. The authentication subprocess processing information means information to which, for example, "biometric information obtaining process" or "matching process" for indicating the type of the authentication subprocess and "fingerprint image" or "face image" for indicating the type of the biometric information dealt with by the authentication subprocess are added. The authentication subprocess processing information also means information to which information for indicating an ability of the authentication subprocess is added if desired.

The authentication subprocess processing information means information which includes function specification information for specifying the function of the authentication subprocess in the pieces of information on the authentication subprocess. The authentication subprocess processing information may include appendix information such as the accuracy if desired. For example, the function specification information is a process name or a function name. Any piece of information, such as information (for example, input and output information name) equivalent to the process name/function name, can be used as the function specification information, and any piece of information can be used as long as the information can finally specify the function. Any piece of information such as the accuracy (security evaluation information), safety, FRR (false rejection rate), FAR (false acceptance rate), sensor resolution, and the algorithm can be used as the appendix information.

In the case where the entity equipment 80 has no input, the input information block is not included in the authentication context generated by the entity equipment 80. The authentication context does not always include one input information block and one output information block, but the authentication context includes the same number of input information blocks and the same number of output information blocks as the process results when the entity equipment 80 inputs or outputs the plural process results. Similarly, the authentication context does not always include one internal processing information block, but the authentication context includes the same number of internal processing information blocks as the authentication subprocesses when the plural authentication subprocesses are performed in the entity equipment 80.

Sometimes the biometric information is described in the process results included in the input information block and output information block, so that the process may be performed with the one-way function such as the hash function from the standpoint of privacy protection. However, in the case where the one-way function process is performed, it is necessary that the one-way function process be performed on all the process results having the same value. In the case where the process result to which the one-way function process has already been performed is required for the process of the authentication device 60, it is necessary for the communication unit 62 to separate the function of receiving the process result R3' of the authentication subprocess P3' from the client device 70 from the authentication context C4. However, the presence or absence of the function is not particularly defined here.

The authentication context retention unit 63 has the function of retaining the authentication context C4 received from the client device 70 by the communication unit 62, and the function of retaining the secret information for verifying the authenticator.

The authenticator block verification unit 64 verifies the authenticator block included in the authentication context in the authentication context retention unit 63 based on the secret information in the authentication context retention unit 63.

Specifically, the authenticator block verification unit 64 has the function of extracting the authenticator block AB4 from the authentication context C4 retained in the authentication context retention unit 63, and the function of verifying the authenticator described in the extracted authenticator block AB4 based on the secret information.

The internal processing procedure re-creation unit 65 has the function of extracting all the internal processing information blocks IPB1, IPB2, and IPB3 from the authentication context retained in the authentication context retention unit 63. The internal processing procedure re-creation unit 65 also has the function of searching for the internal output information block having described therein the internal system number having the same value as the internal system number described in the internal input information block in the extracted internal processing information blocks IPB1, IPB2, and IPB3, and outputting the authentication subprocess processing information described in the internal processing information block including the internal input information block and the authentication subprocess processing information described in the internal processing information block including the internal output information block while associating the pieces of authentication subprocess processing information with each other.

In the second embodiment, the procedure of the authentication subprocess performed in the entity equipment 80 which generates the authentication context C4 is expressed by associating the same internal system number with the internal processing information block having the internal input information block and the internal output information block.

The internal processing procedure verification unit 66 has the function of verifying whether or not the processing procedure of the authentication subprocess output from the internal processing procedure re-creation unit 65 is matched with processing procedure of the authentication subprocess retained in the authentication policy retention unit 61.

The authentication device 60 has the function of verifying that the authentication context C4 is valid when the authenticator block verification unit 64 indicates that all the verification results are valid and, at the same time, when the internal processing procedure verification unit 66 indicates that all the verification results are equal to one another.

(Client Device)

The client device 70 includes an entity equipment communication unit 71 and a communication unit 72.

The entity equipment communication unit 71 conducts the communication between the entity equipment 80 and the client device 70, and has the function of receiving the authentication context C4 generated by the entity equipment 80.

The communication unit 72 conducts the communication between the authentication device 60 and the client device 70, and has the function of transmitting the authentication context C4 received from the entity equipment 80 to the authentication device 60.

(Entity Equipment)

The entity equipment 80 includes an authentication subprocess P1' information retention unit 81, an authentication subprocess P2' information retention unit 82, an authentication subprocess P3' information retention unit 83, a communication unit 84, an authentication subprocess P'1 performing unit 85, an authentication subprocess P'2 performing unit 86, an authentication subprocess P3' performing unit 87, an input and output information association management unit 88, an input and output information block generation unit 89, an authenticator block generation unit 90, an authentication context configuration information retention unit 91, an authentication context generation unit 92, and an output data generation unit 93. The units 85 to 87, 89 and 90, and 92 and 93 can also be realized as a sub-routine (partial program) executed by a control program (not shown) when the units 85 to 87, 89 and 90, and 92 and 93 are realized by the computer program.

The authentication subprocess P1' information retention unit 81, the authentication subprocess P2' information retention unit 82, and the authentication subprocess P3' information retention unit 83 have the function of retaining the internal processing information blocks IPB1, IPB2, and IPB3 associated with the authentication subprocesses which can be performed by the entity equipment 80.

Specifically, the authentication subprocess P1' information retention unit 81 retains the internal processing information block IPB1 with respect to the authentication subprocess P1'. The internal processing information block IPB1 includes "internal output information block IOB1" including the internal system number ISID1 associated with the process result R1' generated by the authentication subprocess P1' and "authentication subprocess processing information PI1" of the authentication subprocess P1'.

The authentication subprocess P2' information retention unit 82 retains the internal processing information block IPB2 with respect to the authentication subprocess P2'. The internal processing information block IPB2 includes "internal output information block IOB2" including the internal system number ISID2 associated with the process result R2' generated by the authentication subprocess P2' and "authentication subprocess processing information PI2" of the authentication subprocess P2'.

The authentication subprocess P3' information retention unit 83 retains the internal processing information block IPB3 with respect to the authentication subprocess P3'. The internal processing information block IPB3 includes "internal input information block IIB3" including the internal system numbers ISID1 and ISID2 associated with the process results R1' and R2' used in performing the authentication subprocess P3', "internal output information block IOB3" including the internal system number ISID3 associated with the process result R3' generated by the authentication subprocess P3', and "authentication subprocess processing information PI3" of the authentication subprocess P3'.

The communication unit 84 conducts the communication between the client device 70 and the entity equipment 80, and has the function of transmitting the authentication context C4 generated in the entity equipment 80 to the client device 70.

The authentication subprocess P1' performing unit 85 has the function of performing the authentication subprocess P1' to generate the process result R1' of the authentication subprocess P1'.

The authentication subprocess P2' performing unit 86 has the function of performing the authentication subprocess P2' to generate the process result R2' of the authentication subprocess P2'.

The authentication subprocess P3' performing unit 87 has the function of performing the (final-stage) authentication subprocess P3' to generate the process result R3' of the authentication subprocess P3' while referring to process result R1' generated by the authentication subprocess P1' performing unit 85 and the process result R2' generated by the authentication subprocess P2' performing unit 86. The authentication subprocess P3' performing unit 87 also has the function of transmitting the output process result R3' to the input and output information association management unit 88.

The input and output information association management unit 88 has the function of managing the process result R3' output from the entity equipment 80 while associating the process result R3' with the internal identification information ISID3.

The input and output information block generation unit 89 has the function of generating the output information block OB4 including the process result R3' obtained from the input and output information association management unit 88 and the internal system number ISID3 associated with the process result R3', and the function of transmitting the generated output information block OB4 to the authentication context configuration information retention unit 91.

The authenticator block generation unit 90 generates the authenticator block AB4 from all the internal processing information blocks IPB1 to IPB3 in the authentication subprocess information retention units 81 to 83 and the output information block OB4 generated in the input and output information block generation unit 89 based on the secret information in the authentication context configuration information retention unit 91.

Specifically, the authenticator block generation unit 90 has the function of generating the authenticator block AB4 by generating the authenticators for the output information block OB4 retained in the authentication context configuration information retention unit 91, the internal processing information block IPB1 obtained from the authentication subprocess P1' information retention unit 81, the internal processing information block IPB2 obtained from the authentication subprocess P2' information retention unit 82, and the internal processing information block IPB3 obtained from the authentication subprocess P3' information retention unit 83. The authenticator block generation unit 90 also has the function of transmitting the generated authenticator block AB4 to the authentication context configuration information retention unit 91.

The authentication context configuration information retention unit 91 has the function of retaining the blocks constituting the authentication context C4, and the function of retaining the secret information for generating the authenticator. Similarly, the private key of the entity equipment 80 in the public key cryptosystem is used as the secret information when the authenticator is the digital signature, and the common key previously shared with the authentication device 60 is used when the authenticator is the message authentication code.

The authentication context generation unit 92 has the function of generating the authentication context C4. The authentication context C4 includes the output information block OB4 retained in the authentication context configuration information retention unit 91, the authenticator block AB4, the internal processing information block IPB1 obtained from the authentication subprocess P1' information retention unit 81, the internal processing information block IPB2 obtained from the authentication subprocess P2' information retention unit 82, and the internal processing information block IPB3 obtained from the authentication subprocess P3' information retention unit 83.

The output data generation unit 93 has the function of transmitting the authentication context C4 generated by the authentication context generation unit 92 to the communication unit 84. The authentication context C4 is of the output of the entity equipment 80. The communication unit 84 transmits the authentication context C4 to the authentication device 60 through the client device 70.

Although the entity equipment 80 outputs only one process result in the second embodiment, the entity equipment 80 may output plural process results.

In addition to the information shown in the second embodiment, additional information on the authentication subprocess or the entity equipment 80, the challenge data for keeping the security, and the like may be described in the authentication context C4. In such cases, desirably the authenticator block generation unit 90 generates the authenticators including such pieces of information.

(System Operation)

Next, an operation of the authentication system having the above configuration will be described with reference to a sequence view of FIG. 21.

In the entity equipment 80, the authentication subprocess P1 performing unit 85 performs the authentication subprocess P1' to output the process result R1' (ST21). The authentication subprocess P2' performing unit 86 performs the authentication subprocess P2' to output the process result R2' (ST22).

The authentication subprocess P3' performing unit 87 performs the authentication subprocess P3' to output the process result R3' while referring to the process result R1' and the process result R2' (ST23), and transmits the process result R3' to the input and output information association management unit 88.

The input and output information association management unit 88 retains the process result R3' while associating the process result R3' with the internal system number ISID3 stored in the input and output information association management unit 88.

The input and output information block generation unit 89 generates the output information block OB4 from the process result R3' and the internal system number ISID3 associated with the process result R3' in the input and output information association management unit 88, and transmits the output information block OB4 to the authentication context configuration information retention unit 91.

The authenticator block generation unit 90 generates the authenticator block AB4 compatible with the form of the authentication context for the output information block OB4 in the authentication context configuration information retention unit 91, the internal processing information block IPB1 in the authentication subprocess P1' information retention unit 81, the internal processing information block IPB2 in the authentication subprocess P2' information retention unit 82, and the internal processing information block IPB3 in the authentication subprocess P3' information retention unit 83. The authenticator block generation unit 90 then transmits the authenticator block AB4 to the authentication context configuration information retention unit 91.

The authentication context generation unit 92 generates the authentication context C4 from the output information block OB4 in the authentication context configuration information retention unit 91, the authenticator block AB4, the internal processing information block IPB1 in the authentication subprocess P1' information retention unit 81, the internal processing information block IPB2 in the authentication subprocess P2' information retention unit 82, and the internal processing information block IPB3 in the authentication subprocess P3' information retention unit 83. The authentication context generation unit 92 outputs the authentication context C4 (ST24).

The output data generation unit 93 transmits the authentication context C4, output from the authentication context generation unit 92, to the client device 70 through the communication unit 84 (ST25). In the case where the client device 70 or the authentication device 60 requires the process result R3' aside from the authentication context, the process result R3' managed by the input and output information association management unit 88 may be transmitted to the client device 70.

In the second embodiment, the process result of the authentication subprocess performed by another piece of entity equipment is not required when the authentication subprocess is performed in the entity equipment 80. However, the following procedure may be added to the above procedure in the case where the process result of the authentication subprocess performed by another piece of entity equipment is required in performing the authentication subprocess in the entity equipment 80.

The communication unit 84 receives the process result of the authentication subprocess performed by another piece of entity equipment, and transmits the process result to the input and output information association management unit 88.

The input and output information association management unit 88 retains the obtained process result while associating the process result with the internal system number. The internal system number is stored in the input and output information association management unit 88.

In the authentication subprocess which needs the process result, it is only necessary to refer to the process result retained in the input and output information association management unit 88. The input and output information block generation unit 89 can generate the input information block from the process result retained in the input and output information association management unit 88 and the internal system number associated with the process result.

In the client device 70, the entity equipment communication unit 71 receives the authentication context C4 from the entity equipment 80, and transmits the received authentication context C4 to the communication unit 72. In the case where the entity equipment 80 transmits the process result R3' of the authentication subprocess P3', the entity equipment communication unit 71 also receives the process result R3' and may transmit the process result R3' to the communication unit 72.

The communication unit 72 transmits the authentication context C4 obtained from the entity equipment communication unit 71 to the authentication device 60 (ST26). In the case where the entity equipment 80 transmits the process result R3', the communication unit 72 may transmit the process result R3'.

In the authentication device 60, the communication unit 62 receives the authentication context C4 from the client device 70, and the authentication context retention unit 63 retains the authentication context C4. In the case where the client device 70 transmits the process result R3', the communication unit 62 also receives the process result R3', and the authentication context retention unit 63 retains the process result R3'.

The authenticator block verification unit 64 extracts the authenticator block AB4 from the authentication context C4 in the authentication context retention unit 63 to verify the authenticator described in the authenticator block AB4 (ST27).

Figure 22:
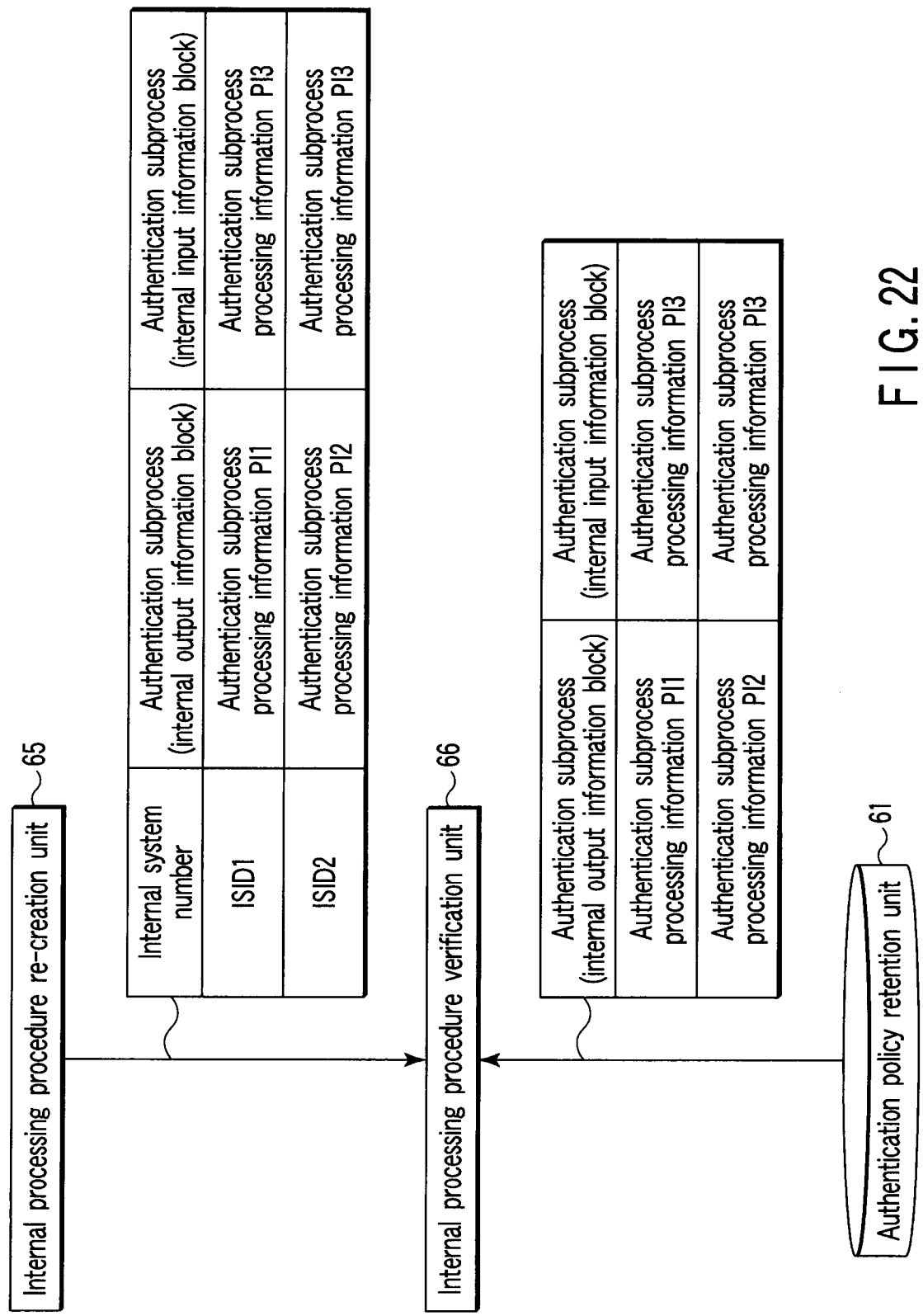
FIG. 22 is a schematic view showing an example of an associated authentication subprocess according to the second embodiment.

The internal processing procedure re-creation unit 65 extracts all the internal processing information blocks IPB1, IPB2, and IPB3 from the authentication context in the authentication context retention unit 63. The internal processing procedure re-creation unit 65 searches for the internal processing information block having the internal output information block which includes the same internal system numbers as all the internal system numbers described in the internal input information blocks of the extracted internal processing information blocks. The internal processing procedure re-creation unit 65 outputs the authentication subprocess information described in the internal processing information block including the internal input information block and the authentication subprocess information described in the internal processing information block including the internal output information block, while associating the pieces of authentication subprocess information with each other as shown in FIG. 22 (ST28).

The internal processing procedure verification unit 66 compares the output from the internal processing procedure re-creation unit 65 with the authentication policy retained in the authentication policy retention unit 61, and verifies that all the processing procedures described in the authentication policy retention unit 61 have been performed (ST29).

In the case where the communication unit 62 receives the process result R4, the internal processing procedure verification unit 66 may verify that the process result R4 has the same value as the process result R4 included in the output information block OB4.

At this point, regarding the order of performing the functional units in the authentication device 60, the order of performing the authenticator block verification unit 64 is not defined as long as the internal processing procedure verification unit 66 is performed after performing the internal processing procedure re-creation unit 65. That is, in the second embodiment, although the authenticator block verification unit 64 is initially performed, the authenticator block verification unit 64 may finally be performed. Another verification process may be performed in the authentication device 60.

As described above, the second embodiment has the configuration in which the output information block or input information block and the authentication subprocess processing information are included in the internal processing information blocks of the authentication context, and the internal system number (process result identification information) is included in the output information block or input information block. Therefore, the processing sequence from the output information block toward the input information block can be confirmed through the same internal system number among the internal processing information blocks of the authentication context, and processing contents can be confirmed by each piece of authentication subprocess processing information.

Accordingly, even if the plural authentication processes are performed in parallel to make the decision fusion, the validity of the series of processes can be verified from the authentication context because the process of generating the process result (processing sequence and processing contents) can be confirmed.

In addition, the common pieces of internal identification information ISID1 and ISID2 are allocated to the process results R1' and R2' input and output among the authentication subprocesses P1', P2', and P3' performed in the entity equipment 80, and the common pieces of internal identification information ISID1 and ISID2 are described in the authentication context C4. Therefore, the processing procedure of the authentication subprocess in the entity equipment 80 can be confirmed by the authentication device 60.

Figure 4:
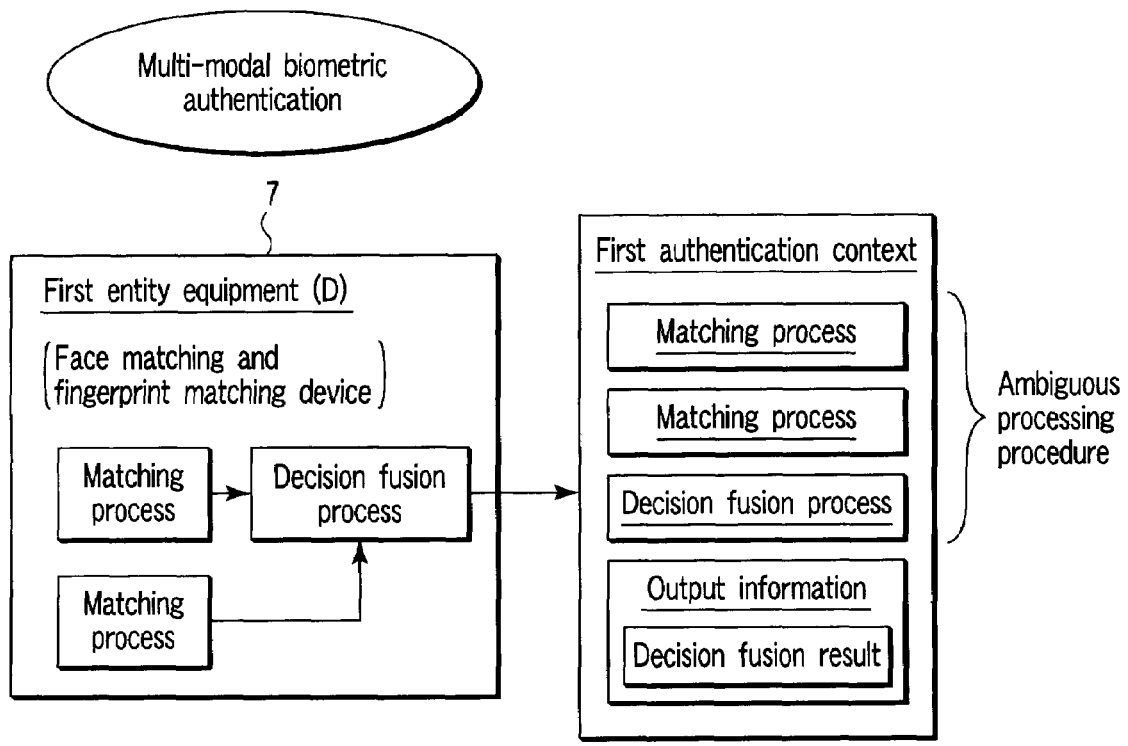
Figure 23:
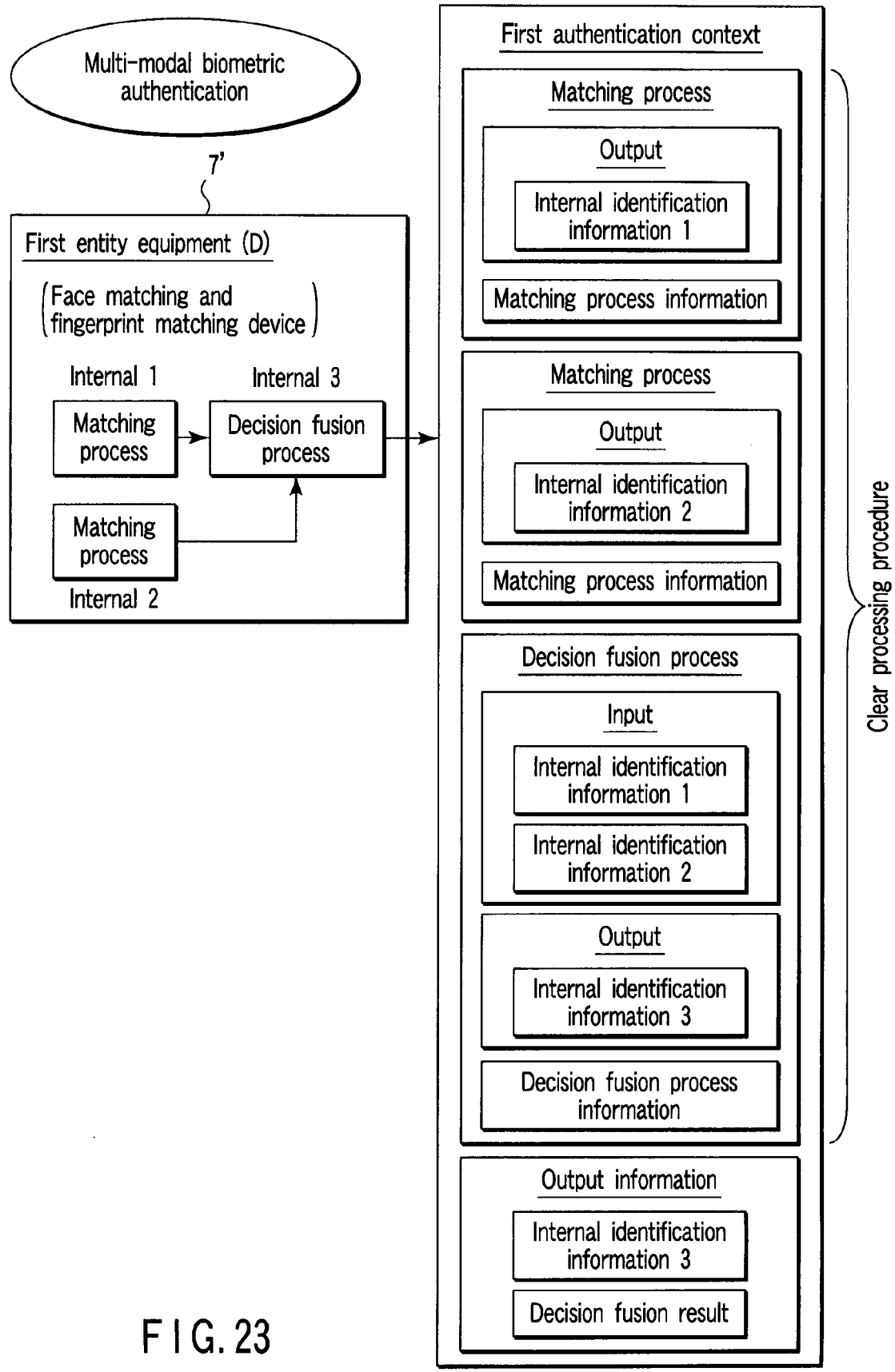
FIG. 23 is a schematic view for explaining an effect of the second embodiment.

For example, unlike the entity equipment 7 shown in FIG. 4, in an entity equipment 7' of FIG. 23 to which the second embodiment is applied, the association between the output of each matching process and the input of the decision fusion can clearly be described through the internal identification information in the authentication context, so that a verifier can confirm the process of generating the process result (decision fusion).

Accordingly, in an open network environment, even if the plural authentication processes are performed in parallel to make the decision fusion, such as in the multimodal biometric authentication system and multi-algorithm biometric authentication system formed by the single entity equipment 80, the validity of the series of processes (process of generating the process result) can be verified from the authentication context, which enhances the accuracy of identity verification in an open network environment can be enhanced.

(Third Embodiment)

Figure 24:
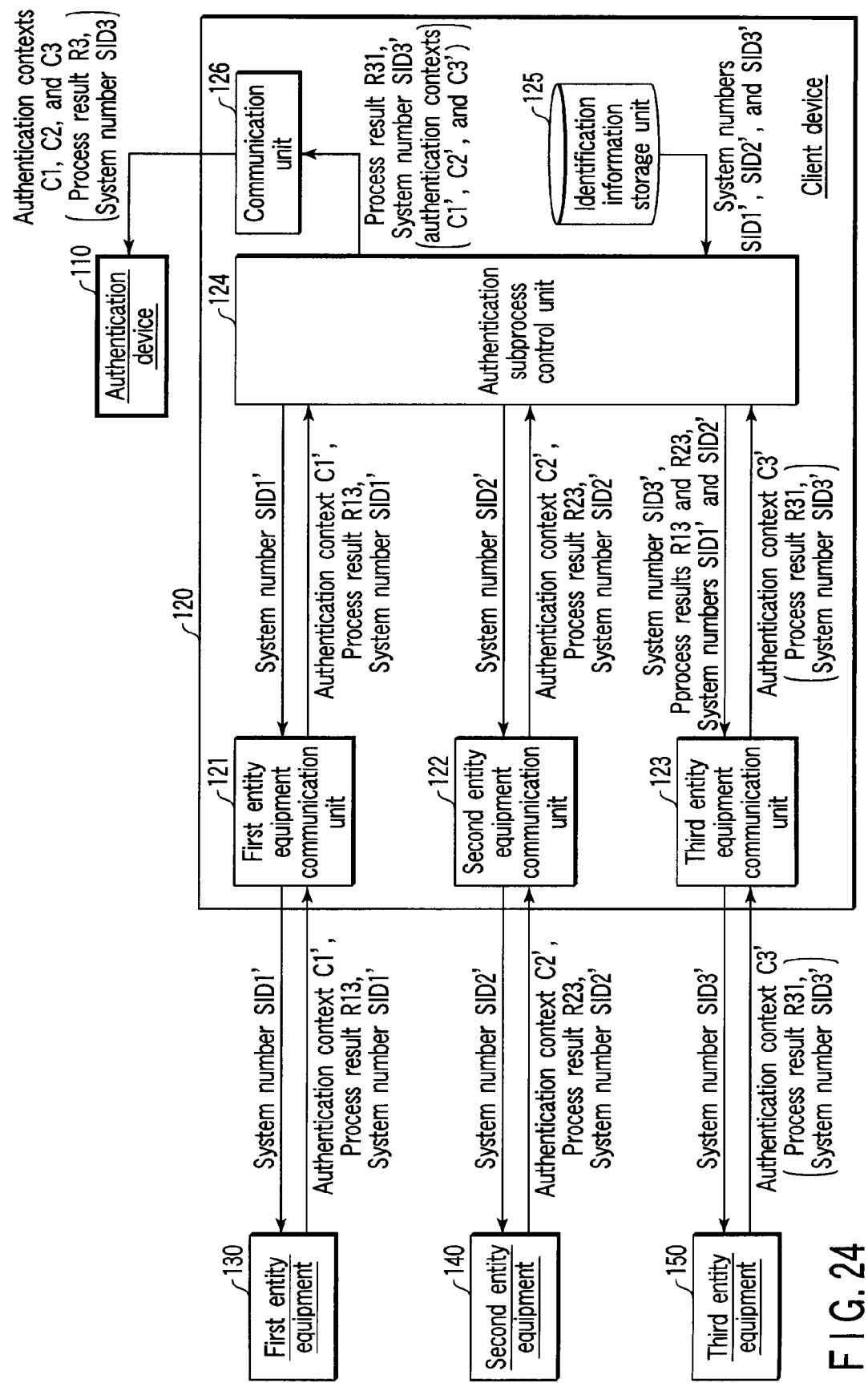
FIG. 24 is a schematic view showing a configuration of an authentication system according to a third embodiment.
Figure 25:
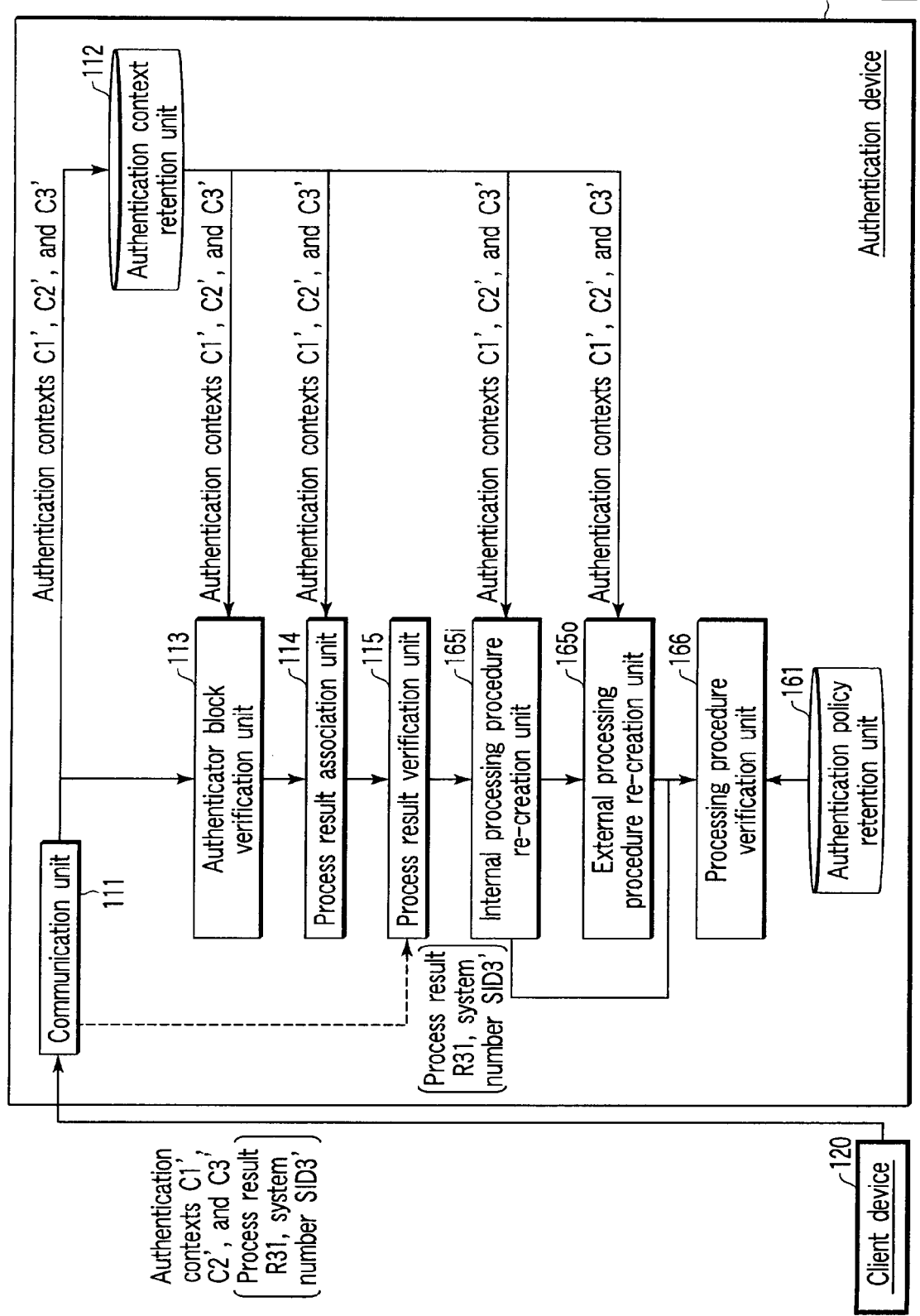
FIG. 25 is a schematic view showing a configuration of an authentication device according to the third embodiment.
Figure 26:
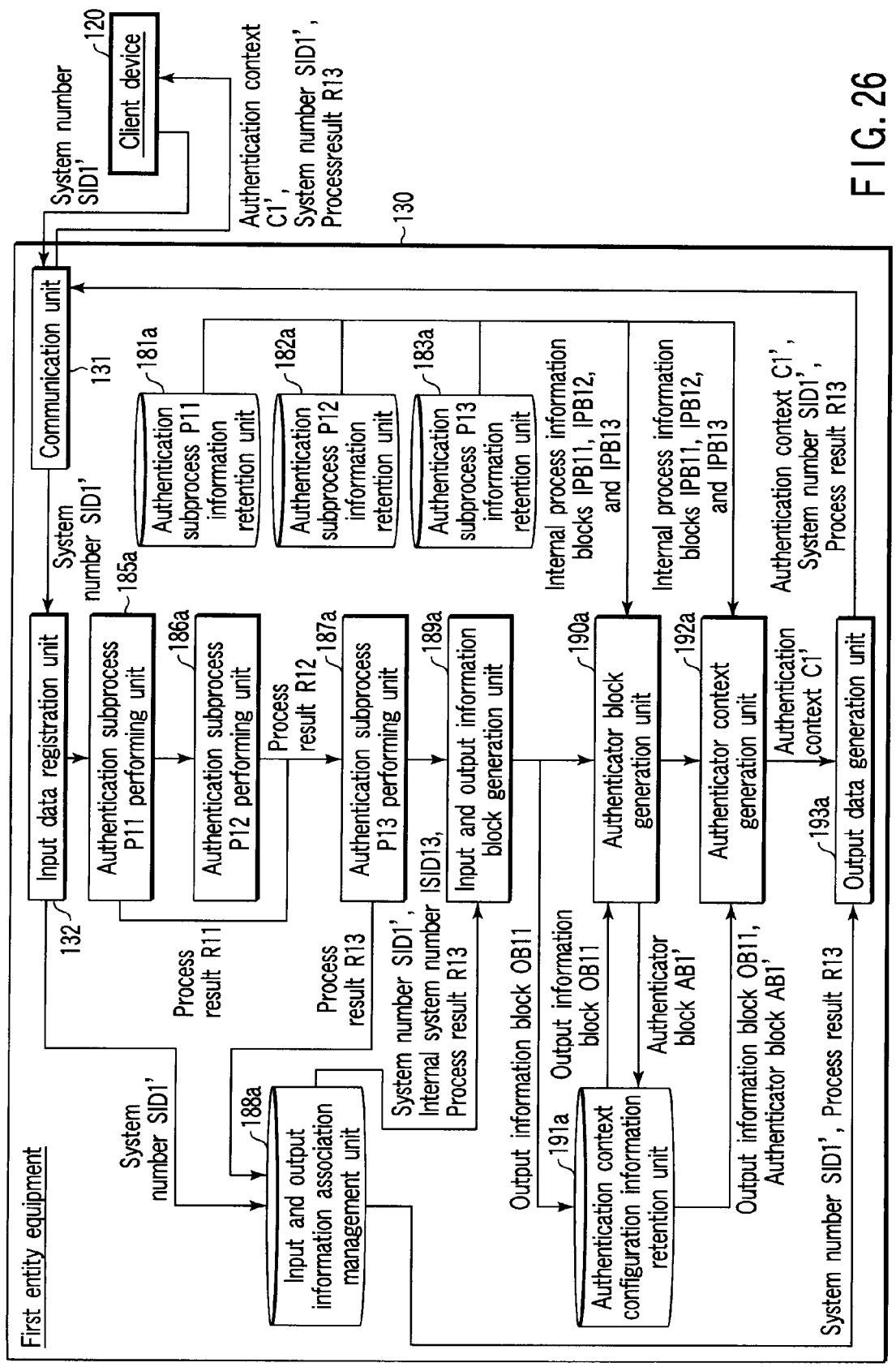
FIG. 26 is a schematic view showing a configuration of a first piece of entity equipment according to the third embodiment.
Figure 27:
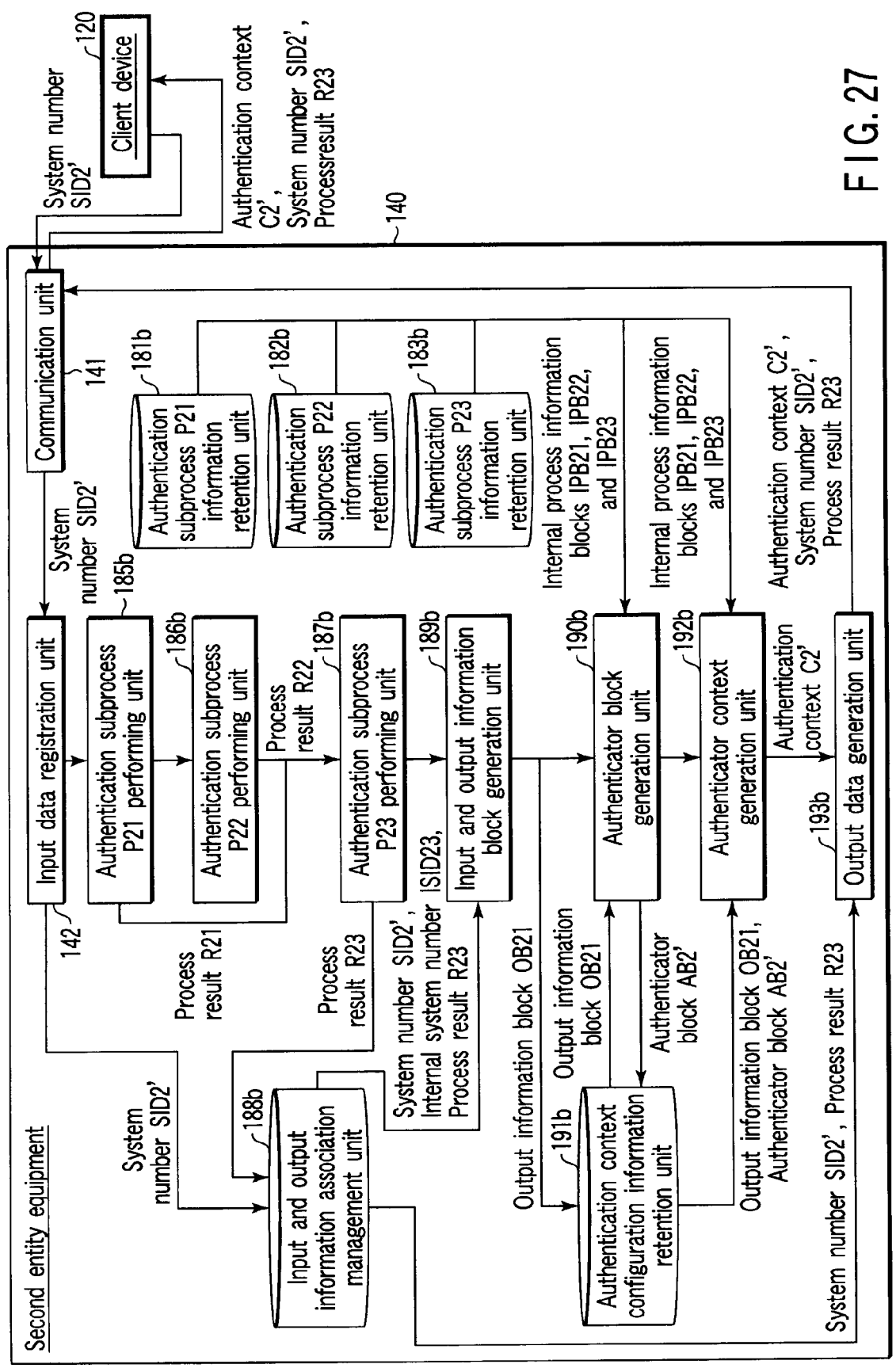
FIG. 27 is a schematic view showing a configuration of second entity equipment according to the third embodiment.
Figure 28:
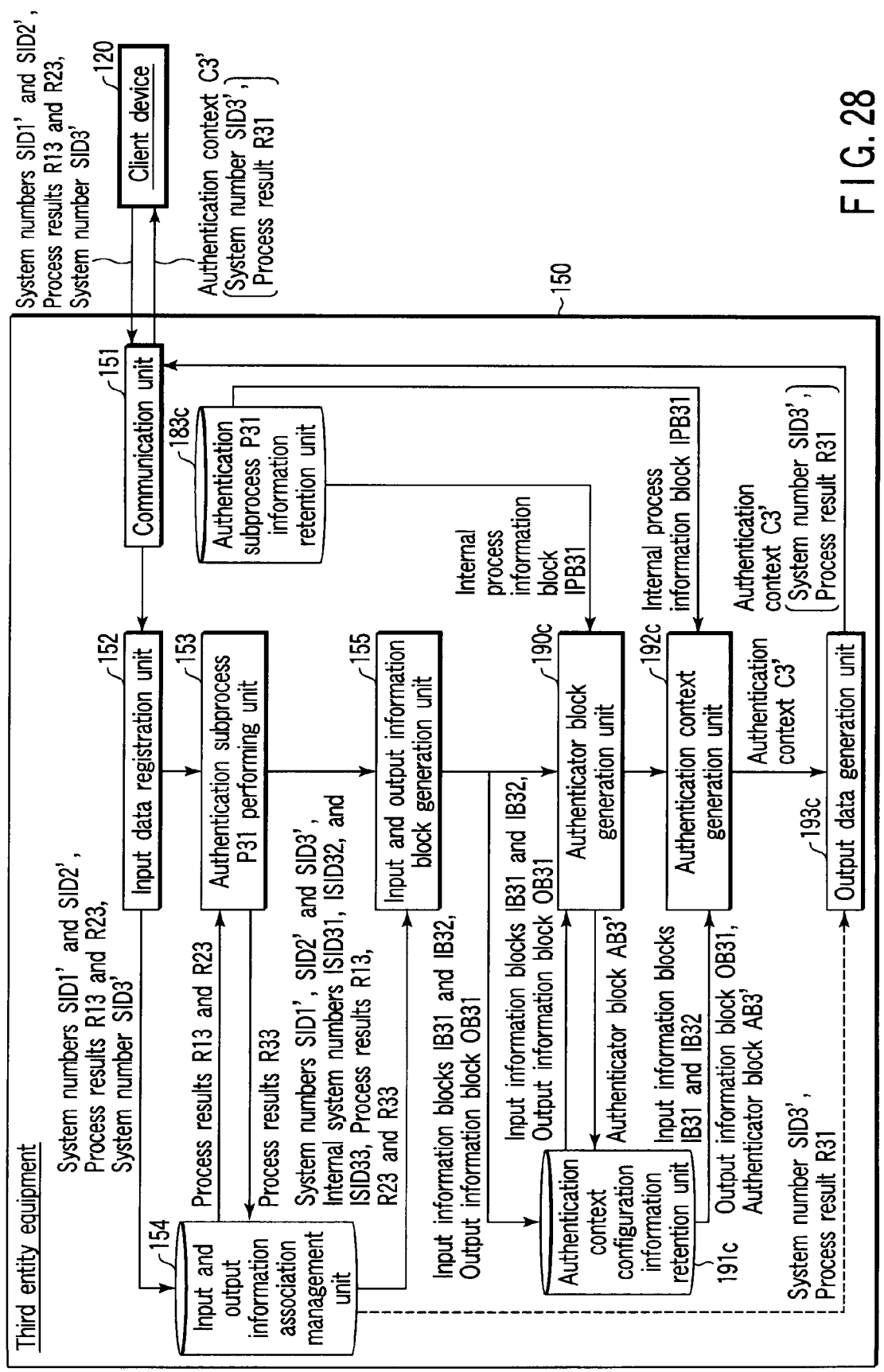
FIG. 28 is a schematic view showing a configuration of a third piece of entity equipment according to the third embodiment.

FIG. 24 is a schematic view showing a configuration of an authentication system according to a third embodiment of the invention, FIG. 25 is a schematic view showing a configuration of an authentication device of the system, FIGS. 26 and 27 are schematic views showing configurations of first and second pieces of entity equipment of the system, and FIG. 28 is a schematic view showing a configuration of a third entity equipment of the system.

Figure 29:
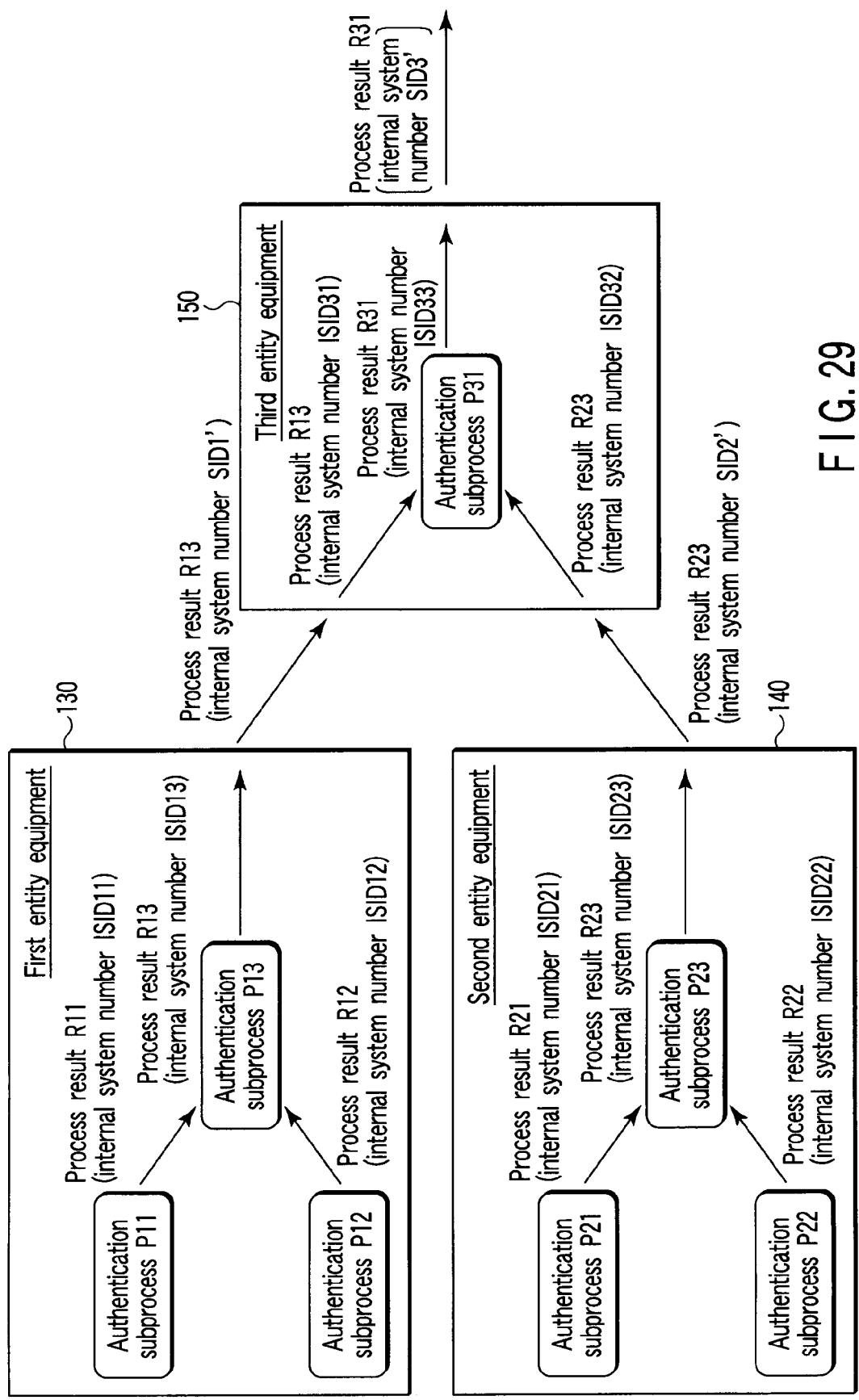
FIG. 29 is a schematic view showing an example of an authentication process according to the third embodiment.

As shown in FIG. 29, in an authentication process of the third embodiment, an authentication subprocess P31 is performed by referring to a process result R13 of authentication subprocesses P11, P12, and P13 and a process result R23 of authentication subprocesses P21, P22, and P23. The authentication subprocesses P11, P12, and P13 are performed by a first entity equipment 130. The authentication subprocesses P21, P22, and P23 are performed by a second entity equipment 140. The authentication subprocess P31 is performed by a third entity equipment 150.

In the authentication process of the third embodiment, for example, the fingerprint image is used as the biometric information in the authentication subprocesses P11, P12, and P13, and the face image is used as the biometric information in the authentication subprocess P21, P22, and P23. The authentication subprocess P11 and the authentication subprocess P12 differ from the authentication subprocess P21 and the authentication subprocess P22 in that the matching process is performed with different algorithms. Each of the authentication subprocess P13 and the authentication subprocess P23 makes the decision fusion of these matching results. The authentication subprocess P31 decides the authentication based on the matching results. These are easy-to-follow examples.

As with the first embodiment, the system number, which is identification information, is allocated to each of the process results input to the pieces of entity equipment 130 to 150 and each of the process results output from the pieces of entity equipment 130 to 150. For example, a system number SID1' is allocated to a process result R13 of the first entity equipment 130 which performs the matching process with the fingerprint image. A system number SID2' is allocated to a process result R23 of the second entity equipment 140 which performs the matching process with the face image. A system number SID3' is allocated to a process result R31 of the third entity equipment 150 which performs the decision fusion of the matching result with the fingerprint image and the matching result with the face image.

As with the second embodiment, the internal system number, which is identification information, is allocated to each of the process results input to the authentication subprocesses and each of the process results output from the authentication subprocesses. For example, internal system numbers ISID11, ISID12, and ISID13 are allocated to the process results R11, R12, and R13 of the authentication subprocess P11, P12, and P13. Internal system numbers ISID21, ISID22, and ISID23 are allocated to process results R21, R22, and R23 of the authentication subprocess P21, P22, and P23. An internal system number ISID31 is allocated to the process result R31 of the authentication subprocess P31.

The internal system numbers may uniquely be allocated within the pieces of entity equipment 130 to 150, and the internal system number may be unique to other internal system numbers in the pieces of entity equipment.

The authentication system of FIG. 24 includes an authentication device 110, a client device 120, the first piece of entity equipment 130, the second entity equipment 140, and the third entity equipment 150.

(Authentication Device)

The authentication device 110 includes a communication unit 111, an authentication context retention unit 112, an authenticator block verification unit 113, a process result association unit 114, a process result verification unit 115, an authentication policy retention unit 161, an internal processing procedure re-creation unit 165i, an external processing procedure re-creation unit 165o, and a processing procedure verification unit 166.

The communication unit 111 conducts the communication between the client device 120 and the authentication device 110, and has the function of receiving the authentication contexts C1', C2', and C3' generated by the first to third pieces of entity equipment 130 to 150 from the client device 120.

Figure 30:
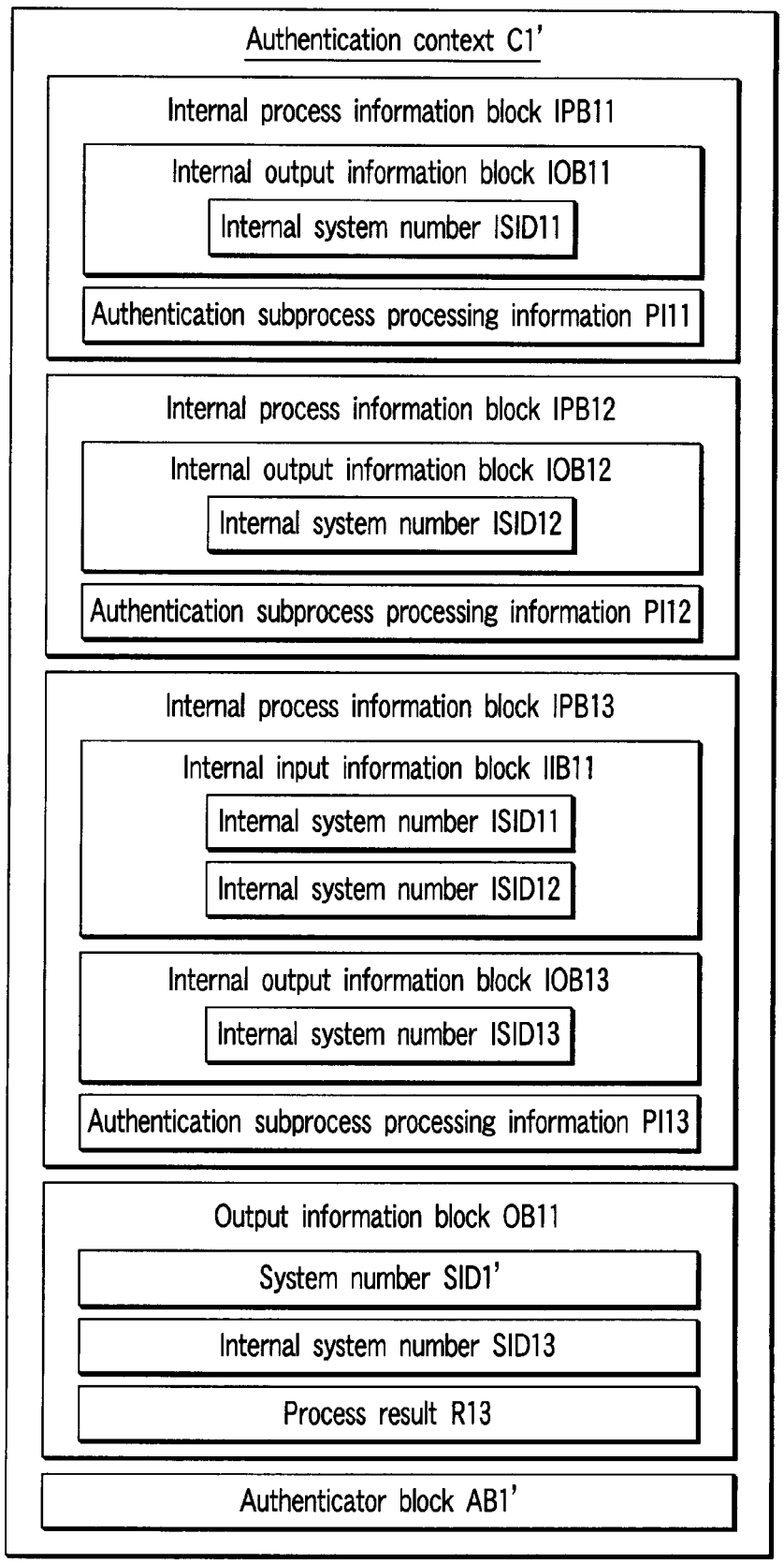
FIGS. 30 to 32 are schematic views showing a format of an authentication context according to the third embodiment.
Figure 31:
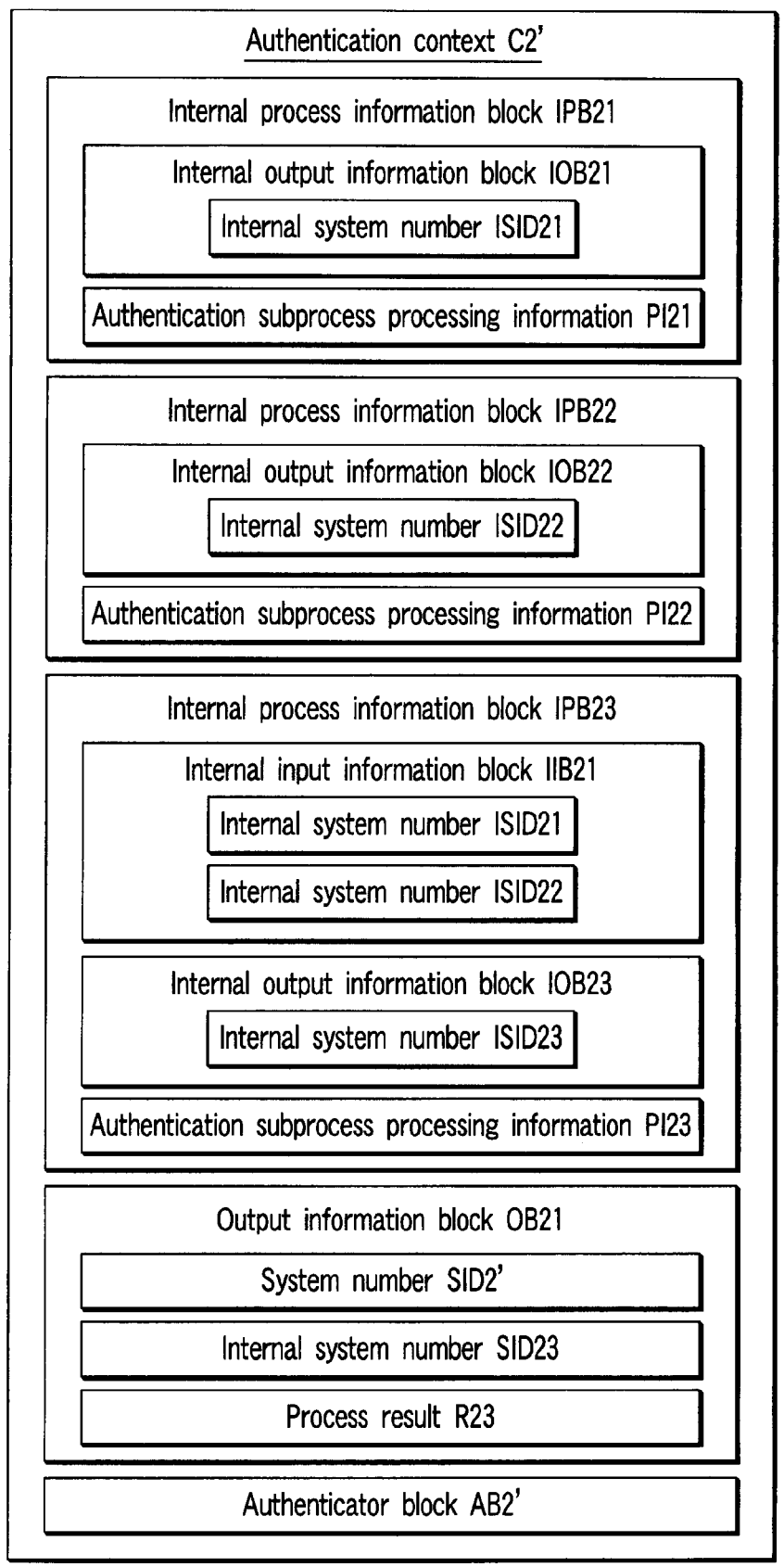
Figure 32:
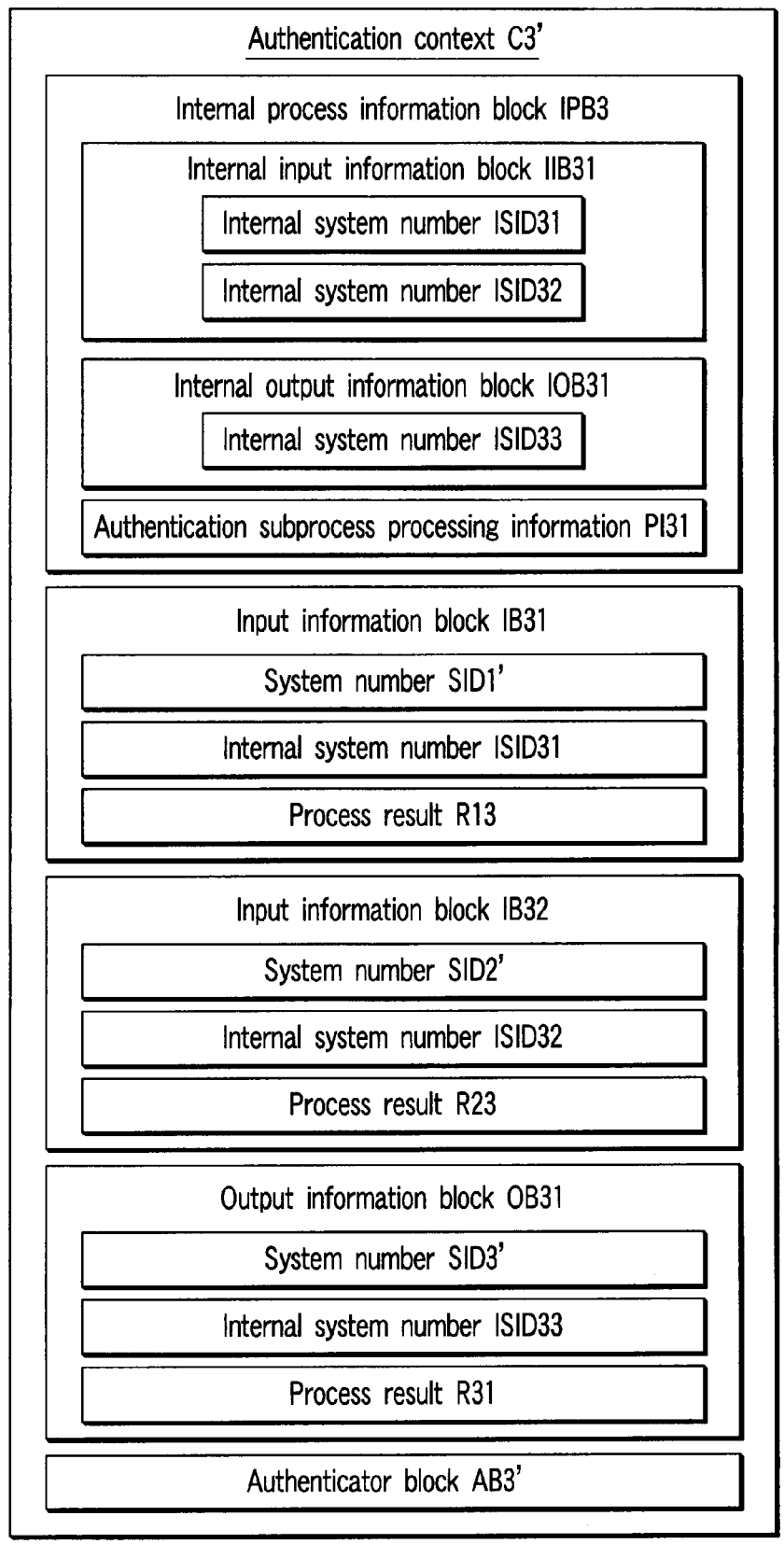

The authentication contexts C1', C2', and C3' are generated by the pieces of entity equipment 130 to 150 which perform the authentication subprocesses P1', P2', and P3', respectively. As shown in FIGS. 30 to 32, a format of each of the authentication contexts C1', C2', and C3' is formed by the input information block, the output information block, the internal processing information block, and the authenticator block.

The input information block is formed by the process result and the input information identification block. The process result is input to the entity equipment 150. The system number and internal system number which are associated with the process result are described in the input information identification block.

The output information block is formed by the process result and the output information identification block. The process result is output from the pieces of entity equipment 130 to 150. The system number and internal system number which are associated with the process result are described in the output information identification block.

The internal processing information block is formed by the internal input information block, the internal output information block, and the authentication subprocess processing information.

The internal system number associated with the process result input to the authentication subprocess is described in the internal input information block with respect to the authentication subprocesses performed in the pieces of entity equipment 130 to 150.

The internal system number associated with the process result output from the authentication subprocess is described in the internal output information block. The information on the authentication subprocess is described in the authentication subprocess processing information.

The authenticators for the input information block, the output information block, and the internal processing information block are described in the authenticator block. The authenticators are generated with secret information possessed by the pieces of entity equipment 130 to 150.

As used herein, the authenticator means the digital signature or the message authentication code (MAC). The pieces of entity equipment 130 to 150 retain the private keys in the public key cryptosystem when the digital signature is used as the authenticator, and retain the common key previously shared with the authentication device when the message authentication code is used as the authenticator.

The authentication subprocess processing information described in the internal processing information block means information on the authentication subprocess. The authentication subprocess processing information means information on, for example, "biometric information obtaining process" or "matching process" for indicating the type of the authentication subprocess and "fingerprint image" or "face image" for indicating the type of the biometric information dealt with by the authentication subprocess. The authentication subprocess processing information also means information which indicates an ability of the authentication subprocess.

In the case where the pieces of entity equipment 130 to 150 have no input, the input information block is not included in the authentication contexts generated by the pieces of entity equipment 130 to 150. The authentication context does not always include one input information block and one output information block, but the authentication context includes the same number of input information blocks and the same number of output information blocks as the process results when the pieces of entity equipment 130 to 150 input or output the plural process results. Similarly, the authentication context does not always include one internal processing information block, but the authentication context includes the same number of internal processing information blocks as the authentication subprocesses when the pieces of entity equipment 130 to 150 perform the plural authentication subprocesses. Sometimes the biometric information is described in the process results included in the input information block and output information block, so that the process may be performed with the one-way function, such as the hash function, from the standpoint of privacy protection. However, in the case where the one-way function process is performed, it is necessary that the one-way function process be performed on all the process results having the same value. In the case where the process result to which the one-way function process has already been performed is required for the process of the authentication device 110, it is necessary for the communication unit 111 to separate the function of receiving the process results R13, R23, and R31 of the authentication subprocesses P13, P23, and P31 from the client device 120 from the authentication contexts C1', C2', and C3'. However, the presence or absence of the function is not particularly defined here.

The authenticator block verification unit 113 has the function of extracting the authenticator blocks AB1', AB2', and AB3' from the authentication contexts C1', C2', and C3' retained in the authentication context retention unit 112, and the function of verifying the authenticators described in the extracted authenticator blocks AB1', AB2', and AB3'.

The process result association unit 114 has the function of extracting all the input information blocks IB31 and IB32 and all the output information blocks OB11, OB21, and OB31 from all the authentication contexts C1', C2', and C3' retained in the authentication context retention unit 112. The process result association unit 114 also has the function of searching for the output information blocks OB11 and OB21 having the same system number as the system number described in the extracted input information blocks IB31 and IB32, and outputting the process result described in each input information block and the process result described in the corresponding processing information block while associating the process results with each other.

The process result verification unit 115 refers to the output of the process result association unit 114 to verify whether or not all the associated process results are equal to each other.

The data change performed by an illegitimate user can be detected among the pieces of entity equipment 130 to 150 by verifying that the process results which are input and output among the pieces of entity equipment 130 to 150 while associated by the system number are equal to each other.

The authentication policy retention unit 161 has the function of retaining the procedure of the authentication subprocess to be performed in the authentication process as the authentication policy. For example, as shown in FIG. 33, the authentication policy expresses the processing procedure of the authentication subprocess performed in the authentication process using a set of authentication subprocess processing information associated with the authentication subprocess for outputting a certain process result and authentication subprocess processing information associated with the authentication subprocess for inputting the process result.

The internal processing procedure re-creation unit 165*i* has the function of extracting the internal processing information block in each authentication context retained in the authentication context retention unit 112. The internal processing procedure re-creation unit 165*i* also has the function of searching for the internal output information block having described therein the internal system number having the same value as the internal system number described in the internal input information block in the extracted internal processing information block, from the internal processing information block included in the same authentication context. The internal processing procedure re-creation unit 165*i* further has the function of outputting the authentication subprocess processing information described in the internal processing information block including the internal input information block and the authentication subprocess processing information described in the internal processing information block including the internal output information block while associating the pieces of authentication subprocess processing information with each other.

In the third embodiment, the procedures of the authentication subprocesses performed in the pieces of entity equipment 130 and 140 which generate the authentication contexts are expressed by associating the same internal system number with the internal processing information block having the internal input information block and the internal output information block.

The external processing procedure re-creation unit 165*o* has the function of extracting all the input information blocks IB31 and IB32, all the output information blocks OB11, OB21, and OB31, and the internal processing information block from all the authentication contexts C1', C2', and C3' which are retained in the authentication context retention unit 112. The external processing procedure re-creation unit 165*o* also has the function of searching for the output information blocks OB11 and OB21 having the same system number as the system number described in the extracted input information block IB31 and IB32. The external processing procedure re-creation unit 165*o* further has the function of outputting the authentication process processing information described in the internal processing information block in the same authentication context, the internal processing information block including the internal input information block in which the same internal system number as the internal system number described in each input information block is described, and the authentication process processing information described in the internal processing information block in the same authentication context, the internal processing information block including the internal output information block in which the same internal system number as the internal system number described in each corresponding output information block is described, while the external processing procedure re-creation unit 165*o* associates the pieces of authentication process processing information with each other.

In the third embodiment, the procedure of the authentication subprocess performed in the pieces of entity equipment is expressed by associating the same system number with the internal processing information block having the internal input information block and the internal output information block.

The processing procedure verification unit 166 has the function of verifying whether or not the processing procedure of the authentication subprocess output from the internal processing procedure re-creation unit 165*i* and the processing procedure of the authentication subprocess output from the external processing procedure re-creation unit 165*o* are matched with the processing procedure of the authentication subprocess retained in the authentication policy retention unit 161.

(Client Device)

The client device 120 includes a first entity equipment communication unit 121, a second entity equipment communication unit 122, a third entity equipment communication unit 123, an authentication subprocess control unit 124, an identification information storage unit 125, and a communication unit 126.

The first entity equipment communication unit 121 conducts the communication between the first entity equipment 130 and the client device 120. The first entity equipment communication unit 121 has the function of transmitting the system number SID1' associated with the process result of the authentication subprocess P13 to the first entity equipment 130, and the function of receiving the process result R13 of the authentication subprocess P13 and the system number SID1' associated with the process result R13 from the first entity equipment 130. The first entity equipment communication unit 121 also has the function of receiving the authentication context C1' generated by the first entity equipment 130.

The second entity equipment communication unit 122 conducts the communication between the second entity equipment 140 and the client device 120. The second entity equipment communication unit 122 has the function of transmitting the system number SID2' associated with the process result of the authentication subprocess P23 to the second entity equipment 140, and the function of receiving the process result R23 of the authentication subprocess P23 and the system number SID2' associated with the process result R23 from the second entity equipment 140. The second entity equipment communication unit 122 also has the function of receiving the authentication context C2' generated by the second entity equipment 140.

The third entity equipment communication unit 123 conducts the communication between the third entity equipment 150 and the client device 120. The third entity equipment communication unit 123 has the function of transmitting the process result R13 of the authentication subprocess P13 and the system number SID1' associated with the process result R13 to the third entity equipment 150, the function of transmitting the process result R23 of the authentication subprocess P23 and the system number SID2' associated with the process result R23 to the third entity equipment 150, and the function of transmitting the system number SID3' associated with the process result R31 of the authentication subprocess P31 to the third entity equipment 150. The third entity equipment communication unit 123 also has the function of receiving the authentication context C3' generated by the third entity equipment 150.

The communication unit 126 conducts the communication between the authentication device 110 and the client device 120. The communication unit 126 has the function of transmitting the authentication contexts C1', C2', and C3' generated by the first to third pieces of entity equipment 130 to 150 to the authentication device 110.

The authentication subprocess control unit 124 controls the processing procedures of the authentication subprocesses performed by the entity equipment 130 to 150 and the association between the system number and the process result input to and output from the authentication subprocess. The authentication subprocess control unit 124 has the function of transmitting the system number SID1' associated with the process result R13 of the authentication subprocess P13 to the first entity equipment communication units 121, and the function of transmitting the system number SID2' associated with the process result R23 of the authentication subprocess P23 to the second entity equipment communication units 122. The authentication subprocess control unit 124 also has the function of transmitting the process result R13 received by the first entity equipment communication unit 121 and the system number SID1' associated with the process result R13 to the third entity equipment communication unit 123, the function of transmitting the process result R23 received by the second entity equipment communication unit 122 and the system number SID2' associated with the process result R23 to the third entity equipment communication unit 123, and the function of transmitting the system number SID3' associated with the process result R31 of the authentication subprocess P31 to the third entity equipment communication unit 123. The authentication subprocess control unit 124 further has the function of obtaining the authentication contexts C1', C2', and C3' from the entity equipment communication units 121 to 123 to transmit the authentication contexts C1', C2', and C3' to the authentication device 110 through the communication unit 126.

(First Entity Equipment)

The first entity equipment 130 includes a communication unit 131, an input data registration unit 132, an authentication subprocess P11 information retention unit 181a, an authentication subprocess P12 information retention unit 182a, an authentication subprocess P13 information retention unit 183a, an authentication subprocess P11 performing unit 185a, an authentication subprocess P12 performing unit 186a, an authentication subprocess P13 performing unit 187a, an input and output information association management unit 188a, an input and output information block generation unit 189a, an authenticator block generation unit 190a, an authentication context configuration information retention unit 191a, an authentication context generation unit 192a, and an output data generation unit 193a. The units 132, 185a to 187a, 189a and 190a, and 192a and 193a can also be realized as a sub-routine (partial program) executed by a control program (not shown) when the units 132, 185a to 187a, 189a and 190a, and 192a and 193a are realized by the computer program. The same holds true for the pieces of entity equipment 140 and 150.

The communication unit 131 conducts the communication between the client device 120 and the first entity equipment 130. The communication unit 131 has the function of receiving the system number SID1' associated with the process result R13 of the authentication subprocess P13 from the client device 120. The system number SID1' is output by the first entity equipment 130. The communication unit 131 also has the function of transmitting a set of the process result R13 of the authentication subprocess P13 performed in the first entity equipment 130 and the system number SID1' associated with the process result R13, and the authentication context C1' generated in the first entity equipment 130 to the client device 120.

The input and output information association management unit 188a has the function of managing the system number SID1' associated with the process result R13 while associating the system number SID1' with the process result R13 output by the first entity equipment 130 and the internal system number ISID13 associated with the process result R13. The system number SID1' is input to the first entity equipment 130.

The input data registration unit 132 has the function of registering the system number SID1' associated with the process result R13 in the input and output information association management unit 188a. The process result R13 is output by the first entity equipment 130, and the system number SID1' is received by the communication unit 131.

The authentication subprocess P11 information retention unit 181a, the authentication subprocess P12 information retention unit 182a, and the authentication subprocess P13 information retention unit 183a have the functions of retaining the internal processing information blocks IPB11, IPB12, and IPB13 associated with the authentication subprocesses which can be performed by the first entity equipment 130.

The authentication subprocess P11 performing unit 185a has the function of performing the authentication subprocess P11 to output the process result R11 of the authentication subprocess P11.

The authentication subprocess P12 performing unit 186a has the function of performing the authentication subprocess P12 to output the process result R12 of the authentication subprocess P12.

The authentication subprocess P13 performing unit 187a has the function of performing the authentication subprocess P13 to output the process result R13 of the authentication subprocess P13 while referring to the process result R11 output by the authentication subprocess P11 performing unit 185a and the process result R12 output by the authentication subprocess P12 performing unit 186a. The authentication subprocess P13 performing unit 187a also has the function of transmitting the process result R13 to the input and output information association management unit 188a.

The authentication context configuration information retention unit 191a has the function of retaining the blocks constituting the authentication context C1'.

The input and output information block generation unit 189a has the function of generating the output information block OB11 from the process result R13 retained in the input and output information association management unit 188a and the system number SID1' and internal system number ISTD13 which are associated with the process result R13. The input and output information block generation unit 189a also has the function of transmitting the generated output information block OB11 to the authentication context configuration information retention unit 191a.

The authenticator block generation unit 190a has the function of generating the authenticator block AB1' by generating the authenticators for the output information block OB11 retained in the authentication context configuration information retention unit 191a, the internal processing information block IPB11 obtained from the authentication subprocess P11 information retention unit 181a, the internal processing information block IPB12 obtained from the authentication subprocess P12 information retention unit 182a, and the internal processing information block IPB13 obtained from the authentication subprocess P13 information retention unit 183a. The authenticator block generation unit 190a also has the function of transmitting the generated authenticator block AB1' to the authentication context configuration information retention unit 191a.

The authentication context generation unit 192a has the function of generating the authentication context C1' from the output information block OB11 retained in the authentication context configuration information retention unit 191a, the authenticator block AB1', the internal processing information block IPB11 obtained from the authentication subprocess P11 information retention unit 181a, the internal processing information block IPB12 obtained from the authentication subprocess P12 information retention unit 182a, and the internal processing information block IPB13 obtained from the authentication subprocess P13 information retention unit 183a.

The output data generation unit 193a has the function of transmitting the process result R13 retained in the input and output information association management unit 188a, the system number SID1' associated with the process result R13, and the authentication context C1' generated by the authentication context generation unit 192a to the communication unit 131 in the form of the output of the entity equipment 130.

(Second Entity Equipment)

The second entity equipment 140 includes a communication unit 141, an input data registration unit 142, an authentication subprocess P21 information retention unit 181b, an authentication subprocess P22 information retention unit 182b, an authentication subprocess P23 information retention unit 183b, an authentication subprocess P21 performing unit 185b, an authentication subprocess P22 performing unit 186b, an authentication subprocess P23 performing unit 187b, an input and output information association management unit 188b, an input and output information block generation unit 189b, an authenticator block generation unit 190b, an authentication context configuration information retention unit 191b, an authentication context generation unit 192b, and an output data generation unit 193b.

The communication unit 141 conducts the communication between the client device 120 and the second entity equipment 140. The communication unit 141 has the function of receiving the system number SID2' associated with the process result R23 of the authentication subprocess P23 from the client device 120. The system number SID2' is output by the second entity equipment 140. The communication unit 141 also has the function of transmitting a set of the process result R23 of the authentication subprocess P23 performed in the second entity equipment 140 and the system number SID2' associated with the process result R23, and the authentication context C2' generated in the second entity equipment 140 to the client device 120.

The input and output information association management unit 188b has the function of managing the system number SID2' associated with the process result R23 while associating the system number SID2' with the process result R23 output by the second entity equipment 140 and the internal system number ISID23 associated with the process result R23. The system number SID2' is input to the second entity equipment 140.

The input data registration unit 142 has the function of registering the system number SID2' associated with the process result R23 in the input and output information association management unit 188b. The process result R23 is output by the second entity equipment 140, and the system number SID2' is received by the communication unit 141.

The authentication subprocess P21 information retention unit 181b, the authentication subprocess P22 information retention unit 182b, and the authentication subprocess P23 information retention unit 183b have the functions of retaining the internal processing information blocks IPB21, IPB22, and IPB23 associated with the authentication subprocesses which can be performed by the second entity equipment 140.

The authentication subprocess P21 performing unit 185b has the function of performing the authentication subprocess P21 to output the process result R21 of the authentication subprocess P21.

The authentication subprocess P22 performing unit 186b has the function of performing the authentication subprocess P22 to output the process result R22 of the authentication subprocess P22.

The authentication subprocess P23 performing unit 187b has the function of performing the authentication subprocess P23 to output the process result R23 of the authentication subprocess P23 while referring to the process result R21 output by the authentication subprocess P21 performing unit 185b and the process result R22 output by the authentication subprocess P22 performing unit 186b. The authentication subprocess P23 performing unit 187b also has the function of transmitting the process result R23 to the input and output information association management unit 188b.

The authentication context configuration information retention unit 191b has the function of retaining the blocks constituting the authentication context C2'.

The input and output information block generation unit 189b has the function of generating the output information block OB21 from the process result R23 retained in the input and output information association management unit 188b and the system number SID2' and internal system number ISID23 which are associated with the process result R23. The input and output information block generation unit 189b also has the function of transmitting the generated output information block OB21 to the authentication context configuration information retention unit 191b.

The authenticator block generation unit 190b has the function of generating the authenticator block AB2' by generating the authenticators for the output information block OB21 retained in the authentication context configuration information retention unit 191b, the internal processing information block IPB21 obtained from the authentication subprocess P21 information retention unit 181b, the internal processing information block IPB22 obtained from the authentication subprocess P22 information retention unit 182b, and the internal processing information block IPB23 obtained from the authentication subprocess P23 information retention unit 183b. The authenticator block generation unit 190a also has the function of transmitting the generated authenticator block AB2' to the authentication context configuration information retention unit 191b.

The authentication context generation unit 192b has the function of generating the authentication context C2' from the output information block OB21 retained in the authentication context configuration information retention unit 191b, the authenticator block AB2', the internal processing information block IPB21 obtained from the authentication subprocess P21 information retention unit 181b, the internal processing information block IPB22 obtained from the authentication subprocess P22 information retention unit 182b, and the internal processing information block IPB23 obtained from the authentication subprocess P23 information retention unit 183b.

The output data generation unit 193b has the function of transmitting the process result R23 retained in the input and output information association management unit 188b, the system number SID2' associated with the process result R23, and the authentication context C2' generated by the authentication context generation unit 192b to the communication unit 141 in the form of the output of the second entity equipment 140.

(Third Entity Equipment)

The third entity equipment 150 includes a communication unit 151, an input and output information association management unit 154, an input data registration unit 152, an authentication subprocess P31 performing unit 153, an authentication context configuration information retention unit 191c, an input and output information block generation unit 155, an authentication subprocess P31 information retention unit 183c, an authenticator block generation unit 190c, an authentication context generation unit 192c, and an output data generation unit 193c.

The communication unit 151 conducts the communication between the client device 120 and the third entity equipment 150. The communication unit 151 has the function of receiving the system number SID3' associated with the process result R31 of the authentication subprocess P31 from the client device 120. The system number SID3' is output by the third entity equipment 150. The communication unit 151 also has the function of transmitting the authentication context C3' generated in the third entity equipment 150 to the client device 120.

The input and output information association management unit 154 has the function of managing the process result R13 and the system number SID1' associated with the process result R13 while associating the process result R13 and the system number SID1' with internal system number ISID31 associated with the process result R13. The system number SID1' is input to the third entity equipment 150. The input and output information association management unit 154 also has the function of managing the process result R23 and the system number SID2' associated with the process result R23 while associating the process result R23 and the system number SID2' with internal system number ISID32 associated with the process result R23. The system number SID2' is input to the third entity equipment 150. The input and output information association management unit 154 further has the function of managing the system number SID3' associated with the process result R31 while associating the system number SID3' with the process result R31 output by the third entity equipment 150 and internal system number ISID31 associated with the process result R31. The system number SID3' is input to the third entity equipment 150.

The input data registration unit 152 has the function of registering the process result R13 and system number SID1' associated with the process result R13 which are received by the communication unit 151, the process result R23 and system number SID2' associated with the process result R23 which are received by the communication unit 151, and the system number SID2' associated with the process result R23 which is output by the third entity equipment 150 in the input and output information association management unit 154.

The authentication subprocess P31 information retention unit 183c has the function of retaining the internal processing information block IPB31 associated with the authentication subprocess which can be performed by the third entity equipment 150.

The authentication subprocess P31 performing unit 153 has the function of performing the authentication subprocess P31 to output the process result R31 of the authentication subprocess P31, and the function of transmitting the process result R31 to the input and output information association management unit 154.

The authentication context configuration information retention unit 191c has the function of retaining the blocks constituting the authentication context C3'.

The input and output information block generation unit 155 has the function of generating the input information block IB31 from the process result R13 retained in the input and output information association management unit 154 and the system number SID1' and internal system number ISID31 which are associated with the process result R13. The input and output information block generation unit 155 also has the function of generating the input information block IB32 from the process result R23 retained in the input and output information association management unit 154 and the system number SID2' and internal system number ISID32 which are associated with the process result R23. The input and output information block generation unit 155 also has the function of generating the output information block OB31 from the process result R31 retained in the input and output information association management unit 154 and the system number SID3' and internal system number ISID33 which are associated with the process result R31. The input and output information block generation unit 155 further has the function of transmitting all the generated input information blocks IB31 and IB32 and output information block OB31 to the authentication context configuration information retention unit 191c.

The authenticator block generation unit 190c has the function of generating the authenticator block AB3' by generating the authenticators for all the input information blocks IB31 and IB32 and output information block OB31 which are retained in the authentication context configuration information retention unit 191c and the internal processing information block IPB31 obtained from the authentication subprocess P31 information retention unit 183c. The authenticator block generation unit 190c also has the function of transmitting the generated authenticator block AB3' to the authentication context configuration information retention unit 191c.

The authentication context generation unit 192c has the function of generating the authentication context C3' from all the input information blocks IB31 and IB32 and output information block OB31 which are retained in the authentication context configuration information retention unit 191c, authenticator block AB3', and the internal processing information block IPB31 obtained from the authentication subprocess P31 information retention unit 183c.

The output data generation unit 193c has the function of transmitting the authentication context C3', generated by the authentication context generation unit, to the communication unit 151 in the form of the output of the third entity equipment 150.

Although each of the pieces of entity equipment 130 to 150 outputs only one process result in the third embodiment, each of the pieces of entity equipment 130 to 150 may output plural process results. In the case where each of the pieces of entity equipment 130 to 150 may output the plural process results, it is necessary that the system number is individually allocated to each of the process results output from the pieces of entity equipment 130 to 150. Therefore, the client device 120 transmits the system number corresponding to each process result, and the pieces of entity equipment 130 to 150 output each of the process results while associating the process result with the system number transmitted from the client device 120.

In addition to the information shown in the third embodiment, additional information on the authentication subprocess or the pieces of entity equipment 130 to 150, the challenge data for keeping the security, and the like may be described in the authentication contexts C1, C2, and C3. In such cases, desirably the authenticator block generation units 190*a* to 190*c* generate the authenticators including such pieces of information.

(System Operation)

Figure 34:
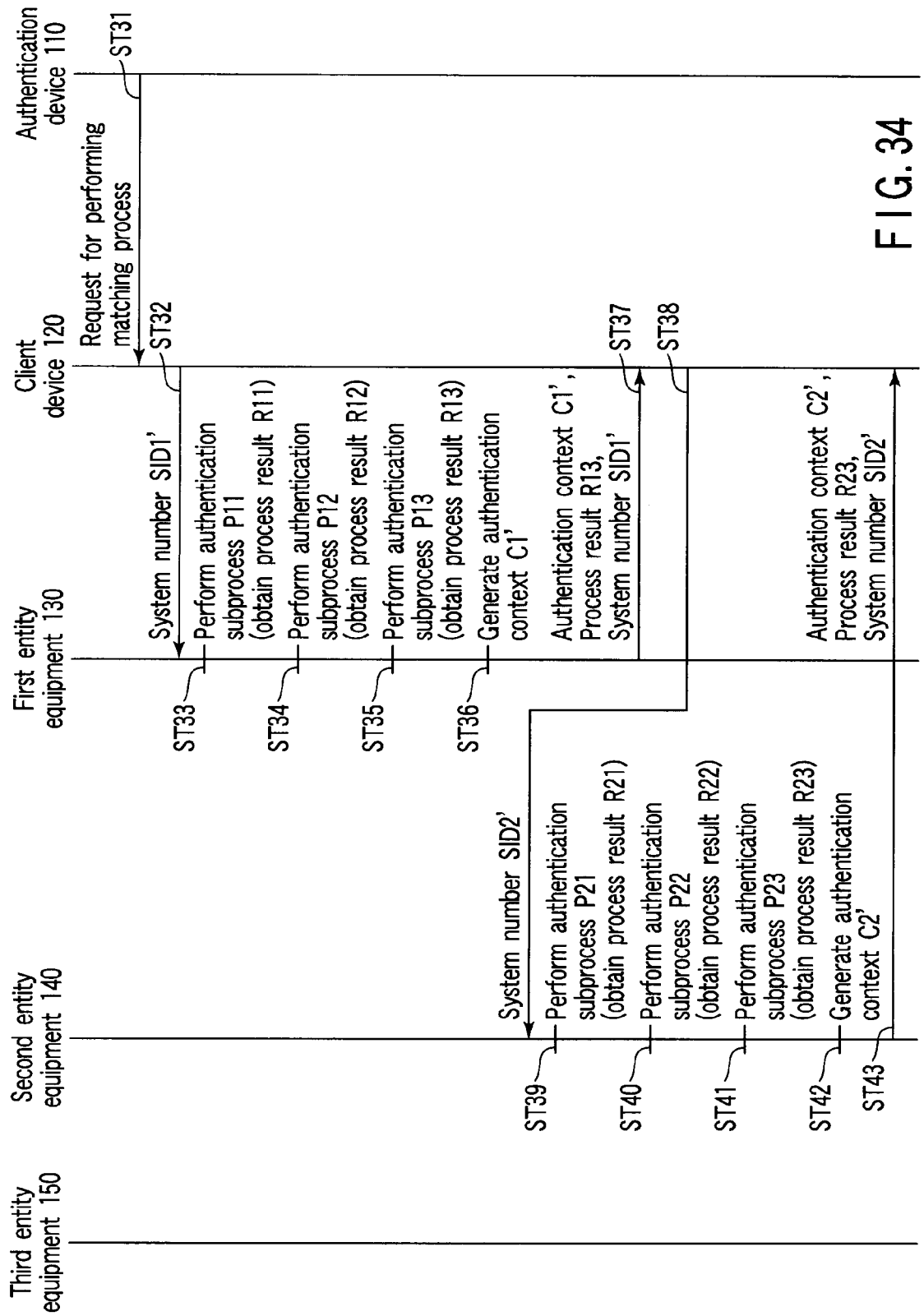
FIGS. 34 and 35 are sequence views for explaining an operation according to the third embodiment.
Figure 35:
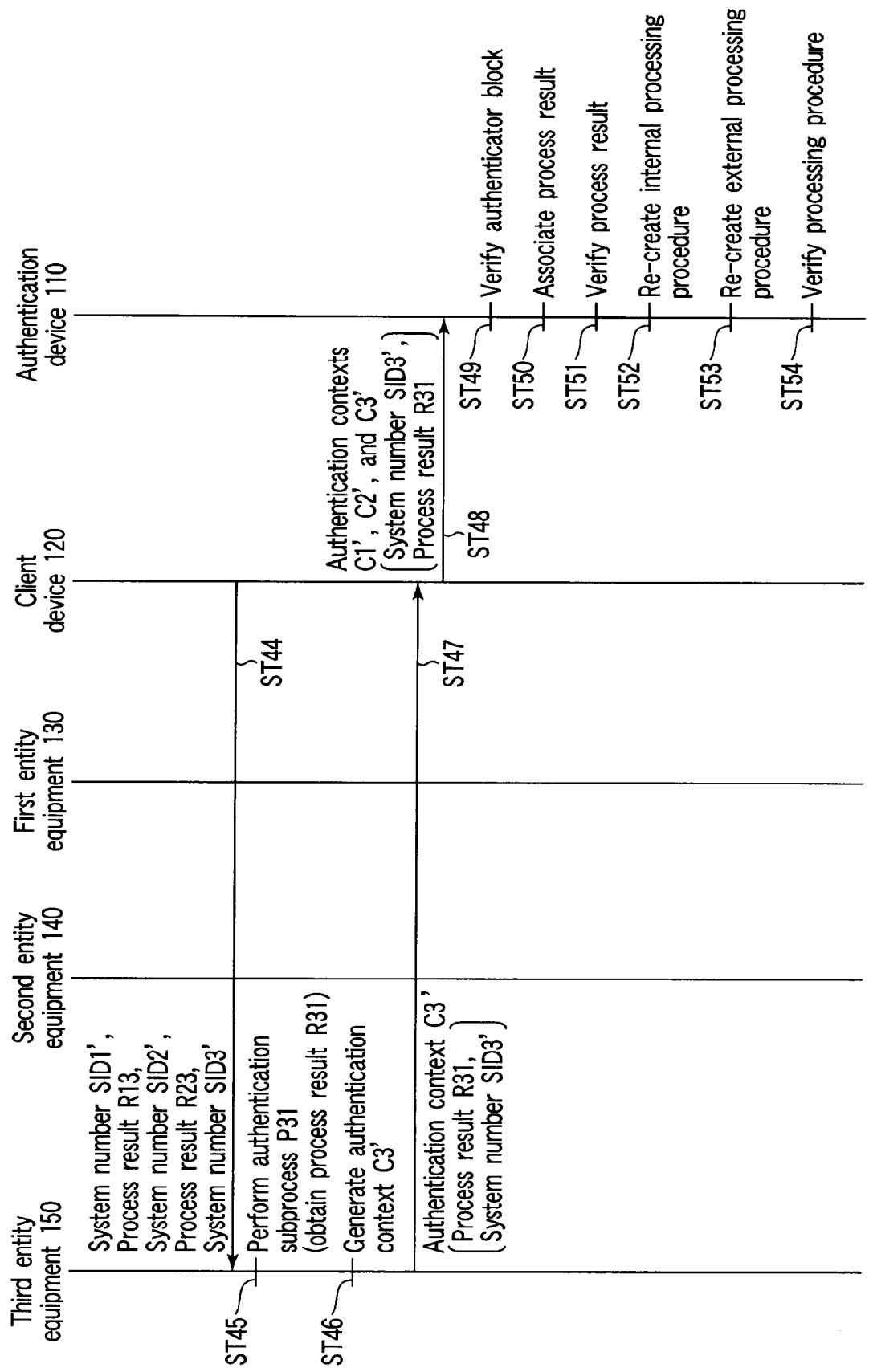

Then, an operation of the authentication system having the above configuration will be described with reference to sequence views of FIGS. 34 and 35.

When the necessity of identity verification is generated by a certain process, the authentication device 110 transmits a request for performing the matching process to the client device 120 (ST31).

In the client device 120, the authentication subprocess control unit 124 transmits the system number SID1' to the first entity equipment 130 through the first entity equipment communication unit 121 (ST32). The system number SID1' is associated with the process result R13 of the authentication subprocess P13 performed in the first entity equipment 130.

In the first entity equipment 130, the input data registration unit 132 obtains the system number SID1' through the communication unit 131, and transmits the system number SID1' to the input and output information association management unit 188*a*.

The input and output information association management unit 188*a* retains the obtained system number SID1' while associating the system number SID1' with the corresponding internal system number ISID13.

The authentication subprocess P11 performing unit 185*a* performs the authentication subprocess P11 to output the process result R11 (ST33).

The authentication subprocess P12 performing unit 186*a* performs the authentication subprocess P12 to output the process result R12 (ST34).

The authentication subprocess P13 performing unit 187*a* performs the authentication subprocess P13 to generate the process result R13 while referring to the process result R11 obtained from the authentication subprocess P11 performing unit 185*a* and the process result R12 obtained from the authentication subprocess P12 performing unit 186*a* (ST35), and transmits the process result R13 to the input and output information association management unit 188*a*.

The input and output information association management unit 188*a* retains the process result R13 while associating with the system number SID1' and the internal system number ISID13. The system number SID1' and the internal system number ISID13 are associated with the process result R13 retained by the input and output information association management unit 188*a*.

The input and output information block generation unit 189*a* generates the output information block OB11 from the process result R13 in the input and output information association management unit 188*a* and the system number SID1' and internal system number ISID13 associated with the process result R13, and transmits the output information block OB11 to the authentication context configuration information retention unit 191*a*.

The authenticator block generation unit 190*a* generates the authenticator block AB1' compatible with the format of the authentication context for the output information block OB11 in the authentication context configuration information retention unit 191*a*, the internal processing information block IPB11 in the authentication subprocess P11 information retention unit 181*a*, the internal processing information block IPB12 in the authentication subprocess P12 information retention unit 182*a*, and the internal processing information block IPB13 in the authentication subprocess P13 information retention unit 183*a*. The authenticator block generation unit 190*a* then transmits the authenticator block AB1' to the authentication context configuration information retention unit 191*a*.

The authentication context generation unit 192*a* generates the authentication context C1' from the output information block OB11 in the authentication context configuration information retention unit 191*c*, the authenticator block AB1', the internal processing information block IPB11 in the authentication subprocess P11 information retention unit 181*a*, the internal processing information block IPB12 in the authentication subprocess P12 information retention unit 182*a*, and the internal processing information block IPB13 in the authentication subprocess P13 information retention unit 183*a* (ST36).

The output data generation unit 193*a* combines the set of process result R13 and system number SID1' in the input and output information association management unit 188*a* and the obtained authentication context C1', and transmits the combined data to the client device 120 through the communication unit 131 (ST37). At this point, the process result R13 and the system number SID3' may be transmitted to the client device 120 separately from the authentication context C1'.

In the client device 120, the authentication subprocess control unit 124 receives the set of process result R13 and system number SID1' and the authentication context C1' through the first entity equipment communication unit 121.

In the third embodiment, although the set of process result and system number associated with the process result is used as the data transmitted and received among the pieces of entity equipment 130 to 150, the data may be transmitted and received using the authentication context.

The authentication subprocess control unit 124 stores the received authentication context C1' and the received set of the process result R13 and associated system number SID1' in the identification information storage unit 125.

Alternatively, the authentication context C1' is not stored in the identification information storage unit 125, but may be transmitted to the communication unit 126. That is, it is only necessary to transmit all the authentication contexts generated by the pieces of entity equipment 130 to 150 in the authentication process to the authentication device 110.

Then, the authentication subprocess control unit 124 transmits the system number SID2' associated with the process result of the authentication subprocess P23 to the second entity equipment 140 through the second entity equipment communication unit 122 (ST38).

In the second entity equipment 140, the input data registration unit 142 obtains the system number SID2' through the communication unit 141, and transmits the system number SID2' to the input and output information association management unit 188*b*.

The input and output information association management unit 188*b* retains the obtained system number SID2' while associating the system number SID2' with the corresponding internal system number ISID23.

The authentication subprocess P21 performing unit 185b performs the authentication subprocess P21 to output the process result R21 (ST39).

The authentication subprocess P22 performing unit 186b performs the authentication subprocess P22 to output the process result R22 (ST40).

The authentication subprocess P23 performing unit 187b performs the authentication subprocess P23 to generate the process result R23 while referring to the process result R21 obtained from the authentication subprocess P21 performing unit 185b and the process result R22 obtained from the authentication subprocess P22 performing unit 186b (ST41), and transmits the process result R23 to the input and output information association management unit 188b.

The input and output information association management unit 188b retains the process result R23 while associating the process result R23 with the system number SID2' and internal system number ISID23 retained in the input and output information association management unit 188b.

The input and output information block generation unit 189b generates the output information block OB21 from the process result R23 in the input and output information association management unit 188b and the system number SID2' and internal system number ISID23 associated with the process result R23, and transmits the output information block OB21 to the authentication context configuration information retention unit 191b.

The authenticator block generation unit 190b generates the authenticator block AB2' compatible with the format of the authentication context for the output information block OB21 in the authentication context configuration information retention unit 191b, the internal processing information block IPB21 in the authentication subprocess P21 information retention unit 181b, the internal processing information block IPB22 in the authentication subprocess P22 information retention unit 182b, and the internal processing information block IPB23 in the authentication subprocess P23 information retention unit 183b. The authenticator block generation unit 190b then transmits the authenticator block AB2' to the authentication context configuration information retention unit 191b.

The authentication context generation unit 192b generates the authentication context C2' from the output information block OB21 in the authentication context configuration information retention unit 191b, the authenticator block AB2', the internal processing information block IPB21 in the authentication subprocess P21 information retention unit 181b, the internal processing information block IPB22 in the authentication subprocess P22 information retention unit 182b, and the internal processing information block IPB23 in the authentication subprocess P23 information retention unit 183b (ST42).

The output data generation unit 193b combines the set of process result R23 and system number SID2' in the input and output information association management unit 188b and the obtained authentication context C2', and transmits the combined data to the client device 120 through the communication unit 141 (ST43). At this point, the process result R23 and the system number SID2' may be transmitted to the client device 120 separately from the authentication context C2'.

In the client device 120, the authentication subprocess control unit 124 receives the set of process result R23 and system number SID2' and the authentication context C2' through the second entity equipment communication unit 122.

The authentication subprocess control unit 124 transmits the received set of the process result R23 and associated system number SID2', the stored set of the process result R13 and system number SID1', and the system number SID3' associated with the process result of the authentication subprocess P31 to the third entity equipment 150 through the third entity equipment communication unit 123 (ST44).

In the third entity equipment 150, the input data registration unit 152 obtains the process result R13 and the system number SID1' associated with the process result R13, the process result R23 and the system number SID2' associated with the process result R23, and the system number SID3' through the communication unit 151. Then, the input data registration unit 152 transmits the obtained process results and system numbers to the input and output information association management unit 154.

The input and output information association management unit 154 associates the obtained process result R13 and system number SID1' associated with the process result R13 with the corresponding internal system number ISID31, associates the obtained process result R23 and system number SID2' associated with the process result R23 with the corresponding internal system number ISID32, and associates the system number SID3' with the corresponding internal system number ISID33. Then, the input and output information association management unit 154 retains the process result R13 and the system number SID1', the process result R23 and the system number SID2', and the system number SID3'.

The authentication subprocess P31 performing unit 153 performs the authentication subprocess P31 to generate the process result R31 while referring to the process result R13 and process result R23 in the input and output information association management unit 154 (ST45), and transmits the process result R31 to the input and output information association management unit 154.

The input and output information association management unit 154 retains the process result R31 while associating the process result R31 with the system number SID3' and the internal system number ISID33.

The input and output information block generation unit 155 generates the input information blocks IB31 and IB32 from the process result R13 in the input and output information association management unit 154, the set of system number SID1' and internal system number ISID31 associated with the process result, and the set of process result R23 and the system number SID2' and internal system number ISID32 associated with the process result R23.

The input and output information block generation unit 155 generates the output information block OB31 from the set of process result R33 and the system number SID3' and internal system number ISID33 associated with the process result R33.

Then, the input and output information block generation unit 155 transmits the input information blocks IB31 and IB32 and the output information block OB31 to the authentication context configuration information retention unit 191c.

The authenticator block generation unit 190c generates the authenticator block AB3' compatible with the format of the authentication context for the input information blocks IB31 and IB32 in the authentication context configuration information retention unit 191c, the output information block OB31, and the internal processing information block IPB31 in the authentication subprocess P31 information retention unit 183c. The authenticator block generation unit 190c then transmits the authenticator block AB3' to the authentication context configuration information retention unit 191c.

The authentication context generation unit 192c generates the authentication context C3' from the input information blocks IB31 and IB32 in the authentication context configuration information retention unit 191c, the output information block OB31, the authenticator block AB3', and the internal processing information block IPB31 in the authentication subprocess P31 information retention unit 183c (ST46).

The output data generation unit 193c transmits the obtained authentication context C2' to the client device 120 through the communication unit 151 (ST47). In the case where the client device 120 or the authentication device 110 requires the process result R31 aside from the authentication context, the process result R3 and the system number SID3 associated with the process result R3 which are managed by the input and output information association management unit 154 may be transmitted to the client device 120.

In the client device 120, the authentication subprocess control unit 124 receives the authentication context C3' from the third entity equipment communication unit 123. In the case where the set of process result R31 and system number SID3' of the authentication subprocess P31 is transmitted from the third entity equipment 150, the authentication subprocess control unit 124 also receives the set of process result R31 and system number SID3'.

In the case where the set of process result R31 and system number SID3', the authentication context C3', and the authentication contexts C1' and C2' are stored, the authentication subprocess control unit 124 transmits the set of process result R31 and system number SID3' and the authentication context C3' to the communication unit 126 along with the authentication contexts C1' and C2'.

The communication unit 126 transmits the obtained authentication contexts C1', C2', and C3' to the authentication device 110 (ST48). At this point, in the case where the communication unit 126 receives the set of process result R31 and system number SID3' associated with the process result R31 from the entity equipment 150 while the authentication device 110 needs the process result, the communication unit 126 also transmits the set of process result R31 and system number SID3' to the authentication device 110.

In the authentication device 110, the communication unit 111 receives the authentication contexts C1', C2', and C3' from the client device 120, and retains the authentication contexts C1', C2', and C3' in the authentication context retention unit 112. In the case where the set of process result R31 and system number SID3' associated with the process result R31 is transmitted from the client device 120, the communication unit 111 also receives the set of process result R31 and system number SID3'.

The authenticator block verification unit 113 extracts the authenticator blocks AB1', AB2', and AB3' from all the authentication contexts C1', C2', and C3' in the authentication context retention unit 112, and verifies the authenticators described in the authenticator blocks AB1', AB2', and AB3' (ST49).

The process result association unit 114 extracts the input information blocks IB31 and IB32 and the output information blocks OB11, OB21, and OB31 from all the authentication contexts C1', C2', and C3' in the authentication context retention unit 112. The process result association unit 114 searches for the output information block having the same system number as the system number described in each extracted input information block. The process result association unit 114 outputs the process result included in the input information block and the process result included in the output information block while associating the process results with each other as shown in FIG. 36 (ST50).

The process result verification unit 115 refers to the set of process results associated by the process result association unit 114, and verifies that the process results have the same value (ST51).

In the case where the communication unit 111 receives the process result R31 and the system number SID3' associated with the process result R31 from the client device 120 aside from the authentication context, the process result verification unit 115 searches for the output information block having the same system number as the system number SID3' associated with the received process result R31, and may verify that the received process result R31 has the same value as the process result R31 included in the output information block.

The internal processing procedure re-creation unit 165i extracts all the internal processing information blocks IPB1, IPB2, and IPB3 from the authentication context in the authentication context retention unit 112. The internal processing procedure re-creation unit 165i searches for the internal processing information block included in the authentication context having the internal output information block which includes the same internal system number as all the internal system numbers described in the internal input information blocks of the extracted internal processing information blocks. The internal processing procedure re-creation unit 165i outputs the authentication subprocess information described in the internal processing information block including the internal input information block and the authentication subprocess information described in the internal processing information block including the internal output information block, while associating the pieces of authentication subprocess information with each other as shown in FIG. 37 (ST52).

The external processing procedure re-creation unit 165o extracts all the input information blocks IB31 and IB32, output information blocks OB11, OB21, and OB31 and the internal processing information block from the authentication contexts C1', C2', and C3' in the authentication context retention unit 112. The external processing procedure re-creation unit 165o searches for the output information blocks OB11 and OB21 having the same system numbers as the system numbers described in the extracted input information blocks IB31 and IB32.

Then, the external processing procedure re-creation unit 165o outputs the authentication process processing information described in the internal processing information block in the same authentication context, the internal processing information block including the internal input information block in which the same internal system number as the internal system number described in each input information block is described, and the authentication process processing information described in the internal processing information block in the same authentication context, the internal processing information block including the internal output information block in which the same internal system number as the internal system number described in each corresponding output information block is described, while the external processing procedure re-creation unit 165o associates the pieces of authentication process processing information with each other as shown in FIG. 37 (ST53).

The processing procedure verification unit 166 compares the outputs from the internal processing procedure re-creation unit 165i and external processing procedure re-creation unit 165o to the authentication policy in the authentication policy retention unit 161 to verify that all the processing procedures described in the authentication policy retention unit 161 are performed (ST54). For example, the processing procedure verification unit 166 can decide that the verification is successful because the six processing procedures shown as the authentication policy in FIG. 33 are matched with the procedures shown in FIG. 37.

At this point, regarding the order of performing the functional units 113 to 115, 165i, 165o, and 166 in the authentication device 110, it is necessary that the process result verification unit 115 be performed after performing the process result association unit 114, and that the processing procedure verification unit 166 be performed after performing both the internal processing procedure re-creation unit 165i and the external processing procedure re-creation unit 165o. The order of performing the authenticator block verification unit 113 and the order of performing the functional units 113 to 115, 165i, 165o, and 166 are not defined. That is, in the third embodiment, although the authenticator block verification unit 113 is initially performed, the authenticator block verification unit 113 may finally be performed. The verification of the process result may be performed after the verification of the processing procedure. Another verification process may be performed in the authentication device 110.

Thus, according to the third embodiment, the system number, which is the common identification information allocated to the process result transmitted and received among the pieces of entity equipment 130 to 150, and the common internal system number, which is individually allocated to the process results input and output among the authentication subprocesses performed by the pieces of entity equipment 130 to 150 are described in each authentication context, which allows the verifier to confirm the consistency of the process results transmitted and received among the pieces of entity equipment 130 to 150 and the performing procedure of the authentication subprocess in each entity equipment 130 and 140.

Accordingly, even if the plural authentication processes are performed in parallel to make the decision fusion, as in the multimodal biometric authentication process and multi-algorithm biometric authentication process performed by each of the pieces of entity equipment 130 to 150, the verifier can verify the validity of the series of processes (process of generating the process result) from the authentication context, and the accuracy of identity verification can be enhanced.

In addition, in the third embodiment, it is assumed that the system including the problems 1 and 2 exists in the multimodal biometric authentication or the multi-algorithm biometric authentication. In such cases, conventionally, the association between pieces of information transmitted and received among the pieces of entity equipment and the procedure of generating the process result output from the entity equipment are hardly verified from the authentication context. Therefore, the verifier hardly verifies the validity of the process result of the biometric authentication from the authentication context.

For example, conventionally, in the case where the biometric authentication system includes the entity equipment which performs the face matching process with the multi-algorithm biometric authentication, the entity equipment which performs the fingerprint matching process with the multi-algorithm biometric authentication, and the entity equipment which makes the decision fusion of the matching process results generated by the pieces of entity equipment, the verifier cannot verify association between the pieces of information input and output among the pieces of entity equipment and the procedure of generating the process result generated by each entity equipment from the authentication context.

However, according to the third embodiment, as described above, the verifier can confirm the consistency of the process results transmitted and received among the pieces of entity equipment 130 to 150 and the procedure of performing the authentication subprocess in each of the pieces of entity equipment 130 and 140.

The technique described above for the embodiment can be stored as a program to be executed by a computer in memory mediums including magnetic disks (Floppy™ disks, hard disks, etc.), optical disks (CD-ROMs, DVDs, etc.), magneto-optical disks (MOs) and semiconductor memories for distribution.

Memory mediums that can be used for the purpose of the present invention are not limited to those listed above and memory mediums of any type can also be used for the purpose of the present invention so long as they are computer-readable ones.

Additionally, the OS (operating system) operating on a computer according to the instructions of a program installed in the computer from a memory medium, data base management software and/or middleware such as network software may take part in each of the processes for realizing the above embodiment.

Still additionally, memory mediums that can be used for the purpose of the present invention are not limited to those independent from computers but include memory mediums adapted to download a program transmitted by LANs and/or the Internet and permanently or temporarily store it.

It is not necessary that a single memory medium is used with the above described embodiment. In other words, a plurality of memory mediums may be used with the above-described embodiment to execute any of the above described various processes. Such memory mediums may have any configuration.

For the purpose of the present invention, a computer executes various processes according to one or more than one programs stored in the memory medium or mediums as described above for the preferred embodiment. More specifically, the computer may be a stand alone computer or a system realized by connecting a plurality of computers by way of a network.

For the purpose of the present invention, computers include not only personal computers but also processors and microcomputers contained in information processing apparatus. In other words, computers generally refer to apparatus and appliances that can realize the functional features of the present invention by means of a computer program.

The present invention is by no means limited to the above described embodiment, which may be modified in various different ways without departing from the spirit and scope of the invention. Additionally, any of the components of the above described embodiment may be combined differently in various appropriate ways for the purpose of the present invention. For example, some of the components of the above described embodiment may be omitted. Alternatively, components of different embodiments may be combined appropriately in various different ways for the purpose of the present invention.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An entity equipment which is used in an authentication system including:

an authentication device which verifies a plurality of authentication contexts including a process result of a biometric authentication subprocess based on secret information;

a client device which transmits said each authentication context to the authentication device; and a plurality of pieces of entity equipment which individually generate said each authentication context to transmit the authentication context to the client device, each of the entity equipment comprising circuitry configured to receive from the client device at least one of process result identification information to be associated with a new process result in the entity equipment, and a process result and process result identification information of a process performed in another entity equipment;

when only the process result identification information to be associated with a new process result is received, perform a biometric authentication subprocess to generate the new process result;

when the process result and the process result identification information of the process performed in the other entity equipment is received, perform a biometric authentication subprocess to generate the new process result based on the received process result of the process performed in the other entity equipment;

associate the received process result identification information to be associated with the new process result with the generated new process result;

generate an authenticator block based on the associated received process result identification information and the generated new process result and secret information stored in the entity equipment;

generate an authentication context including the associated received process result identification information, the generated new process result, and the authenticator block; and transmit the authentication context to the client device.

2. An entity equipment which generates an authentication context to transmit the authentication context to an authentication device which verifies the authentication context based on secret information, the authentication context including a process result of a final-stage biometric authentication subprocess for making a decision fusion to process results of a plurality of biometric authentication subprocesses performed in parallel, the entity equipment comprising circuitry configured to store the secret information;

perform said plurality of biometric authentication subprocesses to generate a process result without using process results of other biometric authentication subprocesses;

perform the final-stage biometric authentication subprocess to generate a new process result using the process results of said plurality of biometric authentication subprocesses;

store a first internal processing information block, the first internal processing information block including an internal output information block and authentication subprocess processing information of each of said plurality of biometric authentication subprocesses, the internal output information block including process result internal identification information associated with the process result generated by each process;

store a second internal processing information block, the second internal processing information block including an internal input information block, an internal output information block, and authentication subprocess processing information of the final-stage biometric authentication subprocess, the internal input information block including process result internal identification information associated with the process result used in performing the final-stage biometric authentication subprocess, the internal output information block including process result internal identification information associated with the process result generated by the final-stage biometric authentication subprocess;

manage a process result internal identification information and the process result, the process result internal identification information being associated with the process result generated by the final-stage biometric authentication subprocess;

generate the output information block including the process result and the process result internal identification information;

generate an authenticator block from all the stored internal processing information blocks and the generated output information blocked based on the stored secret information ;

generate an authentication context including all the internal processing information blocks, the output information block, and the authenticator block; and transmit the authentication context to the authentication device.

3. An authentication device which receives an authentication context from an entity equipment to verify the authentication context based on secret information, the authentication context including a process result of a final-stage biometric authentication subprocess for making a decision fusion to process results of a plurality of biometric authentication subprocesses performed in parallel, the authentication device comprising circuitry configured to store the secret information;

receive an authentication context from the entity equipment, the authentication context including first and second internal processing information blocks, an output information block, and an authenticator block, with respect to the first internal processing information blocks including an internal output information block and authentication subprocess processing information of each biometric authentication subprocess, the internal output information block including process result internal identification information of the process, the second internal processing information block including an internal input information block, an internal output information block, and authentication subprocess processing information of the final-stage biometric authentication subprocess, the internal input information block including process result internal identification information associated with a process result used in performing the process, the internal output information block including process result internal identification information associated with a process result generated by the process, the output information block including the process result generated by the final-stage biometric authentication subprocess and the process result identification information associated with the process result, and the authenticator block generated from the first and second internal processing information blocks and the output information block based on the secret information;
verify the authenticator block of the authentication context based on the stored secret information;
extract all the internal processing information blocks from the authentication context;
search for an internal output information block having process result internal identification information whose value is equal to a value of the process result internal identification information in the internal input information block included in the extracted internal processing information block, and to associate authentication subprocess processing information included in the internal processing information block including the internal input information block with authentication subprocess processing information included in the internal processing information block including the searched internal output information block;
store two pieces of authentication subprocess processing information with respect to two biometric authentication subprocesses consecutively performed in said each biometric authentication subprocess, while associating the two pieces of authentication subprocess processing information with each other;
verify whether or not the associated two pieces of authentication subprocess processing information are matched respectively with the stored two pieces of authentication subprocess processing information; and
verify that the authentication context is valid when all the verification results of the authenticator block are valid and, at the same time, when all the verification results of verifying whether or not the associated two pieces of authentication subprocess processing information are matched with one another.

4. An authentication system comprising:
an authentication device which verifies a plurality of authentication contexts including a process result of a biometric authentication subprocess based on secret information;
a client device which transmits said each authentication context to the authentication device; and
a plurality of pieces of entity equipment which individually generate said each authentication context to transmit the authentication context to the client device,
wherein the entity equipment includes circuitry configured to
receive from the client device at least one of process result identification information to be associated with a process result in the entity equipment, and a process result and process result identification information of a process performed in another entity equipment;
when only the process result identification information to be associated with a process result is received, perform a biometric authentication subprocess to generate the process result;
when the process result and the process result identification information of the process performed in the other entity equipment is received, perform a biometric authentication subprocess to generate the new process result based on the received process result of the process performed in the other entity equipment;
associate the received process result identification information to be associated with the process result with the generated process result;
generate an authenticator block based on the associated received process result identification information and the generated process result and secret information stored in the entity equipment
generate an authentication context including the associated received process result identification information, the generated process result, and the authenticator block; and
transmit the authentication context to the client device, and the client device includes circuitry configured to
store process result identification information associated with the process result unique to said each entity equipment;
transmit the associated process result identification information to at least one first entity equipment for initially generating an authentication context in the at least one of said entity equipment;
when the initially generated authentication context is received from the at least one entity equipment, transmit to at least one second entity equipment and a process result and process result identification information included in the received initially generated authentication context, the at least one second entity equipment generating a next authentication context by performing the biometric authentication subprocess based on the transmitted process result; and
transmit all the authentication contexts received from said each entity equipment to the authentication device.

5. The authentication system according to claim 4, wherein the authentication device includes circuitry configured to:
store the secret information;
receive each authentication context from the client device;
verify the authenticator block of said each authentication context based on the stored secret information;
search for a related authentication context based on a process result included as an input process result in an authentication context, and associate an authentication context for which a related authentication context is found with the related authentication context;
verify whether or not the two associated authentication contexts are consistent with each other; and
verify that all the authentication contexts are valid when all of the authenticator blocks are verified and, at the same time, when all associated authentication contexts are consistent with one another.

6. An authentication system comprising:
an authentication device which verifies an authentication context based on secret information, the authentication context including a process result of a final-stage biometric authentication subprocess for making a decision fusion to process results of a plurality of biometric authentication subprocesses performed in parallel; and
an entity equipment which generates the authentication context to transmit the authentication context to the authentication device,
wherein the entity equipment includes circuitry configured to
store the secret information;
perform said plurality of biometric authentication subprocesses to generate a process result without using process results of other biometric authentication subprocesses;
perform the final-stage biometric authentication subprocess to generate a new process result using the process results of said plurality of biometric authentication subprocesses;
store a first internal processing information block, the first internal processing information block including an internal output information block and authentication subprocess processing information of each of said plurality of biometric authentication subprocesses, the internal output information block including process result internal identification information associated with the process result generated by each process;

store a second internal processing information block is stored, the second internal processing information block including an internal input information block, an internal output information block, and authentication subprocess processing information of the final-stage biometric authentication subprocess, the internal input information block including process result internal identification information associated with the process result used in performing the final-stage biometric authentication subprocess, the internal output information block including process result internal identification information associated with the process result generated by the final-stage biometric authentication subprocess;

manage a process result internal identification information and the process result, the process result internal identification information being associated with the process result generated by the final-stage biometric authentication subprocess;

generate the output information block including the process result associated with the process result internal identification information and the managed process result internal identification information;

generate an authenticator block from all the internal processing information blocks and the generated output information block based on the stored secret information;

generate an authentication context including all the internal processing information blocks, the output information block, and the authenticator block; and transmit the authentication context to the authentication device, and the authentication device includes circuitry configured to store the secret information;

receive the authentication context from the entity equipment;

verify the authenticator block of the authentication context based on the stored secret information;

extract all the internal processing information blocks from the authentication context;

search for an internal output information block having process result internal identification information whose value is equal to a value of the process result internal identification information in the internal input information block included in the extracted internal processing information block, and associate first authentication subprocess processing information included in the internal processing information block including the internal input information block with second authentication subprocess processing information included in the internal processing information block including the searched internal output information block;

retain third and fourth pieces of authentication subprocess processing information with respect to two biometric authentication subprocesses consecutively performed in said each biometric authentication subprocess, while associating the third and fourth pieces of authentication subprocess processing information with each other;

verify whether or not the first and second pieces of authentication subprocess processing information are matched respectively with the third and fourth pieces of authentication subprocess processing information; and verify that the authentication context is valid when all the performed authenticator block verification results are valid and, at the same time, when all the verification results of the pieces of the authentication subprocess processing information are matched with one another.

\* \* \* \* \*